(12) United States Patent
Kawaguchi et al.

(10) Patent No.: US 8,741,046 B2
(45) Date of Patent: Jun. 3, 2014

(54) INK COMPOSITION, INKJET RECORDING METHOD AND COLORED BODY

(75) Inventors: Akira Kawaguchi, Tokyo (JP);
Takahiko Matsui, Tokyo (JP); Takashi Yoshimoto, Tokyo (JP); Kenji Ooshima, Tokyo (JP)

(73) Assignee: Nippon Kayaku Kabushiki Kaisha, Tokyo (JP)

( * ) Notice: Subject to any disclaimer, the term of this patent is extended or adjusted under 35 U.S.C. 154(b) by 29 days.

(21) Appl. No.: 13/806,981

(22) PCT Filed: Jun. 27, 2011

(86) PCT No.: PCT/JP2011/064663
§ 371 (c)(1),
(2), (4) Date: Dec. 26, 2012

(87) PCT Pub. No.: WO2012/002317
PCT Pub. Date: Jan. 5, 2012

(65) Prior Publication Data
US 2013/0101811 A1    Apr. 25, 2013

(30) Foreign Application Priority Data
Jul. 1, 2010  (JP) ................................. 2010-150805

(51) Int. Cl.
*C09D 11/02* (2014.01)

(52) U.S. Cl.
USPC ...................................... 106/31.48; 106/31.5

(58) Field of Classification Search
CPC ..... C09D 11/328; C09B 67/0046; B41J 2/01; B41M 5/5218
USPC ............... 106/31.48, 31.5; 347/20; 428/195.1
See application file for complete search history.

(56) References Cited

U.S. PATENT DOCUMENTS

| | | | |
|---|---|---|---|
| 7,427,319 B2 * | 9/2008 | Yoneda et al. | 106/31.48 |
| 7,503,965 B2 * | 3/2009 | Matsui et al. | 106/31.5 |
| 7,503,967 B2 * | 3/2009 | Matsui et al. | 106/31.52 |
| 7,704,311 B2 * | 4/2010 | Tojo | 106/31.48 |
| 7,901,498 B2 * | 3/2011 | Hirota et al. | 106/31.5 |
| 8,167,991 B2 * | 5/2012 | Matsui et al. | 106/31.5 |
| 8,496,746 B2 * | 7/2013 | Teramoto et al. | 106/31.48 |
| 8,512,462 B2 * | 8/2013 | Matsui et al. | 106/31.48 |
| 2013/0288019 A1 * | 10/2013 | Kawaguchi et al. | 106/31.48 |

FOREIGN PATENT DOCUMENTS

| | | |
|---|---|---|
| EP | 1 203 668 A2 | 5/2002 |
| JP | 2008-024909 | 2/2008 |
| JP | 2008-024910 A | 2/2008 |
| JP | 2009-512737 | 3/2009 |
| JP | 2009-084345 A | 4/2009 |
| JP | 2009-084346 | 4/2009 |
| JP | 2009-185133 | 8/2009 |
| JP | 2010-037504 | 2/2010 |
| WO | WO 2005/097912 | 10/2005 |
| WO | WO 2006/001274 | 1/2006 |

(Continued)

OTHER PUBLICATIONS

Extended European Search Report mailed on Dec. 13, 2013 in European Application No. 11800781.4.
Notice of Reasons for Rejection issued to Chinese Application No. 201180032404.3, mailed Nov. 18, 2013.

*Primary Examiner* — Helene Klemanski
(74) *Attorney, Agent, or Firm* — Knobbe Martens Olson & Bear LLP

(57) ABSTRACT

A water-based black ink composition which exhibits a low intensity, colorless and neutral black color and provides a black recorded image the printed image of which has high density. The ink composition includes at least one compound represented by formula (1) or a salt thereof and an azo compound having λmax within the range of 550-660 nm. In the formula (1), $R^1$ to $R^8$ independently represent a hydrogen atom; a halogen atom; a sulfo group; a carboxy group; a sulfamoyl group; a carbamoyl group; a C1-C4 alkyl group; a C1-C4 alkoxy group; and a C1-C4 alkoxy group substituted with at least one group selected from a group consisting of a hydroxy group, a C1-C4 alkoxy group, a hydroxy C1-C4 alkoxy group, a sulfo group and a carboxy group. X represents a bivalent cross-linking group.

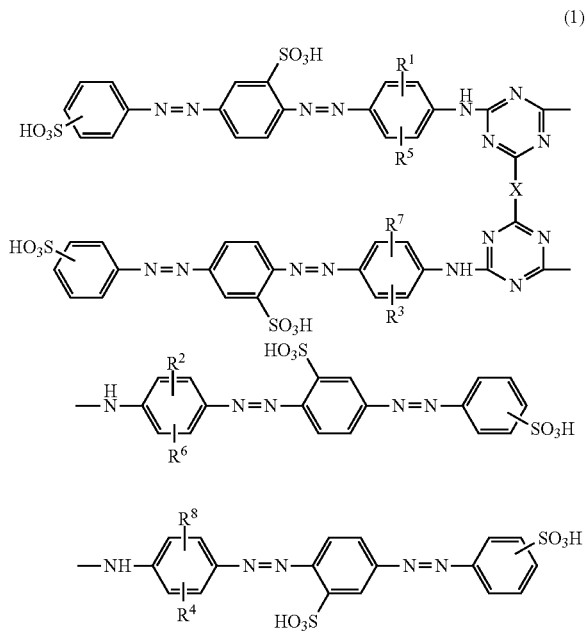

(1)

15 Claims, No Drawings

(56) References Cited

FOREIGN PATENT DOCUMENTS

| WO | WO 2007/046553 | 4/2007 |
| WO | WO 2007/077931 | 7/2007 |
| WO | WO 2009/069279 | 6/2009 |
| WO | WO 2009/136577 | 11/2009 |
| WO | WO 2011/043184 A1 * | 4/2011 |

* cited by examiner

INK COMPOSITION, INKJET RECORDING METHOD AND COLORED BODY

This application is the U.S. National Phase under 35 U.S.C. §371 of International Application PCT/JP2011/064663, filed Jun. 27, 2011, designating the U.S., and published in Japanese as WO 2012/002317 on Jan. 5, 2012, which claims priority to Japanese Patent Application No. 2010-150805, filed Jul. 1, 2010, the entire contents of which are incorporated herein by reference.

TECHNICAL FIELD

The present invention relates to an ink composition containing specific two kinds of coloring matters, an ink jet recording method using the ink composition, and a colored body colored by the ink composition.

BACKGROUND ART

One of the representative methods for various color recording methods may be a recording method using an ink jet printer, that is, an ink jet recording method. This recording method involves producing small droplets of ink, and attaching these small droplets to various record-receiving materials (paper, film, clothes and the like) to perform recording. In this method, the method is characterized in that since the recording head and the record-receiving material are not brought into direct contact, the process is quiet with less noise generation, and size reduction or an increased speed can easily be achieved. Therefore, the method has rapidly become popular in recent years, and an extensive growth in use of the method is expected.

Conventionally, aqueous inks prepared by dissolving a water-soluble coloring matter in an aqueous medium have been used as the inks for fountain pens, felt pens and the like and as the inks for ink jet recording. In these aqueous inks, water-soluble organic solvents are generally added so as to prevent clogging of the inks at the pen tips or ink discharge nozzles. Furthermore, these inks are required to have advantages such as the production of recorded images of sufficient densities, no occurrence of clogging at the pent tips or nozzles, satisfactory drying properties on record-receiving materials, less bleeding, and excellent storage stability. Also, the water-soluble coloring matters used therein is required to have high solubility particularly in water, and high solubility in the water-soluble organic solvents that are added to the ink. In addition, the images thus formed are required to have various image fastness properties such as water resistance, light fastness, gas fastness and moisture resistance. Furthermore, development of a coloring matter producing high recorded images is required.

Among these, the above-described term gas fastness is a resistance to the phenomenon that oxidizing gas such as ozone gas present in air acts on the coloring matter within a recording paper and changes the color of a printed image. In addition to ozone gas, examples of oxidizing gases having this kind of action include NOx and SOx. However, among these oxidizing gases, ozone gas is considered as a main causative substance which accelerates the phenomenon of discoloration and fading of ink jet recorded images. For this reason, among the gas fastness, particularly ozone gas fastness tends to be regarded as most important. In an ink-receiving layer provided on the surface of exclusive ink jet paper of photographic image quality, materials such as porous white inorganic substances are frequently used for the purpose of speeding up drying of the ink, and reducing the bleeding at high image quality. In the images recorded in such a recording paper, significant discoloration and fading of the recorded image due to ozone gas is observed. Since the phenomenon of discoloration and fading due to an oxidizing gas, is characteristic to ink jet images, an enhancement of ozone gas fastness has been one of the most important problems to be solved in the ink jet recording method.

Indicators for deterioration of recorded images to light are divided broadly into 2 kinds of indicators. One is those using the degree of decline of print density of recorded images as an indicator, and the other one is those using the degree of change of the hues of recorded images as an indicator. The decline of print density is observed as the fading of recorded images, and the change of the hues is observed as the color change of recorded images.

In order to store recorded images in the state of high quality for a long time, it is required to develop a coloring matter that is hard to have occurrence of the decline of the print density and the change of the hues to light, and is excellent in light fastness.

It is known that a coloring matter producing high recorded images is used to obtain recorded images having high quality of further density feeling. Additionally, it is possible to solve nozzle clogging when printing with an ink jet printer.

The nozzle clogging of an ink jet printer is often derived from the fact that the moisture in the ink in the vicinity of the nozzles is evaporated earlier than other solvents or additives, and coloring matters are solidified and precipitated when the ink comes to have a composition state where the moisture is less and the solvents or the additives are more. As a method for solving the nozzle clogging, a technique of using a coloring matter having high print density is known. Use of the coloring matter having high print density makes it possible to lessen the solid content of the coloring matters in the ink while maintaining conventional print density. This makes it difficult for the coloring matters to be precipitated, and also is advantageous in terms of the cost, and a coloring matter having high print density is desired to be developed.

In order to expand the field of use in those recording (printing) methods using ink in the future, it is strongly desired to enhance light fastness, ozone gas fastness, moisture resistance and water resistance and to further enhance color development properties in the ink composition used in ink jet recording and the colored body colored by the ink composition.

Inks of various colors have been prepared from various coloring matters; however, among them, a black ink is an important ink that is used in both of mono-color and full-color images. However, it has many difficult points technically to develop a coloring matter having a neutral hue between the dark color gamut and the light color gamut, and having high print density, and further having less dependency of the hue on the light source and exhibiting good black. Thus, although many researches and developments have been performed, those having sufficient performances are still few. Thus, it is generally performed to prepare a black ink by combining multiple, versatile coloring matters. However, the preparation of an ink by mixing multiple coloring matters has problems such as 1) variation of the hues depending on the medium (record-receiving materials) and 2) particularly, increase of discoloration by decomposition of the coloring matters by light or ozone gas, in comparison to adjustment of an ink with a single coloring matter.

A black ink composition for ink jet to render a printed matter to have good various durabilities is proposed in, for example, Patent Documents 1, 2 and 3, and the like. This ink composition is a greatly improved ink composition having good image fastness properties of a printed matter. However, use of these ink compositions as an ink in a single color has not been applied to a neutral black printed matter, and have not sufficiently satisfied further demands of the market requiring high image fastness properties. In addition, Patent Documents 4 and 5 disclose a technique of combining various inks to obtain a black ink composition. However, there is no disclosed ink composition satisfying high fastness properties and color development properties, whereby to satisfy demands of the market.

Patent Document 1: Japanese Unexamined Patent Application, Publication No. 2009-84346

Patent Document 2: PCT International Publication No. WO2009/069279

Patent Document 3: PCT International Publication No. WO2005/097912

Patent Document 4: PCT International Publication No. WO2007/077931

Patent Document 4: Japanese Translation of PCT International Publication, Publication No. 2009-512737

DISCLOSURE OF THE INVENTION

Problems to be Solved by the Invention

An object of the present invention is to provide an aqueous black ink composition which exhibits neutral black with low chroma and no color tone, and produces black recorded images having high density of printed images.

Means for Solving the Problems

The inventors of the present invention repeatedly conducted thorough investigations so as to solve such problems described above, and as a result, the inventors found that an ink composition containing a coloring matter (I) represented by a specific formula and a coloring matter (II), which is an azo compound having λmax in a range of 550 to 660 nm, can solve the problems described above, and thus completing the present invention.

Accordingly, a first aspect of the present invention provides an ink composition containing at least one kind of the compound represented by the following formula (1) or a salt thereof as a coloring matter (I):

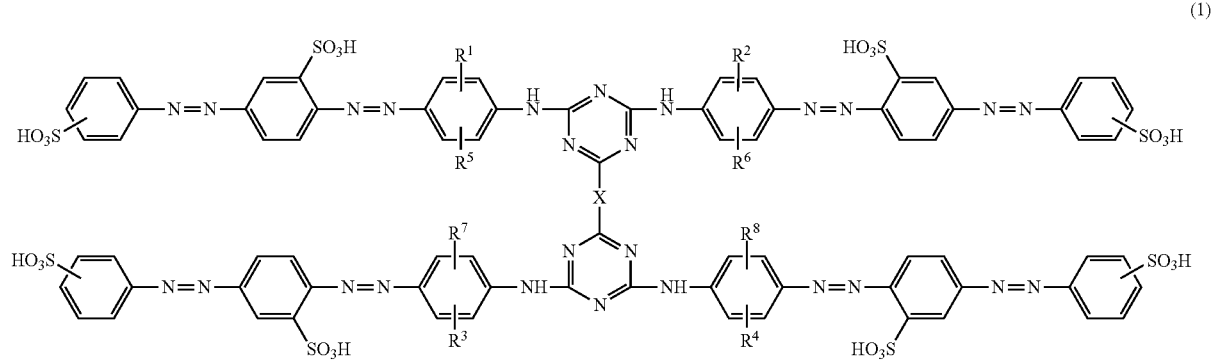

(1)

in the formula (1), $R^1$ to $R^8$ each independently represent a hydrogen atom; a halogen atom; a sulfo group; a carboxy group; a sulfamoyl group; a carbamoyl group; a C1-C4 alkyl group; a C1-C4 alkoxy group; a C1-C4 alkoxy group substituted with at least one group selected from the group consisting of a hydroxy group, a C1-C4 alkoxy group, a hydroxy-C1-C4 alkoxy group, a sulfo group, and a carboxy group; a C1-C4 alkylcarbonylamino group; a C1-C4 alkylcarbonylamino group substituted with a carboxy group; a ureido group; a mono-C1-C4 alkylureido group; a di-C1-C4 alkylureido group; a mono-C1-C4 alkylureido group substituted with at least one group selected from the group consisting of a hydroxy group, a sulfo group, and a carboxy group; a di-C1-C4 alkylureido group substituted with at least one group selected from the group consisting of a hydroxy group, a sulfo group, and a carboxy group; a benzoylamino group; a benzoylamino group having its benzene ring substituted with at least one group selected from the group consisting of a halogen atom, a C1-C4 alkyl group, a nitro group, a sulfo group, and a carboxy group; a benzenesulfonylamino group; or a phenylsulfonylamino group having its benzene ring substituted with at least one group selected from the group consisting of a halogen atom, a C1-C4 alkyl group, a nitro group, a sulfo group, and a carboxy group; and X represents a divalent crosslinking group,
and an azo compound having λmax in a range of 550 to 660 nm as a coloring matter (II).

A second aspect of the invention provides the ink composition according to the first aspect, wherein the coloring matter (I) is the compound represented by the following formula (2) or a salt thereof:

(2)

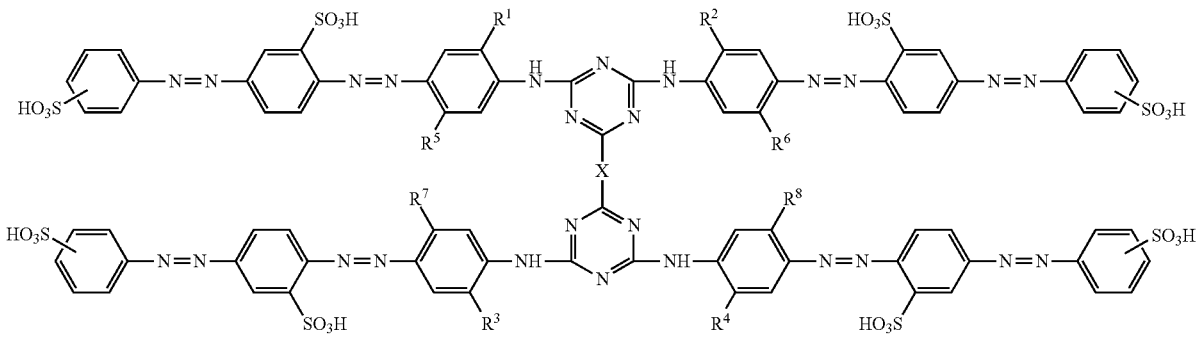

in the formula (2),

R$^1$ to R$^8$ each independently represent a hydrogen atom; a halogen atom; a sulfo group; a carboxy group; a sulfamoyl group; a carbamoyl group; a C1-C4 alkyl group; a C1-C4 alkoxy group; a C1-C4 alkoxy group substituted with at least one group selected from the group consisting of a hydroxy group, a C1-C4 alkoxy group, a hydroxy-C1-C4 alkoxy group, a sulfo group, and a carboxy group; a C1-C4 alkylcarbonylamino group; a C1-C4 alkylcarbonylamino group substituted with a carboxy group; a ureido group; a mono-C1-C4 alkylureido group; a di-C1-C4 alkylureido group; a mono-C1-C4 alkylureido group substituted with at least one group selected from the group consisting of a hydroxy group, a sulfo group, and a carboxy group; a di-C1-C4 alkylureido group substituted with at least one group selected from the group consisting of a hydroxy group, a sulfo group, and a carboxy group; a benzoylamino group; a benzoylamino group having its benzene ring substituted with at least one group selected from the group consisting of a halogen atom, a C1-C4 alkyl group, a nitro group, a sulfo group, and a carboxy group; a benzenesulfonylamino group; or a phenylsulfonylamino group having its benzene ring substituted with at least one group selected from the group consisting of a halogen atom, a C1-C4 alkyl group, a nitro group, a sulfo group, and a carboxy group; and X represents a divalent crosslinking group.

A third aspect of the invention provides the ink composition according to the first or second aspect, wherein in the formula (1) or (2), R$^1$ to R$^8$ each independently represent a hydrogen atom; a halogen atom; a C1-C4 alkyl group; a C1-C4 alkoxy group; a C1-C4 alkoxy group substituted with a sulfo group or a carboxy group; or a C1-C4 alkylcarbonylamino group.

A fourth aspect of the invention provides the ink composition according to any one of the first to third aspects, wherein in the formula (1) or (2), X represents a C1-C8 alkylenediamino group; a C1-C8 alkylenediamino group substituted with a carboxy group; an N—C1-C4 alkyl-C1-C6 alkylenediamino group having its alkyl moiety substituted with a hydroxy group; an amino-C1-C4 alkoxy-C1-C4 alkoxy-C1-C4 alkylamino group; a xylylenediamino group; or a piperazine-1,4-diyl group.

A fifth aspect of the invention provides the ink composition according to any one of the first to fourth aspects, wherein in the formula (1) or (2), at least one of R$^1$ and R$^2$ is a sulfopropoxy group, at least one of R$^3$ and R$^4$ is a sulfopropoxy group, R$^5$ to R$^8$ are a C1-C4 alkyl group, and X is a C2-C4 alkylenediamino group; a C2-C6 alkylenediamino group substituted with a carboxy group; an N—C2-C3 alkyl-C2-C3 alkylenediamino group having its alkyl moiety substituted with a hydroxy group; an amino-C2-C3 alkoxy C2-C3 alkoxy C2-C3 alkylamino group; an m- or p-xylylenediamino group; or a piperazine-1,4-diyl group.

A sixth aspect of the invention provides the ink composition according to any one of the first to fifth aspects, wherein the coloring matter (II) is the compound represented by the following formula (3) or a tautomer thereof or a salt thereof:

(3)

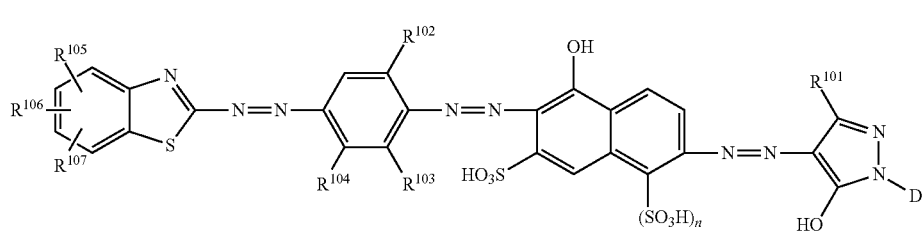

in the formula (3), n is 0 or 1,

R$^{101}$ represents a carboxy group; a C1-C8 alkoxycarbonyl group; a C1-C4 alkyl group which may be substituted with a C1-C8 alkoxycarbonyl group or a carboxy group; or a phenyl group which may be substituted with a hydroxy group, a sulfo group, or a carboxy group;

R$^{102}$ to R$^{104}$ each independently represent a hydrogen atom; a halogen atom; a hydroxy group; a sulfo group; a carboxy group; a sulfamoyl group; a carbamoyl group; a C1-C4 alkyl group; a C1-C4 alkoxy group which may be substituted with at least one group selected from the group consisting of a hydroxy group, a C1-C4 alkoxy group, a hydroxy-C1-C4 alkoxy group, a sulfo group, and a carboxy group; a mono- or di-C1-C4 alkylamino group which may be substituted with at least one group selected from the group consisting of a hydroxy group, a sulfo group, and a carboxy group; a C1-C4 alkylcarbonylamino group which may be substituted with a hydroxy group or a carboxy group; an N'—C1-C4 alkylureido group which may be substituted with at least one group selected from the group consisting of a hydroxy group, a sulfo group, and a carboxy group; a phenylamino group having its benzene ring which may be substituted with at least one group selected from the group consisting of a halogen atom, a C1-C4 alkyl group, a nitro group, a sulfo group, and a carboxy group; a benzoylamino group having its benzene ring which may be substituted with at least one group selected from the group consisting of a halogen atom, a C1-C4 alkyl group, a nitro group, a sulfo group, and a carboxy group; or a phenylsulfonylamino group having its benzene ring which may be substituted with at least one group selected from the group consisting of a halogen atom, a C1-C4 alkyl group, a nitro group, a sulfo group, and a carboxy group;

$R^{105}$ to $R^{107}$ each independently represent a hydrogen atom; a halogen atom; a carboxy group; a sulfo group; a nitro group; a hydroxy group; a carbamoyl group; a sulfamoyl group; a C1-C4 alkyl group; a C1-C4 alkoxy group which may be substituted with at least one group selected from the group consisting of a hydroxy group, a C1-C4 alkoxy group, a sulfo group, and a carboxy group; a C1-C4 alkylsulfonyl group which may be substituted with at least one group selected from the group consisting of a hydroxy group, a sulfo group, and a carboxy group; or a phenylsulfonyl group having its benzene ring which may be substituted with at least one group selected from the group consisting of a halogen atom, a C1-C4 alkyl group, a nitro group, a sulfo group, and a carboxy group; and the group D represents an optionally substituted phenyl group or naphthyl group, wherein in the case where the group D is a substituted phenyl group, the group D has a substituent selected from the group consisting of a hydroxy group; a sulfo group; a carboxy group; a C1-C4 alkyl group; a C1-C4 alkoxy group; an amino group; a mono- or di-C1-C4 alkylamino group; a C1-C4 alkylcarbonylamino group; a benzoylamino group having its benzene ring which may be substituted with a halogen atom, a C1-C4 alkyl group, a nitro group, a sulfo group, or a carboxy group; and a phenylsulfonyloxy group having its benzene ring which may be substituted with a halogen atom, a nitro group, or a C1-C4 alkyl group; or in the case where the group D is a substituted naphthyl group, the group D has a substituent selected from the group consisting of a hydroxy group; a sulfo group; a carboxy group; a C1-C4 alkyl group; a C1-C4 alkoxy group; an amino group; a mono- or di-C1-C4 alkylamino group; a C1-C4 alkylcarbonylamino group; a benzoylamino group having its benzene ring which may be substituted with a halogen atom, a C1-C4 alkyl group, a nitro group, a sulfo group, or a carboxy group; and a phenylsulfonyloxy group having its benzene ring which may be substituted with a halogen atom, a nitro group, or a C1-C4 alkyl group.

A seventh aspect of the invention provides the ink composition according to the sixth aspect, wherein in the formula (3), n is 1,
$R^{101}$ is a carboxy group or a phenyl group,
$R^{102}$ is a C1-C4 alkoxy group substituted with a sulfo group,
$R^{103}$ is a hydrogen atom,
$R^{104}$ is a C1-C4 alkyl group,
$R^{105}$ is a hydrogen atom or a sulfo group,
$R^{106}$ is a hydrogen atom, a halogen atom, a carboxy group, a sulfo group, a C1-C4 alkoxy group, or a C1-C4 alkylsulfonyl group,
$R^{107}$ is a hydrogen atom or a sulfo group, and
the group D is a phenyl group or naphthyl group substituted with at least one group selected from the group consisting of a hydroxy group, a sulfo group, a carboxy group, a C1-C4 alkyl group, and a C1-C4 alkoxy group;

An eighth aspect of the invention provides the ink composition according to the sixth aspect, wherein in the formula (3), n is 1,
$R^{101}$ is a carboxy group,
$R^{102}$ is a C1-C4 alkoxy group substituted with a sulfo group,
$R^{103}$ is a hydrogen atom,
$R^{104}$ is a C1-C4 alkyl group,
$R^{105}$ is a hydrogen atom or a sulfo group,
$R^{106}$ is a C1-C4 alkoxy group,
$R^{107}$ is a hydrogen atom or a sulfo group, and
the group D is a phenyl group or a naphthyl group substituted with a sulfo group.

A ninth aspect of the invention provides the ink composition according to any one of the first to eighth aspects, wherein the ratio of the coloring matter (I) is 10 to 40% by mass, and the ratio of the coloring matter (II) is 10 to 80% by mass in the total mass of the coloring matter contained in the ink composition.

A tenth aspect of the invention provides an ink jet recording method, including performing recording by using the ink composition according to any one of the first to ninth aspects as an ink, discharging droplets of the ink in accordance with a recording signal, and thereby attaching the droplets onto a record-receiving material.

An eleventh aspect of the invention provides the ink jet recording method according to the tenth aspect, wherein the record-receiving material is a communication sheet.

A twelfth aspect of the invention provides the ink jet recording method according to the eleventh aspect, wherein the communication sheet is a sheet having an ink-receiving layer containing a porous white inorganic substance.

A thirteenth aspect of the invention provides a colored body colored by means of the ink composition according to any one of the first to ninth aspects, or the ink jet recording method according to any one of the tenth to twelfth aspects.

A fourteenth aspect of the invention provides an ink jet printer loaded with a container containing the ink composition according to any one of the first to ninth aspects.

Effects of the Invention

According to the present invention, obtained is an aqueous black ink composition exhibiting neutral black with low chroma and color tone, and producing black recorded images having high density of printed images.

PREFERRED MODE FOR CARRYING OUT THE INVENTION

Hereinafter, the present invention will be described in detail.

Meanwhile, in order to avoid complication in the present specification described below, any of "a compound", "a tautomer thereof" and "a salt thereof" is simply described as a "compound". Unless particularly stated otherwise in the present specification, acid functional groups such as a sulfo group and a carboxy group are presented in the form of free acid.

The ink composition of the present invention is an ink composition containing a coloring matter (I), which is a compound represented by a specific formula, and a coloring matter (II), which is an azo compound having λmax in a range of 550 to 660 nm.

The coloring matter (I) contained in the ink composition of the present invention will be described.

The coloring matter (I) contained in the ink composition of the present invention is a compound represented by the formula (1). The coloring matter (I) is composed of at least one kind of a compound represented by the formula (1), and may be a coloring matter composed of a single compound represented by the formula (1), or may be a mixture of coloring matters composed of multiple compounds. Meanwhile, the compound represented by the formula (1) is a water-soluble dye.

In the formula (1), examples of the halogen atom for $R^1$ to $R^8$ include a fluorine atom, a chlorine atom, a bromine atom, and an iodine atom. Among these, a fluorine atom, a chlorine atom and a bromine atom are preferred, and a chlorine atom is particularly preferred.

The C1-C4 alkyl group for $R^1$ to $R^8$ may be a linear or branched alkyl group, and a linear alkyl group is preferred. Specific examples include, for example, linear alkyl groups such as methyl, ethyl, n-propyl and n-butyl; and branched alkyl groups such as isopropyl, isobutyl, sec-butyl, and t-butyl. Specific preferred examples include methyl and ethyl, and methyl is particularly preferred.

The C1-C4 alkoxy group for $R^1$ to $R^8$ may be a linear or branched alkoxy group. Specific examples include linear alkoxy groups such as methoxy, ethoxy, n-propoxy, and n-butoxy; and branched alkoxy groups such as isopropoxy, isobutoxy, sec-butoxy, and t-butoxy. Specific preferred examples include methoxy and ethoxy, and methoxy is particularly preferred.

The C1-C4 alkoxy group substituted with at least one group selected from the group consisting of a hydroxy group, a C1-C4 alkoxy group, a hydroxy-C1-C4 alkoxy group, a sulfo group and a carboxy group for $R^1$ to $R^8$ may be a C1-C4 alkoxy group having these substituents on any arbitrary carbon atoms in the alkoxy group. The number of the substituents is usually one or two, and preferably one. There are no particular limitations on the position of the substituent, but it is preferable that two or more oxygen atoms do not substitute the same carbon atom.

Specific examples include hydroxy-C1-C4 alkoxy groups such as 2-hydroxyethoxy, 2-hydroxypropoxy, and 3-hydroxypropoxy; C1-C4 alkoxy-C1-C4 alkoxy groups such as methoxyethoxy, ethoxyethoxy, n-propoxyethoxy, isopropoxyethoxy, n-butoxyethoxy, methoxypropoxy, ethoxypropoxy, n-propoxypropoxy, isopropoxybutoxy, and n-propoxybutoxy; hydroxy-C1-C4 alkoxy-C1-C4 alkoxy groups such as 2-hydroxyethoxyethoxy; carboxy-C1-C4 alkoxy groups such as carboxymethoxy, 2-carboxyethoxy, and 3-carboxypropoxy; and sulfo-C1-C4 alkoxy groups such as 2-sulfoethoxy, 3-sulfopropoxy, and 4-sulfopropoxy. Among these, 3-sulfopropoxy is particularly preferred.

The C1-C4 alkylcarbonylamino group for $R^1$ to $R^8$ may be a linear or branched alkylcarbonylamino group, and a linear alkylcarbonylamino group is preferred. Specific examples include linear groups such as acetylamino (methylcarbonylamino), ethylcarbonylamino, propylcarbonylamino, and butylcarbonylamino; and branched groups such as isopropylcarbonylamino and t-butylcarbonylamino.

Specific examples of the C1-C4 alkylcarbonylamino group substituted with a carboxy group for $R^1$ to $R^8$ include, for example, carboxy-C1-C4 alkylcarbonylamino groups such as 2-carboxyethylcarbonylamino, and 3-carboxypropylcarbonylamino. The number of substituting carboxy groups is usually one or two, and preferably one.

The mono-C1-C4 alkylureido group for $R^1$ to $R^8$ may be an alkylureido group having a linear or branched alkyl moiety. There are no particular limitations on the position of substitution of the C1-C4 alkyl, but it is preferable that the C1-C4 alkyl be substituted at the position of "N'".

Meanwhile, according to the present specification, the term "mono-C1-C4 alkylureido group" means a "C1-C4 alkyl-NH—CO—NH—" group or a "H$_2$N—CO—N(C1-C4 alkyl)-" group. In the benzene ring to which $R^1$ and $R^8$ are bonded, the nitrogen atom which is directly bonded to the benzene ring is designated as "N", and the nitrogen atom which is bonded to the benzene ring through this nitrogen atom and a carbonyl (CO) group is designated as "N'". Therefore, in regard to the position of substitution of the C1-C4 alkyl, the former indicates "N'", and the latter indicates "N".

Specific examples include linear groups such as N'-ethylureido, N'-propylureido, and N'-butylureido; and branched groups such as N'-isopropylureido, N'-isobutylureido, and N'-t-butylureido.

The di-C1-C4 alkylureido group for $R^1$ to $R^8$ may be a linear or branched alkylureido group. There are no particular limitations on the position of substitution of the C1-C4 alkyl, and those alkylureido groups may have one alkyl each on the "N" and "N'" positions, or having two alkyls on the "N'" position, conforming to the position of substitution in the "mono-C1-C4 alkylureido group", and the latter is preferred. Furthermore, the two C1-C4 alkyls may be identical with or different from each other, but it is preferable that the two alkyls be identical.

Specific examples include linear groups such as N',N'-dimethylureido, N',N'-diethylureido, N',N'-dipropylureido, and N',N'-dibutylureido; and branched groups such as N',N'-diisopropylureido, and N',N'-diisobutylureido.

The mono-C1-C4 alkylureido group substituted with at least one group selected from the group consisting of a hydroxy group, a sulfo group and a carboxy group for $R^1$ to $R^8$ may be a mono-C1-C4 alkylureido group having these substituents on any arbitrary carbon atoms in the alkylureido group. The number of the substituents is usually one or two, and preferably one. There are no particular limitations on the position of substituent, but it is preferable that a nitrogen atom and a hydroxy group do not substitute the same carbon atom.

Specific examples include N'-mono(hydroxy-C1-C4 alkyl)ureido groups such as N'-2-hydroxyethylureido and N'-3-hydroxypropylureido; N'-mono(sulfo-C1-C4 alkyl)ureido groups such as N'-2-sulfoethylureido and N'-3-sulfopropylureido; and N'-mono(carboxy-C1-C4 alkyl)ureido groups such as N'-carboxymethylureido, N'-2-carboxyethylureido, N'-3-carboxypropylureido, and N'-4-carboxybutylureido.

The di-C1-C4 alkylureido group substituted with at least one group selected from the group consisting of a hydroxy group, a sulfo group and a carboxy group for $R^1$ to $R^8$ may be a di-C1-C4 alkylureido group having these substituents on any arbitrary carbon atoms in the dialkylureido group. The number of the substituents is usually one or two, and preferably two. There are no particular limitations on the position of substituent, but it is preferable that a nitrogen atom and a hydroxy group do not substitute the same carbon atom. Furthermore, when the group has plural substituents, the substituents may be of the same kind or of different kinds, but it is preferable that the substituents be the same.

Specific examples include N',N'-di(hydroxy-C1-C4 alkyl) ureido groups such as N',N'-di(2-hydroxyethyl)ureido, N',N'-di(2-hydroxypropyl)ureido, and N',N'-di(3-hydroxypropyl) ureido; N',N'-di(sulfo-C1-C4 alkyl)ureido groups such as N',N'-di(3-sulfopropyl)ureido; and N',N'-di(carboxy-C1-C4 alkyl)ureido groups such as N',N'-di(carboxymethyl)ureido.

The benzoylamino group having its benzene ring substituted with at least one group selected from the group consisting of a halogen atom (examples include a fluorine atom, a chlorine atom, a bromine atom and an iodine atom, and a chlorine atom is particularly preferred), a C1-C4 alkyl group, a nitro group, a sulfo group and a carboxy group for $R^1$ to $R^8$ may be a benzoylamino group having one to three, and preferably one or two, of these substituents. When the group has plural substituents, the substituents may be of the same kind or of different kinds, but it is preferable that the substituents be the same.

Specific examples include halogen atom-substituted benzoyl amino groups such as 2-chlorobenzoylamino, 4-chlorobenzoylamino, and 2,4-dichlorobenzoylamino; C1-C4 alkyl-substituted benzoylamino groups such as 2-methylbenzoylamino, 3-methylbenzoylamino, and 4-methylbenzoylamino; nitro-substituted benzoylamino groups such as 2-nitrobenzoylamino, 4-nitrobenzoylamino, and 3,5-dinitrobenzoylamino; sulfo-substituted benzoylamino groups such as 2-sulfobenzoylamino and 4-sulfobenzoylamino; and carboxy-substituted benzoylamino groups such as 2-carboxybenzoylamino, 4-carboxybenzoylamino, and 3,5-dicarboxybenzoylamino.

The phenylsulfonylamino group having its benzene ring substituted with at least one group selected from the group consisting of a halogen atom, a C1-C4 alkyl group, a nitro group, a sulfo group and a carboxy group for $R^1$ to $R^8$ may be a phenylsulfonylamino group having one to three, preferably one or two, and more preferably one, of these substituents. When the group has plural substituents, the substituents may be of the same kind or of different kinds.

Specific examples include halogen atom-substituted phenylsulfonylamino groups such as 2-chlorophenylsulfonylamino and 4-chlorophenylsulfonylamino; C1-C4 alkyl-substituted phenylsulfonylamino groups such as 2-methylphenylsulfonylamino, 4-methylphenylsulfonylamino, and 4-t-butylphenylsulfonylamino; nitro-substituted phenylsulfonylamino groups such as 2-nitrophenylsulfonylamino, 3-nitrophenylsulfonylamino, and 4-nitrophenylsulfonylamino; sulfo-substituted phenylsulfonylamino groups such as 3-sulfophenylsulfonylamino and 4-sulfophenylsulfonylamino; and carboxy-substituted phenylsulfonylamino groups such as 3-carboxyphenylsulfonylamino and 4-carboxyphenylsulfonylamino.

Among the substituents described above, $R^1$ to $R^8$ are each preferably a hydrogen atom; a halogen atom; a C1-C4 alkyl group; a C1-C4 alkoxy group; a C1-C4 alkoxy group substituted with a sulfo group or a carboxy group; or a C1-C4 alkylcarbonylamino group. Among these, a hydrogen atom, methyl, ethyl, t-butyl, 2-carboxyethoxy, 3-carboxypropoxy, 2-sulfoethoxy, 3-sulfopropoxy, and 4-sulfobutoxy are more preferred. Particularly preferred examples include a hydrogen atom, methyl, and 3-sulfopropoxy.

In the formula (1), it is preferable that at least one of $R^1$ to $R^8$ be a C1-C4 alkoxy group substituted with a sulfo group.

Furthermore, it is more preferable that $R^1$ to $R^4$ each independently represent a hydrogen atom, a C1-C4 alkyl group, or a C1-C4 alkoxy group substituted with a sulfo group, while at least one of $R^1$ to $R^4$ be a C1-C4 alkoxy group substituted with a sulfo group, and $R^5$ to $R^8$ each independently represent a hydrogen atom or a C1-C4 alkyl group.

It is even more preferable that at least one of $R^1$ and $R^2$ be a sulfopropoxy group; at least one of $R^3$ and $R^4$ be a sulfopropoxy group; and $R^5$ to $R^8$ be C1-C4 alkyl groups.

There are no particular limitations on the positions of substitution of $R^1$ to $R^8$, but it is preferable that for the respective benzene rings substituted with these substituents, when the position of substitution of the nitrogen atom bonded to the triazine ring is designated as the 1-position, and the position of substitution of the azo group is designated as the 4-position, $R^1$ to $R^4$ be substituted at the 2-position, and $R^5$ to $R^8$ be substituted at the 5-position.

In the formula (1), X represents a divalent crosslinking group.

The crosslinking group is not particularly limited as long as it is a divalent group to the extent that the compound represented by the formula (1) exhibits solubility in water. Here, in regard to the solubility of the compound represented by the formula (1) in water, it is desirable that the compound represented by the formula (1) dissolve in 1 liter of water in an amount of usually 5 g or more, preferably 10 g or more, more preferably 25 g or more, even more preferably 50 g or more, and particularly preferably 100 g or more.

Specific examples include a divalent atom (preferably a divalent heteroatom) such as a nitrogen atom, an oxygen atom or a sulfur atom; a C1-C8 alkylenediamino group, a C1-C8 alkylenedioxy group or a C1-C8 alkylenedithio group; an N,N'-hydrazinediyl group; a group in which two alkylamino groups are substituted at an oxygen atom, such as an aminoalkoxyalkylamino group; and a group in which an alkylene oxide chain containing one or more ether bonds is substituted with one amino group and one alkylamino group at the chain ends, such as an aminoalkoxyalkoxyalkylamino group.

These divalent crosslinking groups for X may respectively have a group selected from the group consisting of a hydroxy group, a carboxy group and an alkoxy group as a substituent of the carbon atom; and an alkyl group which may be substituted with a hydroxy group or a carboxy group at the alkyl moiety as a substituent for the nitrogen atom.

The divalent crosslinking group for X is preferably any one group selected from the group consisting of a C1-C8 alkylenediamino group; a C1-C8 alkylenediamino group substituted with a hydroxy group or a carboxy group; an N—C1-C4 alkyl-C1-C6 alkylenediamino group; an N—C1-C4 alkyl-C1-C6 alkylenediamino group having its alkyl moiety substituted with a hydroxy group or a carboxy group; an amino-C1-C6 alkoxy-C1-C6 alkylamino group; amino-C1-C4 alkoxy-C1-C4 alkoxy-C1-C4 alkylamino group; a xylylenediamino group; a piperazine-1,4-diyl group; a piperazine-1,4-diyl group substituted with a C1-C4 alkyl group or a C1-C4 alkoxy group; and a phenylenediamino group.

Meanwhile, these divalent crosslinking groups are all "diamino" groups each having two amino groups. Therefore, for example, among the "diamino" groups excluding some groups such as piperazine-1,4-diyl, the present invention includes both the case where crosslinking is achieved at any one of the nitrogen atoms (that is, N,N-diyl is obtained), and the case where crosslinking is achieved at two different nitrogen atoms (that is, N,N'-diyl is obtained). Among these, the latter case of obtaining "N,N'-diyl" is particularly preferred.

The C1-C8 alkylenediamino group for X may be a linear or branched alkylenediamino group, and a linear alkylenediamino group is preferred. The carbon number is usually in the range of C1-C8, preferably C2-C8, more preferably C2-C6, and even more preferably C2-C4.

Specific examples include linear groups such as ethylenediamino, 1,3-propylenediamino, 1,4-butylenediamino, 1,5-pentylenediamino, 1,6-hexylenediamino, 1,7-heptylenediamino, and 1,8-octylenediamino; and branched groups such as 2-methyl-1,3-propylenediamino, 3-methyl-1,4-butylenediamino, and 4-methyl-1,6-hexylenediamino.

The C1-C8 alkylenediamino group substituted with a hydroxy group or a carboxy group for X may be a C1-C8 alkylenediamino group having these substituents on any arbitrary carbon atoms in the alkylenediamino group. There are no particular limitations on the number of the substituents, but the number is preferably one or two. Furthermore, when the group has plural substituents, the substituents may be of the same kind or of different kinds, but it is preferable that the substituents be the same.

Specific examples include hydroxy-substituted C1-C8 alkylenediamino groups such as 2-hydroxy-1,3-propylenediamino, 2-hydroxy-1,4-butylenediamino, and 3-hydroxy-1,6-hexylenediamino; and carboxy-substituted C1-C8 alkylenediamino groups such as 1-carboxyethylenediamino, 1-carboxy-1,3-propylenediamino, 1-carboxy-1,4-butylenediamino, 1-carboxy-1,5-pentylenediamino, and 1,5-dicarboxy-1,5-pentylenediamino.

The N—C1-C4 alkyl-C1-C6 alkylenediamino group for X means that one of the nitrogen atoms of a C1-C6 alkylenediamino group has been substituted with a C1-C4 alkyl group. According to the present specification, in the diamino group, the nitrogen atom substituted with a C1-C4 alkyl group is indicated as "N", and if necessary, the other nitrogen atom is indicated as "N'".

The carbon number of the alkylene moiety is usually in the range of C1-C6, preferably C2-C4, and particularly preferably C2 or C3.

The C1-C4 alkyl group may be a linear or branched alkyl group, and a linear alkyl group is preferred.

Specific examples include N-linear C1-C4 alkyl-C1-C6 alkylenediamino groups such as an N-methylethylenediamino group, an N-ethylethylenediamino group, an N-propylethylenediamino group, and N-butylethylenediamino group; and N-branched C1-C4 alkyl-C1-C6 alkylenediamino groups such as an N-isopropylethylenediamino group, an N-isobutylethylenediamino group, an N-sec-butylethylenediamino group, and N-t-butylethylenediamino group.

The N—C1-C4 alkyl-C1-C6 alkylenediamino group having its alkyl moiety substituted with a hydroxy group or a carboxy group for X may be an N—C1-C4 alkyl-C1-C6 alkylenediamino group having these substituents on any arbitrary carbon atoms of the alkyl moiety of the N—C1-C4 alkyl group. There are no particular limitations on the position of substituents, but it is preferable that a nitrogen atom and a hydroxy group do not substitute the same carbon atom. The carbon number of the alkylene moiety may be in the same range, including preferred ranges, as that of the N—C1-C4 alkyl-C1-C6 alkylenediamino group described above. Furthermore, the carbon number of the alkyl moiety is usually in the range of C1-C4, preferably C2-C4, and more preferably C2-C3.

The number of the substituents is usually one or two, and preferably one. Further, when the group has plural substituents, the substituents may be of the same kind or of different kinds, but it is preferable that the substituents be the same.

Specific examples include N-hydroxy-substituted C1-C4 alkyl-C1-C6 alkylendiamino groups such as an N-(2-hydroxyethyl)ethylenediamino group, an N-(3-hydroxypropyl)ethylenediamino group, an N-(2-hydroxypropyl)ethylenediamino group, and N-(4-hydroxybutyl)ethylenediamino group; and N-carboxy-substituted C1-C4 alkyl-C1-C6 alkylenediamino groups such as an N-(carboxymethyl)ethylenediamino group, an N-(2-carboxyethyl)ethylenediamino group, an N-(3-carboxypropyl)ethylenediamino group, and N-(4-carboxybutyl)ethylenediamino group.

The amino-C1-C6 alkoxy C1-C6 alkylamino group for X may be a linear or branched aminoalkoxyalkylamino group, and a linear group is preferred. In regard to the range of the carbon number, usually an amino-C1-C6 alkoxy C1-C6 alkylamino group, and preferably, an amino-C2-C4 alkoxy C2-C4 alkylamino group may be used, and particularly preferably, an amino-C2-C3 alkoxy C2-C3 alkylamino group may be used. Specific examples include aminoethoxyethylamino, aminoethoxypropylamino, aminopropoxypropylamino, aminoethoxypentylamino and the like.

The amino-C1-C4 alkoxy-C1-C4 alkoxy-C1-C4 alkylamino group for X may be a linear or branched aminoalkoxyalkoxyalkylamino group, and a linear group is preferred. In regard to the range of the carbon number, usually an amino-C1-C4 alkoxy-C1-C4 alkoxy-C1-C4 alkylamino group, and preferably, an amino-C2-C4 alkoxy-C2-C4 alkoxy-C2-C4 alkylamino group may be used, and particularly preferably, an amino-C2-C3 alkoxy-C2-C3 alkoxy-C2-C3 alkylamino group may be used.

Specific examples include linear groups such as aminoethoxyethoxyethylamino, aminoethoxypropoxyethylamino, and aminoethoxybutoxyethylamino; and branched groups such as aminoethoxy(2-methylethoxy)ethylamino, and aminoethoxy(2-methylpropoxy)ethylamino.

The xylylenediamino group for X may be, for example, an o-xylylenediamino group, an m-xylylenediamino group and a p-xylylenediamino group, and an m-xylylenediamino group or p-xylylenediamino group is preferred.

The piperazine-1,4-diyl group substituted with a C1-C4 alkyl group or a C1-C4 alkoxy group for X may be a piperazinediyl group having these substituents on any arbitrary carbon atoms among the ring-constituting atoms of the piperazine ring. The number of the substituents is usually one or two, and preferably one. Furthermore, when the group has plural substituents, the substituents may be of the same kind or of different kinds, but it is preferable that the substituents be the same.

Specific examples include a 2-methylpiperazine-1,4-diyl group, a 2-ethylpiperazine-1,4-diyl group, a 2,5-dimethylpiperazine-1,4-diyl group, a 2,6-dimethylpiperazine-1,4-diyl group, a 2,5-diethylpiperazine-1,4-diyl group, and a 2-methyl-5-ethylpiperazine-1,4-diyl group.

The phenylenediamino group for X may be an o-, m- or p-phenylenediamino group, and an m- or p-phenylenediamino group is preferred.

Among the substituents described above, X is preferably a C1-C8 alkylenediamino group; a C1-C8 alkylenediamino group substituted with a carboxy group; an N—C1-C4 alkyl-C1-C6 alkylenediamino group having its alkyl moiety substituted with a hydroxy group; an amino-C1-C4 alkoxy-C1-C4 alkoxy-C1-C4 alkylamino group; a xylylenediamino group; or a piperazine-1,4-diyl group.

X is more preferably a C2-C4 alkylenediamino group; a C2-C6 alkylenediamino group substituted with a carboxy group; an N—C2-C3 alkyl-C2-C3 alkylenediamino group having its alkyl moiety substituted with a hydroxy group; an amino-C2-C3 alkoxy-C2-C3 alkoxy-C2-C3 alkylamino group; and an m- or p-xylylenediamino group; or a piperazine-1,4-diyl group.

X is even more preferably a C1-C8 alkylenediamino group; a xylylenediamino group; or a piperazine-1,4-diyl group.

Among these, specific preferred examples include 1,2-ethylenediamino; 1,3-propylenediamino; 1,4-butylenediamino; 1-carboxypentylene-1,5-diamino; N-2-hydroxyethylethylenediamino; aminioethoxyethoxyethylamino; m-xylylenediamino; and piperazine-1,4-diyl.

In the above formula (1), the positions of substitution of the four sulfo groups whose respective positions of substitution are not specified, are not particularly limited. The sulfo group substituted at the benzene ring having one azo bond may be substituted at the 2-position, 3-position or 4-position, with respect to the position of substitution of the azo bond as the 1-position, and is preferably substituted at the 4-position.

A preferred example of the azo compound of the present invention represented by the formula (1) is a compound represented by the above formula (2), and a more preferred example is a compound represented by the following formula (4).

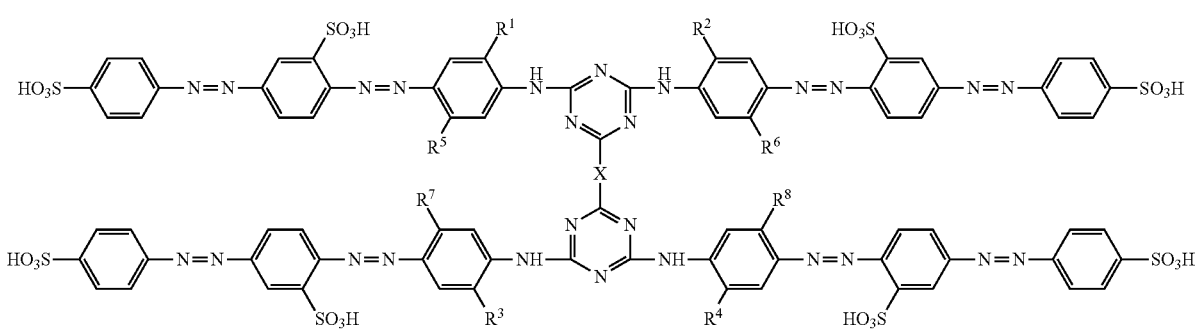

(4)

$R^1$ to $R^8$ and X in the formulae (2) and (4) have the same meanings, including specific examples and preferred examples, as $R^1$ to $R^8$ and X, respectively, as defined for the formula (1).

In regard to $R^1$ to $R^8$ in the formulae (1), (2) and (4) described above, the positions of substitution of $R^1$ to $R^8$ in the formula (2), and the positions of substitution of the sulfo groups whose positions of substitution in the formulae (1) and (2) are not specified, a compound of combinations of preferred examples is more preferable, and a compound of combinations of more preferred examples is even more preferable. The same applies also to combinations of even more preferred examples, combinations of preferred examples and more preferred examples, and the like.

There are no particular limitations on the suitable specific examples of the compound represented by the formula (1), but some suitable specific examples include the compounds presented in the following Tables 1 to 22, etc.

In the respective tables, the functional groups such as a sulfo group and a carboxy group are indicated in the form of free acid, for convenience.

TABLE 1
| Compound No. | Structural formula |
| --- | --- |
| 1 | 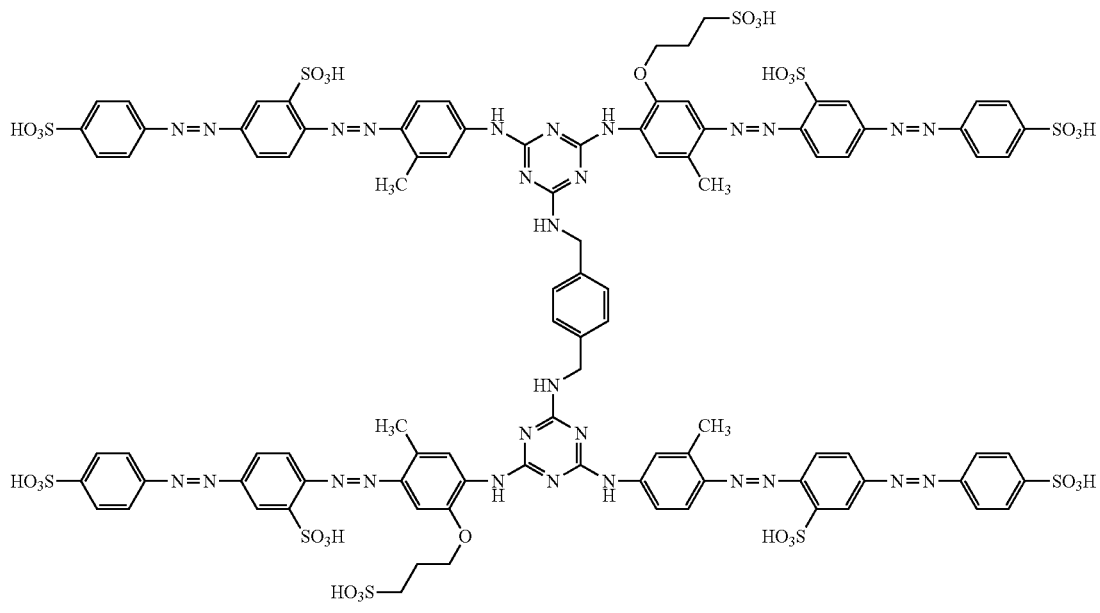 [SMILES: Cc1cc(Nc2nc(NCc3ccc(CNc4nc(Nc5ccc(N=Nc6ccc(N=Nc7ccc(S(=O)(=O)O)cc7)cc6S(=O)(=O)O)c(C)c5)nc(Nc5cc(C)c(N=Nc6ccc(N=Nc7ccc(S(=O)(=O)O)cc7)cc6S(=O)(=O)O)cc5OCCCS(=O)(=O)O)n4)cc3)nc(Nc3cc(C)c(N=Nc4ccc(N=Nc5ccc(S(=O)(=O)O)cc5)cc4S(=O)(=O)O)cc3OCCCS(=O)(=O)O)n2)ccc1N=Nc1ccc(N=Nc2ccc(S(=O)(=O)O)cc2)cc1S(=O)(=O)O] |
| 2 | 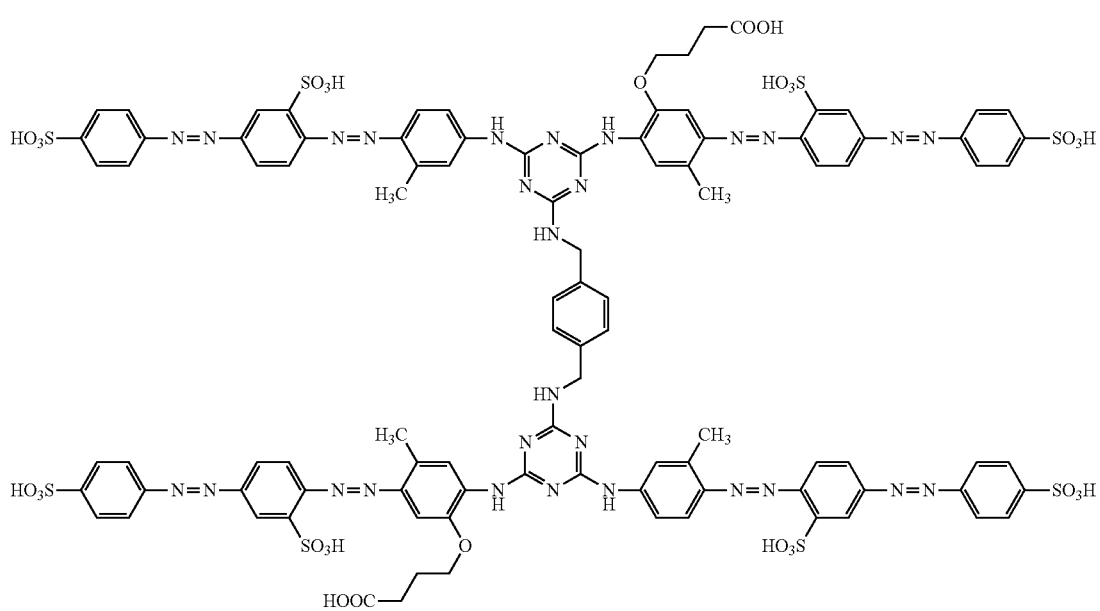 [SMILES: Cc1cc(Nc2nc(NCc3ccc(CNc4nc(Nc5ccc(N=Nc6ccc(N=Nc7ccc(S(=O)(=O)O)cc7)cc6S(=O)(=O)O)c(C)c5)nc(Nc5cc(C)c(N=Nc6ccc(N=Nc7ccc(S(=O)(=O)O)cc7)cc6S(=O)(=O)O)cc5OCCCC(=O)O)n4)cc3)nc(Nc3cc(C)c(N=Nc4ccc(N=Nc5ccc(S(=O)(=O)O)cc5)cc4S(=O)(=O)O)cc3OCCCC(=O)O)n2)ccc1N=Nc1ccc(N=Nc2ccc(S(=O)(=O)O)cc2)cc1S(=O)(=O)O] |

TABLE 1-continued
| Compound No. | Structural formula |
|---|---|
| 3 | 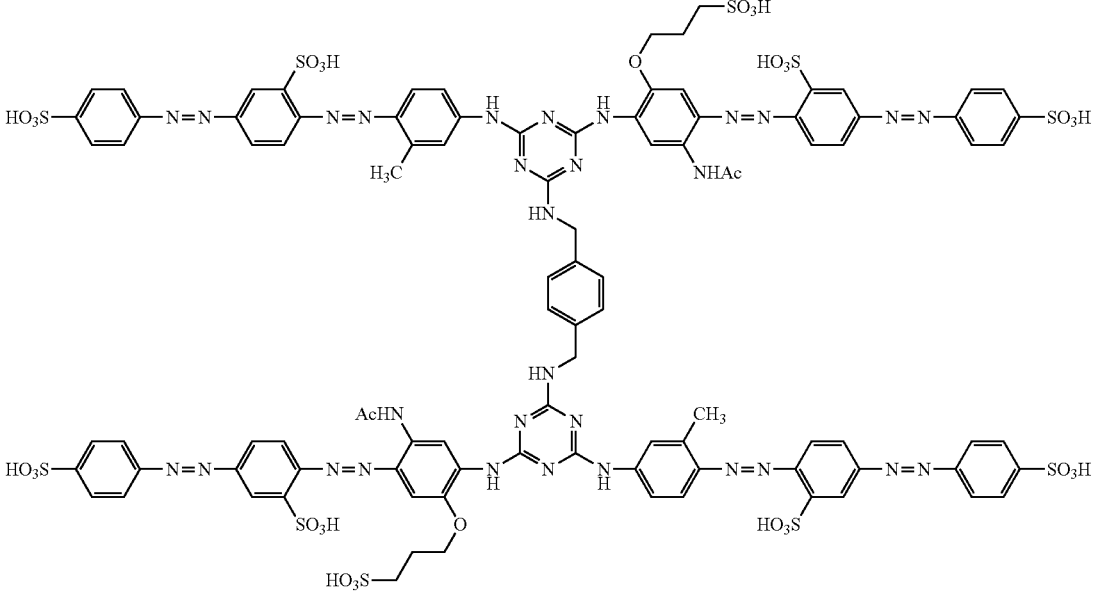 [SMILES: CC(=O)Nc1cc(Nc2nc(NCc3ccc(CNc4nc(Nc5ccc(N=Nc6ccc(N=Nc7ccc(S(=O)(=O)O)cc7)cc6S(=O)(=O)O)c(C)c5)nc(Nc5cc(NC(C)=O)c(N=Nc6ccc(N=Nc7ccc(S(=O)(=O)O)cc7)cc6S(=O)(=O)O)cc5OCCCS(=O)(=O)O)n4)cc3)nc(Nc3ccc(N=Nc4ccc(N=Nc5ccc(S(=O)(=O)O)cc5)cc4S(=O)(=O)O)c(C)c3)n2)c(OCCCS(=O)(=O)O)cc1N=Nc1ccc(N=Nc2ccc(S(=O)(=O)O)cc2)cc1S(=O)(=O)O] |
TABLE 2
| Compound No. | Structural formula |
|---|---|
| 4 | 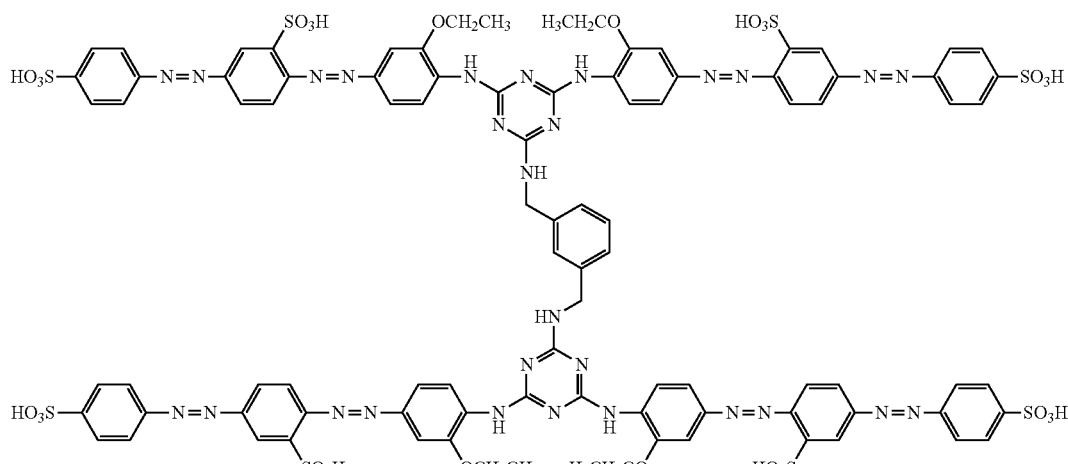 |

TABLE 2-continued

| Compound No. | Structural formula |
|---|---|
| 5 | (chemical structure) |
| 6 | (chemical structure) |

TABLE 3

| Compound No. | Structural formula |
| --- | --- |
| 7 | (structure) |
| 8 | (structure) |

TABLE 3-continued
| Compound No. | Structural formula |
|---|---|
| 9 | 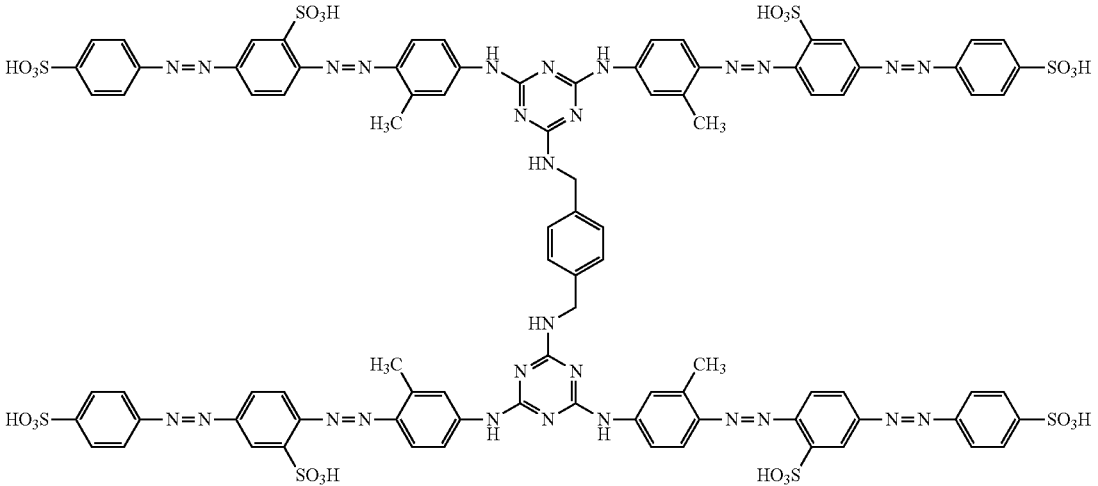 [SMILES: Cc1cc(Nc2nc(NCc3ccc(CNc4nc(Nc5ccc(N=Nc6ccc(N=Nc7ccc(S(=O)(=O)O)cc7)cc6S(=O)(=O)O)c(C)c5)nc(Nc5ccc(N=Nc6ccc(N=Nc7ccc(S(=O)(=O)O)cc7)cc6S(=O)(=O)O)c(C)c5)n4)cc3)nc(Nc3ccc(N=Nc4ccc(N=Nc5ccc(S(=O)(=O)O)cc5)cc4S(=O)(=O)O)c(C)c3)n2)ccc1N=Nc1ccc(N=Nc2ccc(S(=O)(=O)O)cc2)cc1S(=O)(=O)O] |
TABLE 4
| Compound No. | Structural formula |
|---|---|
| 10 | 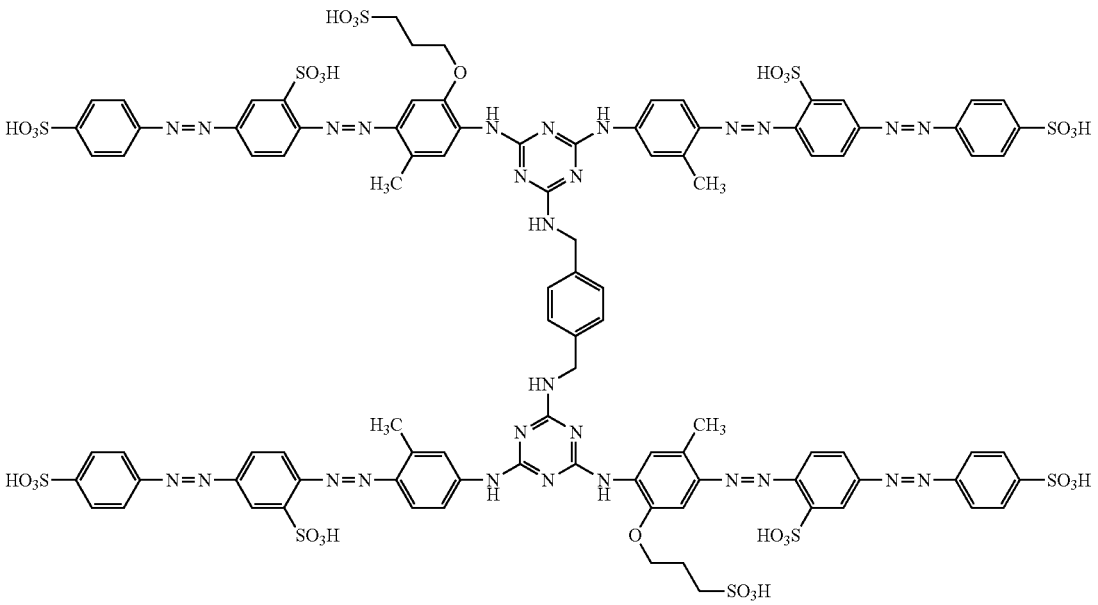 [SMILES: Cc1cc(Nc2nc(NCc3ccc(CNc4nc(Nc5ccc(N=Nc6ccc(N=Nc7ccc(S(=O)(=O)O)cc7)cc6S(=O)(=O)O)c(C)c5)nc(Nc5cc(C)c(N=Nc6ccc(N=Nc7ccc(S(=O)(=O)O)cc7)cc6S(=O)(=O)O)cc5OCCCS(=O)(=O)O)n4)cc3)nc(Nc3cc(C)c(N=Nc4ccc(N=Nc5ccc(S(=O)(=O)O)cc5)cc4S(=O)(=O)O)cc3OCCCS(=O)(=O)O)n2)ccc1N=Nc1ccc(N=Nc2ccc(S(=O)(=O)O)cc2)cc1S(=O)(=O)O] |

TABLE 4-continued
| Compound No. | Structural formula |
|---|---|
| 11 | 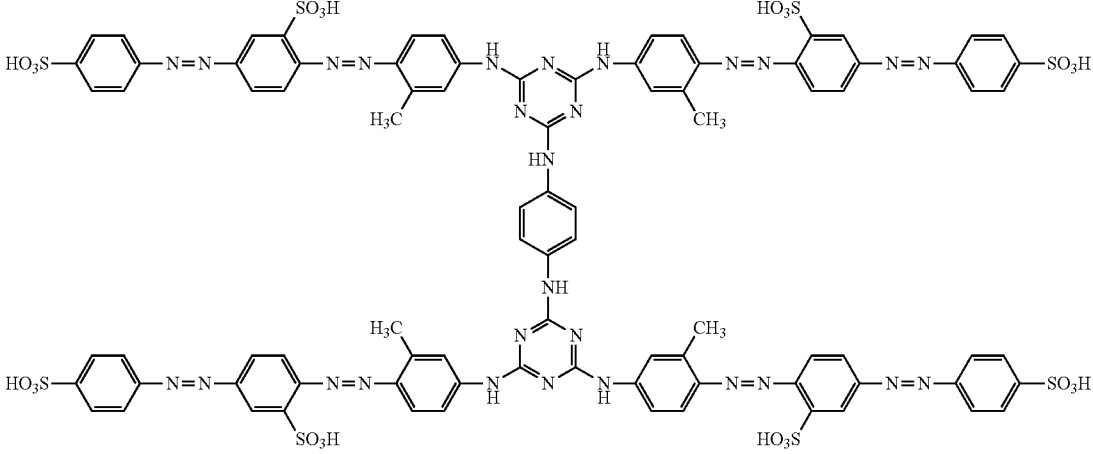 [SMILES: Cc1cc(Nc2nc(Nc3ccc(Nc4nc(Nc5ccc(N=Nc6ccc(N=Nc7ccc(S(=O)(=O)O)cc7)cc6S(=O)(=O)O)c(C)c5)nc(Nc5ccc(N=Nc6ccc(N=Nc7ccc(S(=O)(=O)O)cc7)cc6S(=O)(=O)O)c(C)c5)n4)cc3)nc(Nc3ccc(N=Nc4ccc(N=Nc5ccc(S(=O)(=O)O)cc5)cc4S(=O)(=O)O)c(C)c3)n2)ccc1N=Nc1ccc(N=Nc2ccc(S(=O)(=O)O)cc2)cc1S(=O)(=O)O] |
| 12 | 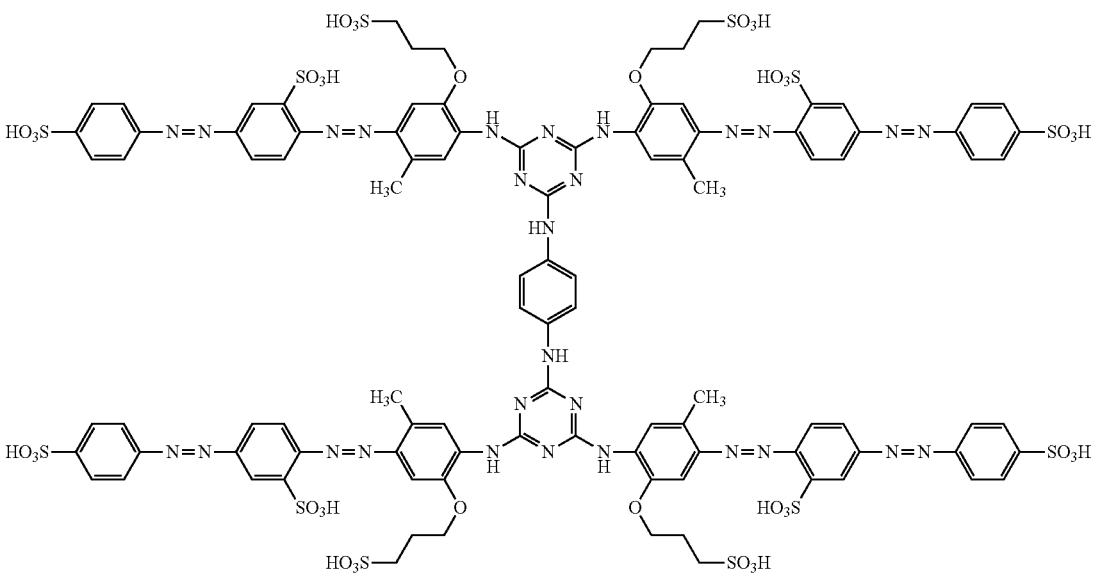 [SMILES: Cc1cc(Nc2nc(Nc3ccc(Nc4nc(Nc5cc(C)c(N=Nc6ccc(N=Nc7ccc(S(=O)(=O)O)cc7)cc6S(=O)(=O)O)cc5OCCCS(=O)(=O)O)nc(Nc5cc(C)c(N=Nc6ccc(N=Nc7ccc(S(=O)(=O)O)cc7)cc6S(=O)(=O)O)cc5OCCCS(=O)(=O)O)n4)cc3)nc(Nc3cc(C)c(N=Nc4ccc(N=Nc5ccc(S(=O)(=O)O)cc5)cc4S(=O)(=O)O)cc3OCCCS(=O)(=O)O)n2)c(OCCCS(=O)(=O)O)cc1N=Nc1ccc(N=Nc2ccc(S(=O)(=O)O)cc2)cc1S(=O)(=O)O] |

TABLE 5
| Compound No. | Structural formula |
| --- | --- |
| 13 | 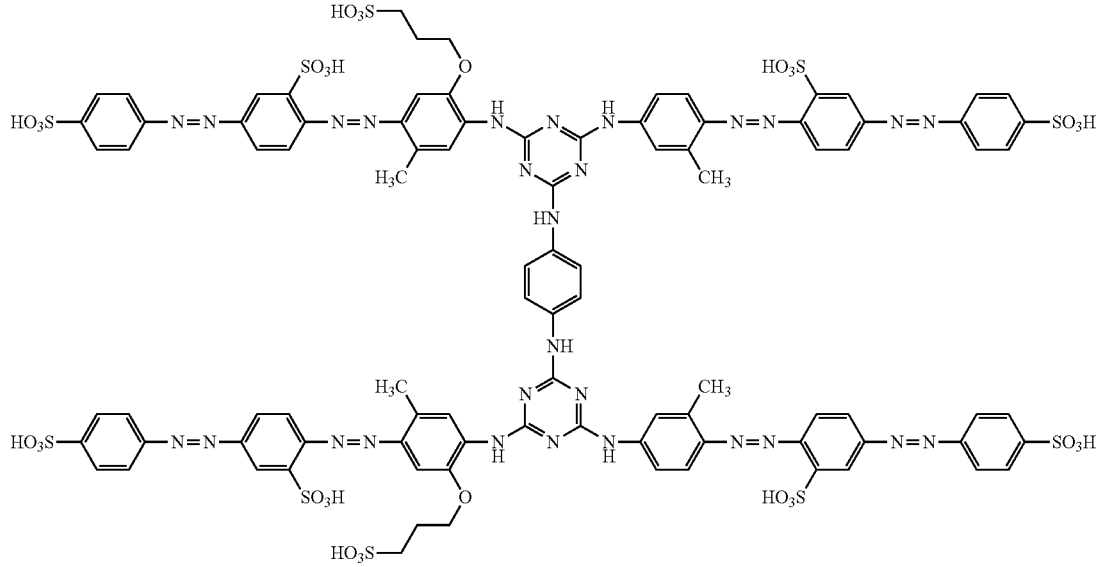 [SMILES: Cc1cc(Nc2nc(Nc3ccc(Nc4nc(Nc5ccc(N=Nc6ccc(N=Nc7ccc(S(=O)(=O)O)cc7)cc6S(=O)(=O)O)c(C)c5)nc(Nc5cc(C)c(N=Nc6ccc(N=Nc7ccc(S(=O)(=O)O)cc7)cc6S(=O)(=O)O)cc5OCCCS(=O)(=O)O)n4)cc3)nc(Nc3cc(C)c(N=Nc4ccc(N=Nc5ccc(S(=O)(=O)O)cc5)cc4S(=O)(=O)O)cc3OCCCS(=O)(=O)O)n2)ccc1N=Nc1ccc(N=Nc2ccc(S(=O)(=O)O)cc2)cc1S(=O)(=O)O] |
| 14 | 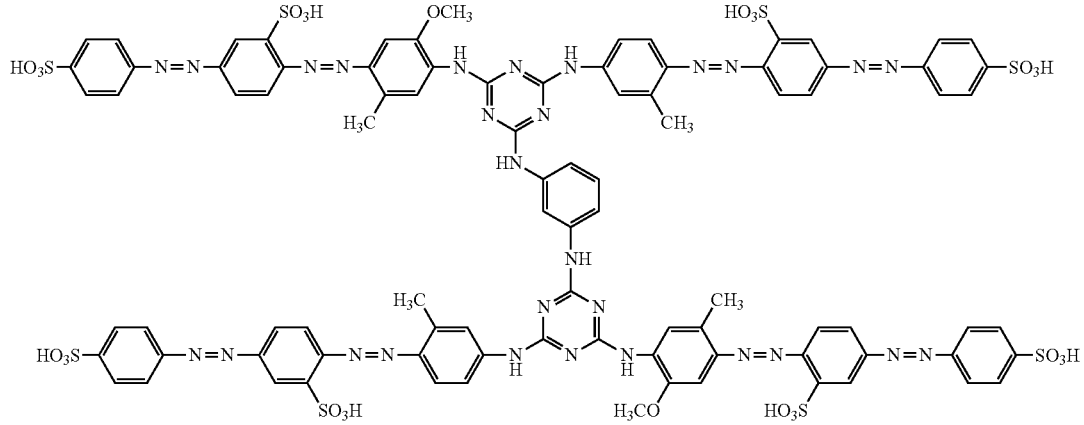 [SMILES: COc1cc(N=Nc2ccc(N=Nc3ccc(S(=O)(=O)O)cc3)cc2S(=O)(=O)O)c(C)cc1Nc1nc(Nc2cccc(Nc3nc(Nc4ccc(N=Nc5ccc(N=Nc6ccc(S(=O)(=O)O)cc6)cc5S(=O)(=O)O)c(C)c4)nc(Nc4cc(C)c(N=Nc5ccc(N=Nc6ccc(S(=O)(=O)O)cc6)cc5S(=O)(=O)O)cc4OC)n3)c2)nc(Nc2ccc(N=Nc3ccc(N=Nc4ccc(S(=O)(=O)O)cc4)cc3S(=O)(=O)O)c(C)c2)n1] |
| 15 | 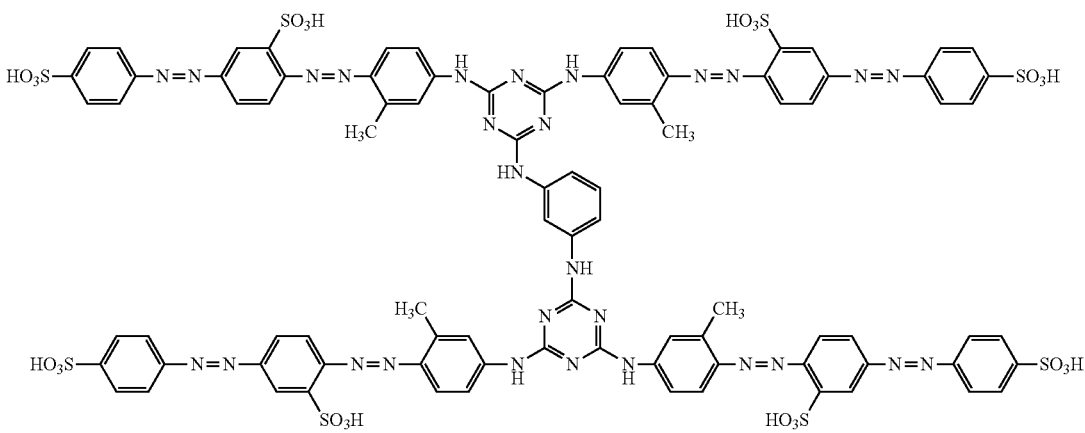 [SMILES: Cc1cc(Nc2nc(Nc3cccc(Nc4nc(Nc5ccc(N=Nc6ccc(N=Nc7ccc(S(=O)(=O)O)cc7)cc6S(=O)(=O)O)c(C)c5)nc(Nc5ccc(N=Nc6ccc(N=Nc7ccc(S(=O)(=O)O)cc7)cc6S(=O)(=O)O)c(C)c5)n4)c3)nc(Nc3ccc(N=Nc4ccc(N=Nc5ccc(S(=O)(=O)O)cc5)cc4S(=O)(=O)O)c(C)c3)n2)ccc1N=Nc1ccc(N=Nc2ccc(S(=O)(=O)O)cc2)cc1S(=O)(=O)O] |

TABLE 5-continued

| Compound No. | Structural formula |
|---|---|
| 16 | (structure shown) |

TABLE 6

| Compound No. | Structural formula |
|---|---|
| 17 | (structure shown) |

TABLE 6-continued

| Compound No. | Structural formula |
|---|---|
| 18 | |
| 19 | |
| 20 | |

TABLE 7
| Compound No. | Structural formula |
|---|---|
| 21 | 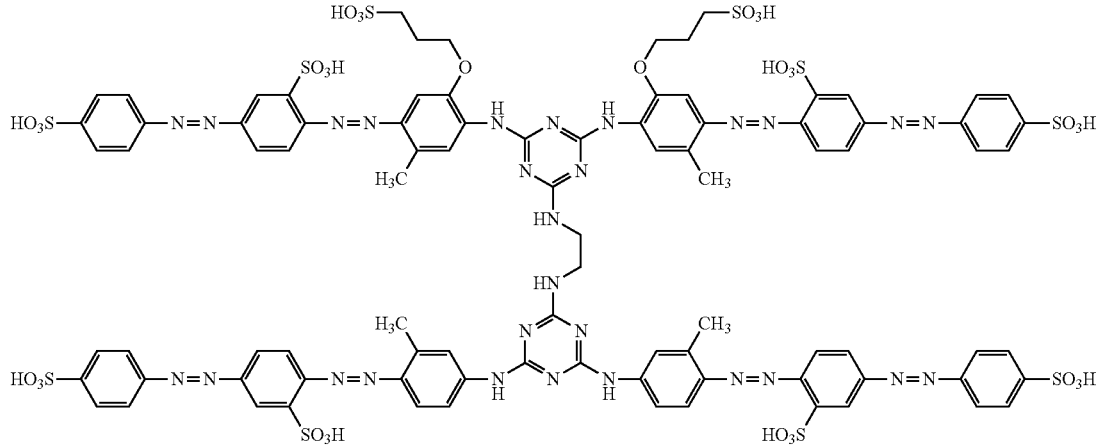 [SMILES: Cc1cc(Nc2nc(NCCNc3nc(Nc4cc(C)c(N=Nc5ccc(N=Nc6ccc(S(=O)(=O)O)cc6)cc5S(=O)(=O)O)cc4OCCCS(=O)(=O)O)nc(Nc4cc(C)c(N=Nc5ccc(N=Nc6ccc(S(=O)(=O)O)cc6)cc5S(=O)(=O)O)cc4OCCCS(=O)(=O)O)n3)nc(Nc3ccc(N=Nc4ccc(N=Nc5ccc(S(=O)(=O)O)cc5)cc4S(=O)(=O)O)c(C)c3)n2)ccc1N=Nc1ccc(N=Nc2ccc(S(=O)(=O)O)cc2)cc1S(=O)(=O)O] |
| 22 | 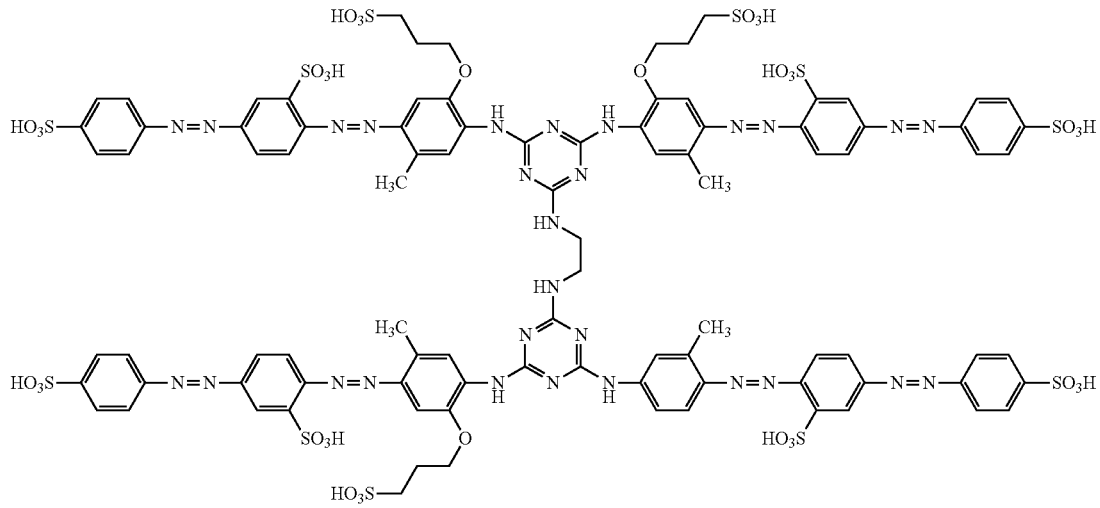 [SMILES: Cc1cc(Nc2nc(NCCNc3nc(Nc4cc(C)c(N=Nc5ccc(N=Nc6ccc(S(=O)(=O)O)cc6)cc5S(=O)(=O)O)cc4OCCCS(=O)(=O)O)nc(Nc4cc(C)c(N=Nc5ccc(N=Nc6ccc(S(=O)(=O)O)cc6)cc5S(=O)(=O)O)cc4OCCCS(=O)(=O)O)n3)nc(Nc3cc(C)c(N=Nc4ccc(N=Nc5ccc(S(=O)(=O)O)cc5)cc4S(=O)(=O)O)cc3OCCCS(=O)(=O)O)n2)ccc1N=Nc1ccc(N=Nc2ccc(S(=O)(=O)O)cc2)cc1S(=O)(=O)O] |
| 23 | 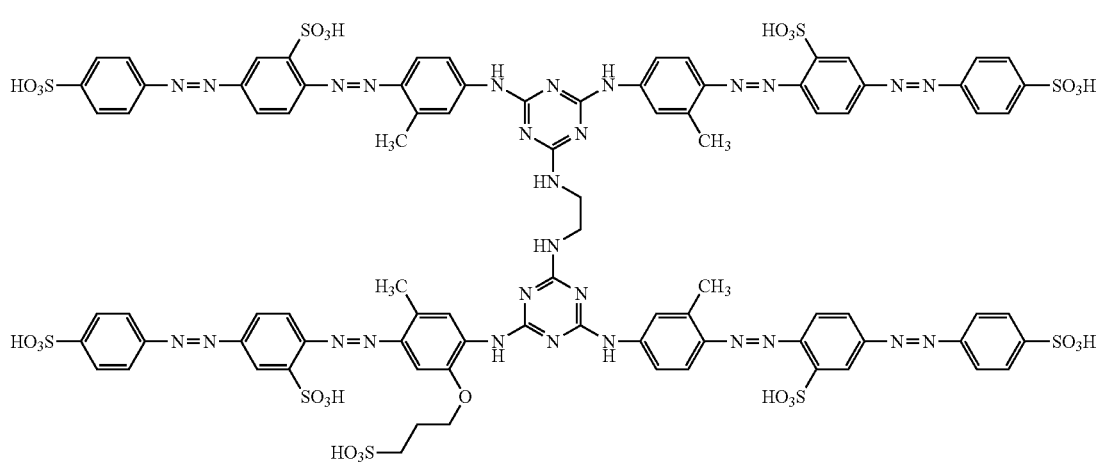 [SMILES: Cc1cc(Nc2nc(NCCNc3nc(Nc4ccc(N=Nc5ccc(N=Nc6ccc(S(=O)(=O)O)cc6)cc5S(=O)(=O)O)c(C)c4)nc(Nc4cc(C)c(N=Nc5ccc(N=Nc6ccc(S(=O)(=O)O)cc6)cc5S(=O)(=O)O)cc4OCCCS(=O)(=O)O)n3)nc(Nc3ccc(N=Nc4ccc(N=Nc5ccc(S(=O)(=O)O)cc5)cc4S(=O)(=O)O)c(C)c3)n2)ccc1N=Nc1ccc(N=Nc2ccc(S(=O)(=O)O)cc2)cc1S(=O)(=O)O] |

TABLE 7-continued

| Compound No. | Structural formula |
|---|---|
| 24 | (structure) |

TABLE 8

| Compound No. | Structural formula |
|---|---|
| 25 | (structure) |

TABLE 8-continued
| Compound No. | Structural formula |
|---|---|
| 26 | 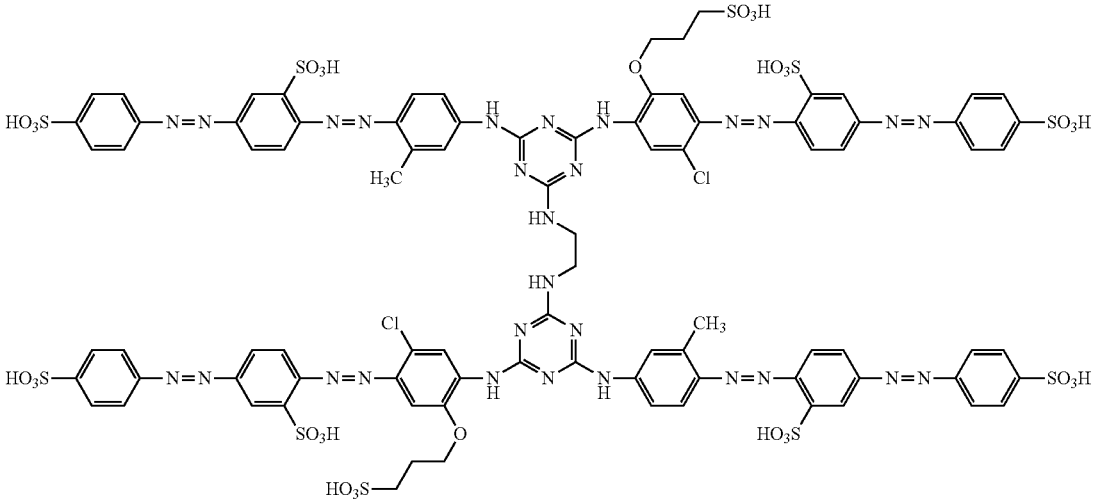 |
| 27 | 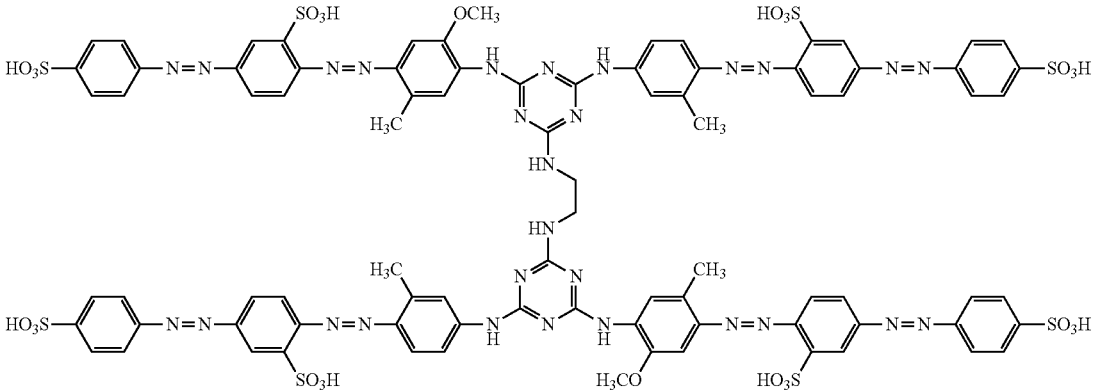 [SMILES: COc1cc(N=Nc2ccc(N=Nc3ccc(S(=O)(=O)O)cc3)cc2S(=O)(=O)O)c(C)cc1Nc1nc(NCCNc2nc(Nc3ccc(N=Nc4ccc(N=Nc5ccc(S(=O)(=O)O)cc5)cc4S(=O)(=O)O)c(C)c3)nc(Nc3cc(C)c(N=Nc4ccc(N=Nc5ccc(S(=O)(=O)O)cc5)cc4S(=O)(=O)O)cc3OC)n2)nc(Nc2ccc(N=Nc3ccc(N=Nc4ccc(S(=O)(=O)O)cc4)cc3S(=O)(=O)O)c(C)c2)n1] |
| 28 | 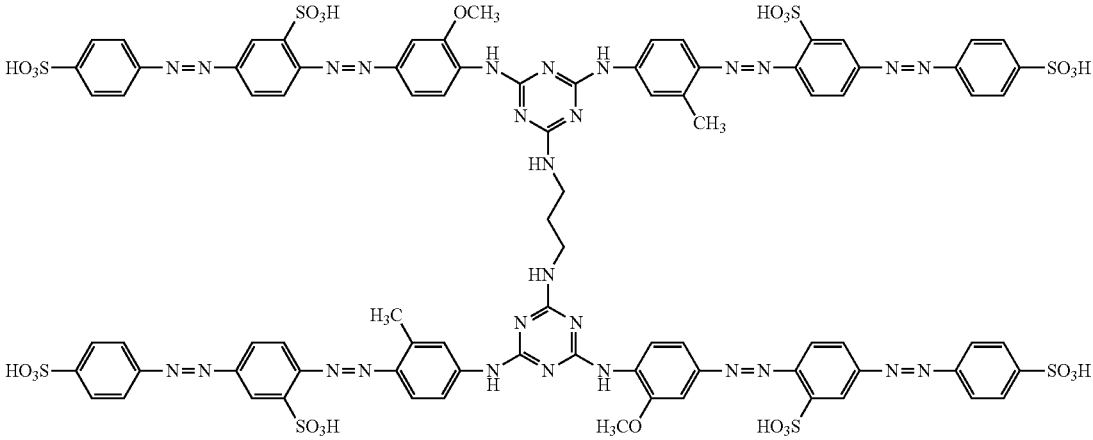 [SMILES: COc1cc(N=Nc2ccc(N=Nc3ccc(S(=O)(=O)O)cc3)cc2S(=O)(=O)O)ccc1Nc1nc(NCCCNc2nc(Nc3ccc(N=Nc4ccc(N=Nc5ccc(S(=O)(=O)O)cc5)cc4S(=O)(=O)O)c(C)c3)nc(Nc3ccc(N=Nc4ccc(N=Nc5ccc(S(=O)(=O)O)cc5)cc4S(=O)(=O)O)cc3OC)n2)nc(Nc2ccc(N=Nc3ccc(N=Nc4ccc(S(=O)(=O)O)cc4)cc3S(=O)(=O)O)c(C)c2)n1] |

TABLE 9
| Compound No. | Structural formula |
|---|---|
| 29 | 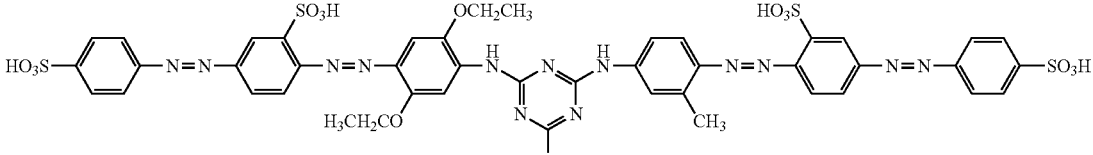 |
| 30 | 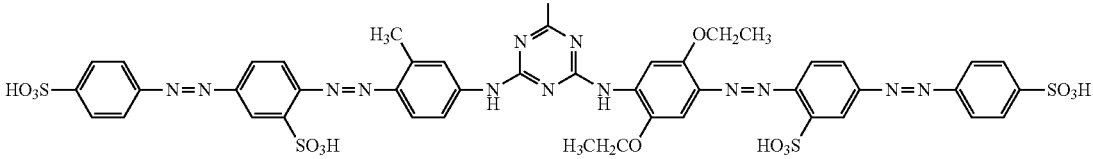 |
| 31 | 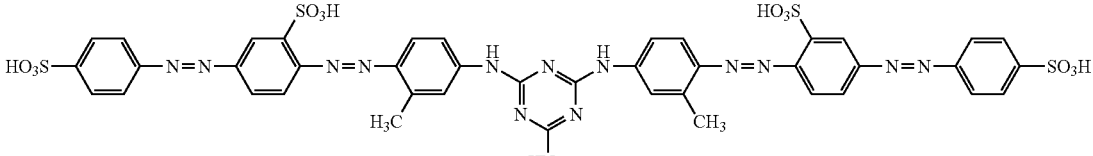 |

TABLE 9-continued
| Compound No. | Structural formula |
|---|---|
| 32 | 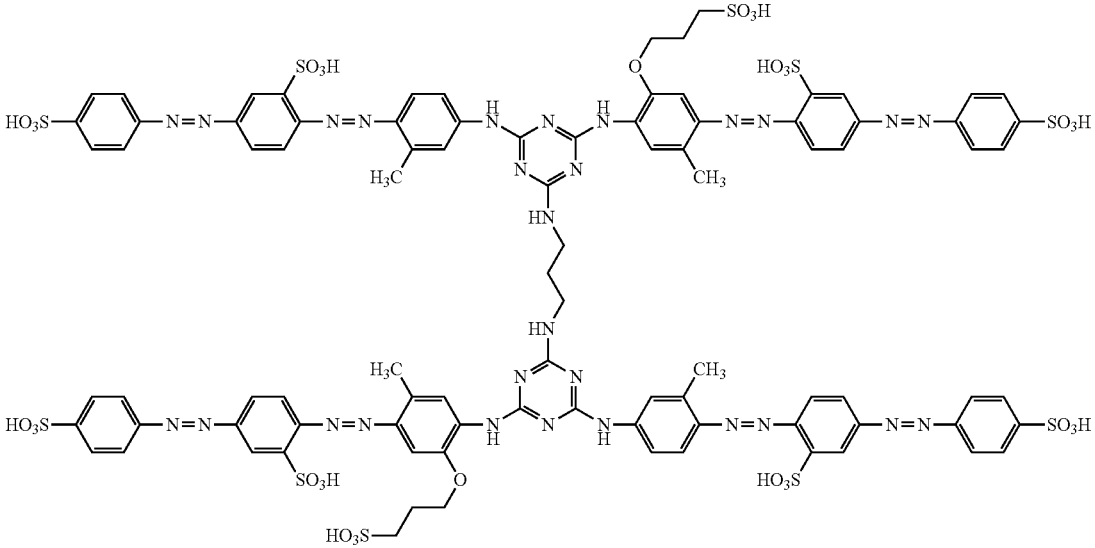 [SMILES: Cc1cc(Nc2nc(NCCCNc3nc(Nc4ccc(N=Nc5ccc(N=Nc6ccc(S(=O)(=O)O)cc6)cc5S(=O)(=O)O)c(C)c4)nc(Nc4cc(C)c(N=Nc5ccc(N=Nc6ccc(S(=O)(=O)O)cc6)cc5S(=O)(=O)O)cc4OCCCS(=O)(=O)O)n3)nc(Nc3cc(C)c(N=Nc4ccc(N=Nc5ccc(S(=O)(=O)O)cc5)cc4S(=O)(=O)O)cc3OCCCS(=O)(=O)O)n2)ccc1N=Nc1ccc(N=Nc2ccc(S(=O)(=O)O)cc2)cc1S(=O)(=O)O] |
TABLE 10
| Compound No. | Structural formula |
|---|---|
| 33 | 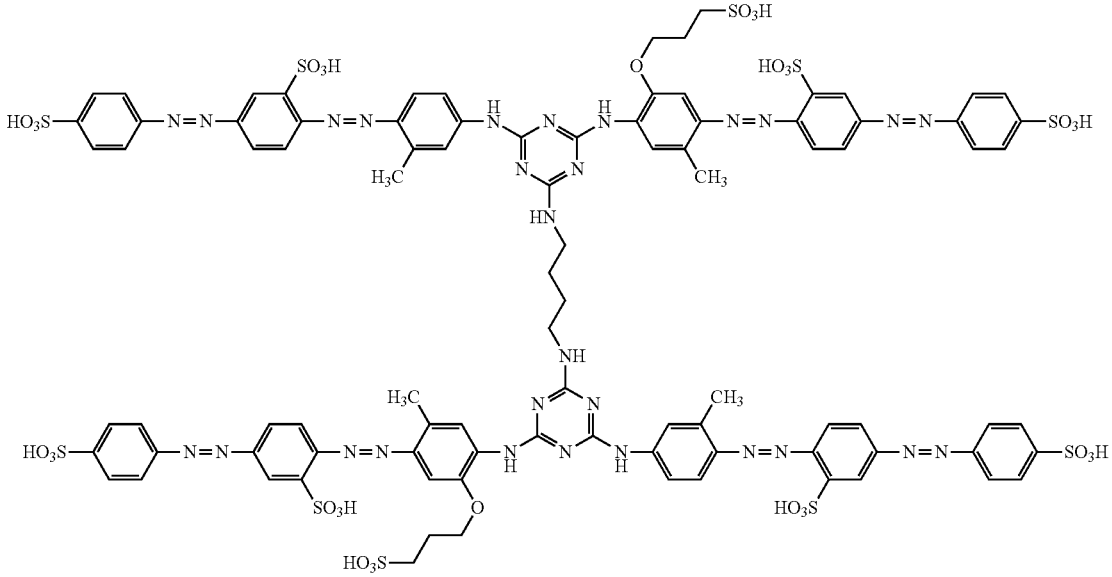 [SMILES: Cc1cc(Nc2nc(NCCCCNc3nc(Nc4ccc(N=Nc5ccc(N=Nc6ccc(S(=O)(=O)O)cc6)cc5S(=O)(=O)O)c(C)c4)nc(Nc4cc(C)c(N=Nc5ccc(N=Nc6ccc(S(=O)(=O)O)cc6)cc5S(=O)(=O)O)cc4OCCCS(=O)(=O)O)n3)nc(Nc3cc(C)c(N=Nc4ccc(N=Nc5ccc(S(=O)(=O)O)cc5)cc4S(=O)(=O)O)cc3OCCCS(=O)(=O)O)n2)ccc1N=Nc1ccc(N=Nc2ccc(S(=O)(=O)O)cc2)cc1S(=O)(=O)O] |

TABLE 10-continued
| Compound No. | Structural formula |
|---|---|
| 34 | 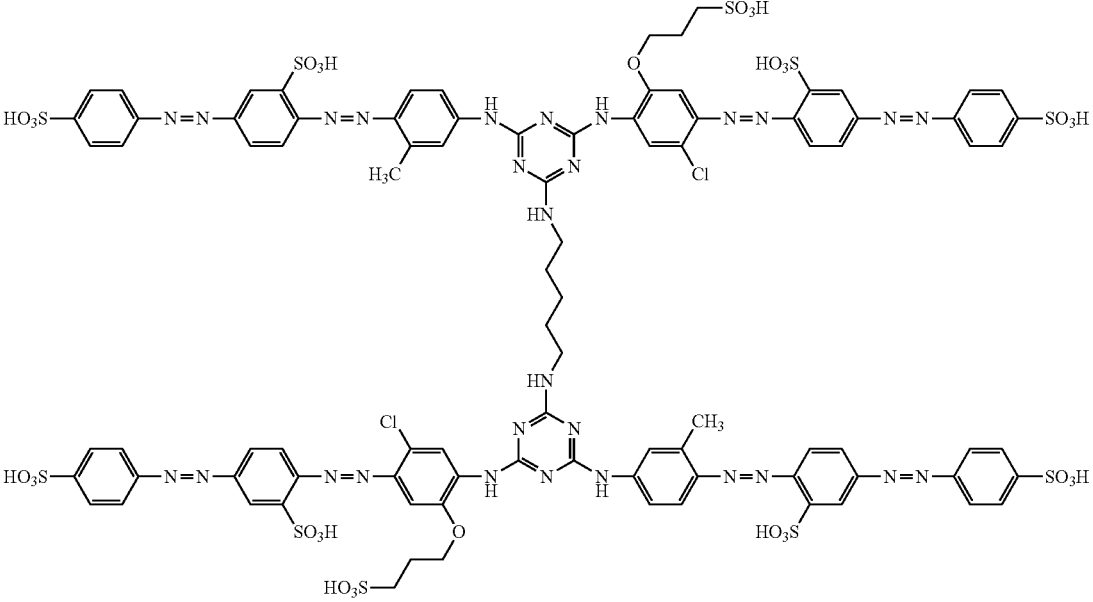 [SMILES: Cc1cc(Nc2nc(NCCCCCNc3nc(Nc4ccc(N=Nc5ccc(N=Nc6ccc(S(=O)(=O)O)cc6)cc5S(=O)(=O)O)c(C)c4)nc(Nc4cc(Cl)c(N=Nc5ccc(N=Nc6ccc(S(=O)(=O)O)cc6)cc5S(=O)(=O)O)cc4OCCCS(=O)(=O)O)n3)nc(Nc3cc(Cl)c(N=Nc4ccc(N=Nc5ccc(S(=O)(=O)O)cc5)cc4S(=O)(=O)O)cc3OCCCS(=O)(=O)O)n2)ccc1N=Nc1ccc(N=Nc2ccc(S(=O)(=O)O)cc2)cc1S(=O)(=O)O] |
| 35 | 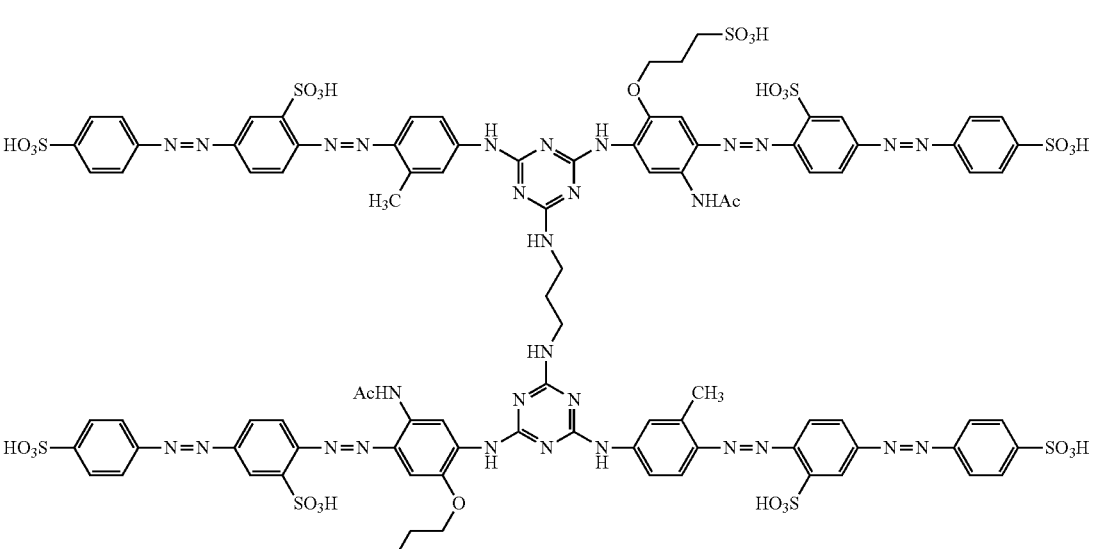 |

TABLE 11
| Compound No. | Structural formula |
|---|---|
| 36 | 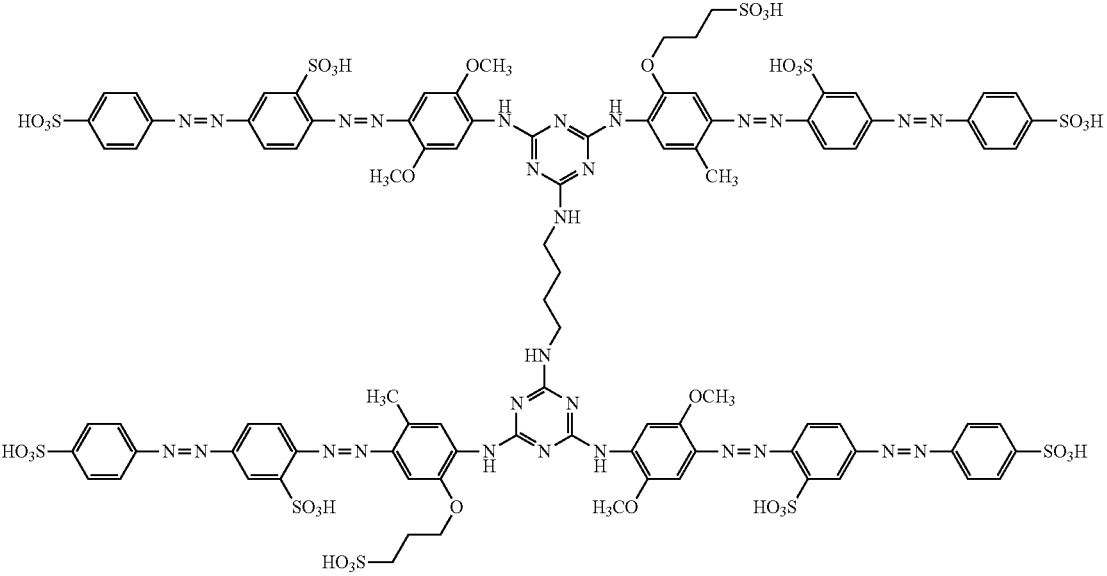 [SMILES: COc1cc(Nc2nc(NCCCCNc3nc(Nc4cc(OC)c(N=Nc5ccc(N=Nc6ccc(S(=O)(=O)O)cc6)cc5S(=O)(=O)O)cc4OC)nc(Nc4cc(C)c(N=Nc5ccc(N=Nc6ccc(S(=O)(=O)O)cc6)cc5S(=O)(=O)O)cc4OCCCS(=O)(=O)O)n3)nc(Nc3cc(C)c(N=Nc4ccc(N=Nc5ccc(S(=O)(=O)O)cc5)cc4S(=O)(=O)O)cc3OCCCS(=O)(=O)O)n2)c(OC)cc1N=Nc1ccc(N=Nc2ccc(S(=O)(=O)O)cc2)cc1S(=O)(=O)O] |
| 37 | 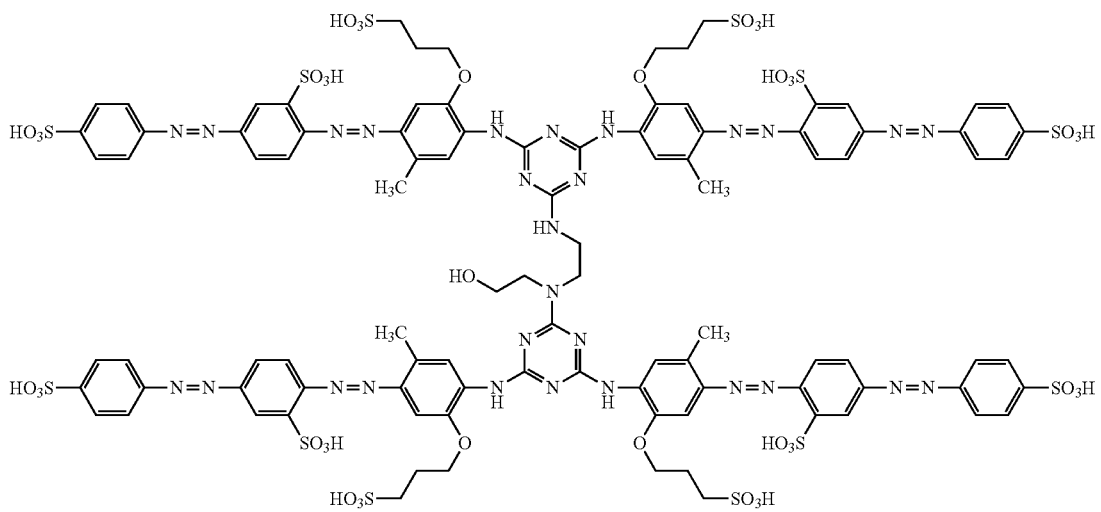 [SMILES: Cc1cc(Nc2nc(NCCN(CCO)c3nc(Nc4cc(C)c(N=Nc5ccc(N=Nc6ccc(S(=O)(=O)O)cc6)cc5S(=O)(=O)O)cc4OCCCS(=O)(=O)O)nc(Nc4cc(C)c(N=Nc5ccc(N=Nc6ccc(S(=O)(=O)O)cc6)cc5S(=O)(=O)O)cc4OCCCS(=O)(=O)O)n3)nc(Nc3cc(C)c(N=Nc4ccc(N=Nc5ccc(S(=O)(=O)O)cc5)cc4S(=O)(=O)O)cc3OCCCS(=O)(=O)O)n2)c(OCCCS(=O)(=O)O)cc1N=Nc1ccc(N=Nc2ccc(S(=O)(=O)O)cc2)cc1S(=O)(=O)O] |

TABLE 11-continued
| Compound No. | Structural formula |
|---|---|
| 38 | 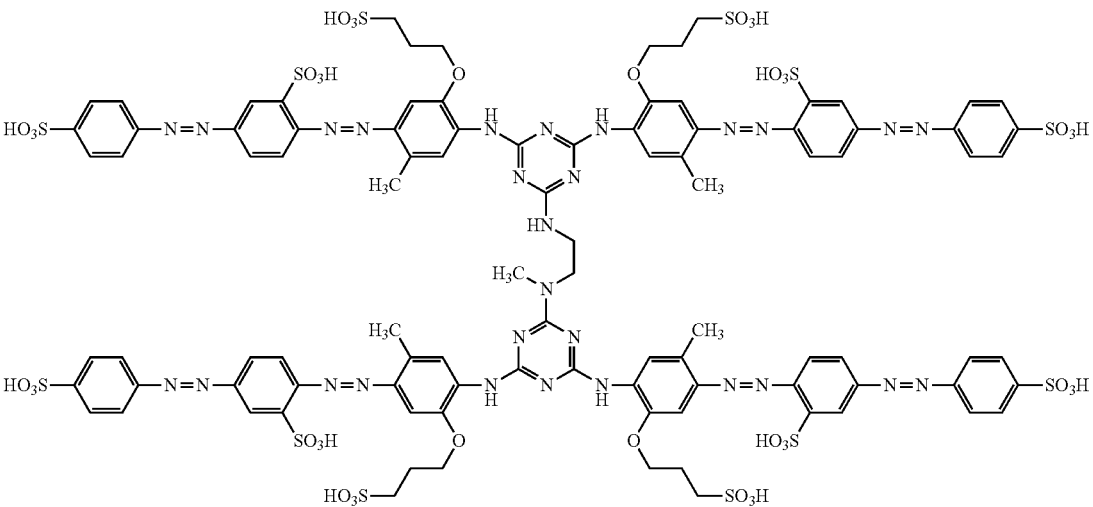 [SMILES: Cc1cc(Nc2nc(NCCN(C)c3nc(Nc4cc(C)c(N=Nc5ccc(N=Nc6ccc(S(=O)(=O)O)cc6)cc5S(=O)(=O)O)cc4OCCCS(=O)(=O)O)nc(Nc4cc(C)c(N=Nc5ccc(N=Nc6ccc(S(=O)(=O)O)cc6)cc5S(=O)(=O)O)cc4OCCCS(=O)(=O)O)n3)nc(Nc3cc(C)c(N=Nc4ccc(N=Nc5ccc(S(=O)(=O)O)cc5)cc4S(=O)(=O)O)cc3OCCCS(=O)(=O)O)n2)c(OCCCS(=O)(=O)O)cc1N=Nc1ccc(N=Nc2ccc(S(=O)(=O)O)cc2)cc1S(=O)(=O)O] |
TABLE 12
| Compound No. | Structural formula |
|---|---|
| 39 | 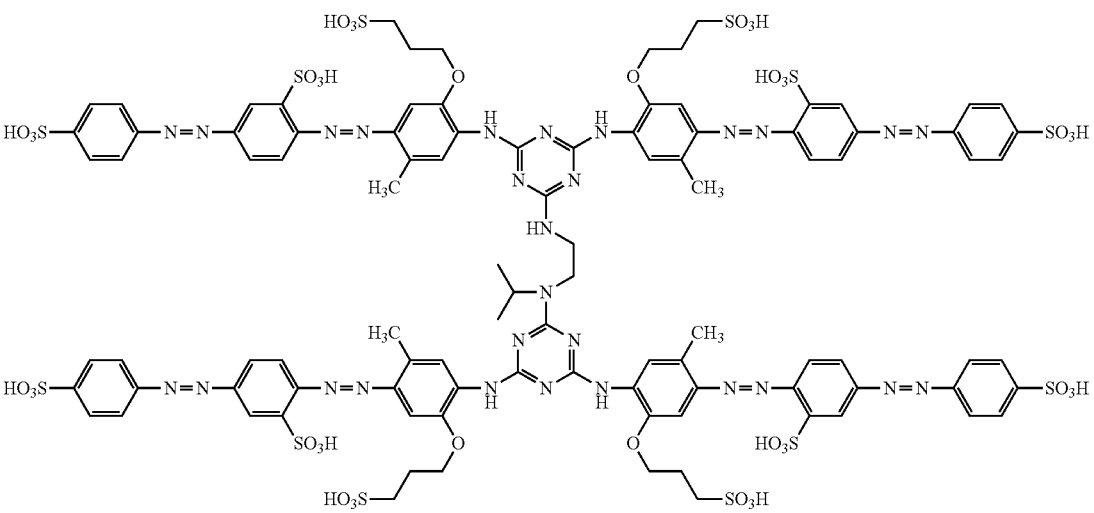 [SMILES: Cc1cc(Nc2nc(NCCN(c3nc(Nc4cc(C)c(N=Nc5ccc(N=Nc6ccc(S(=O)(=O)O)cc6)cc5S(=O)(=O)O)cc4OCCCS(=O)(=O)O)nc(Nc4cc(C)c(N=Nc5ccc(N=Nc6ccc(S(=O)(=O)O)cc6)cc5S(=O)(=O)O)cc4OCCCS(=O)(=O)O)n3)C(C)C)nc(Nc3cc(C)c(N=Nc4ccc(N=Nc5ccc(S(=O)(=O)O)cc5)cc4S(=O)(=O)O)cc3OCCCS(=O)(=O)O)n2)c(OCCCS(=O)(=O)O)cc1N=Nc1ccc(N=Nc2ccc(S(=O)(=O)O)cc2)cc1S(=O)(=O)O] |

TABLE 12-continued
| Compound No. | Structural formula |
|---|---|
| 40 | 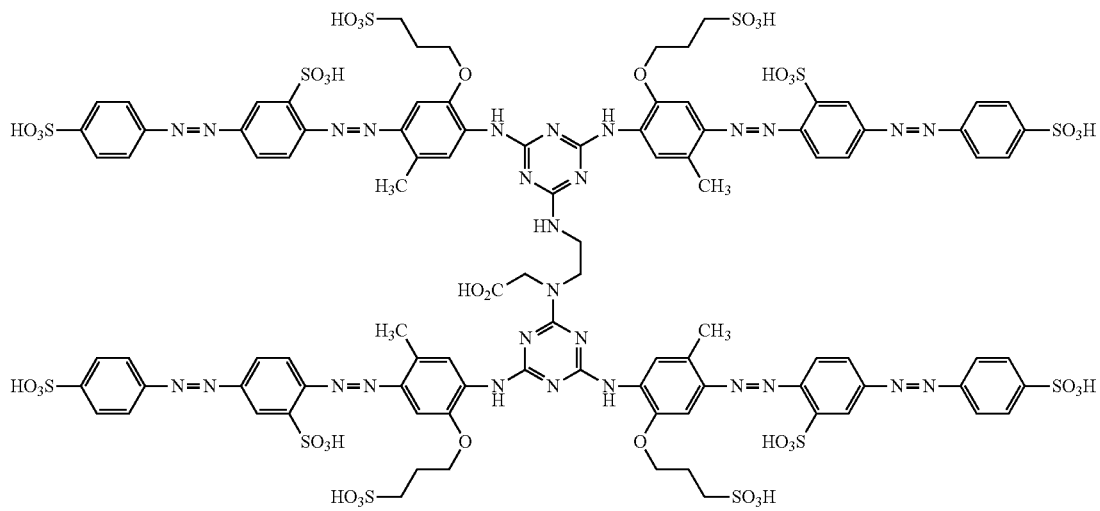 [SMILES: Cc1cc(Nc2nc(NCCN(CC(=O)O)c3nc(Nc4cc(C)c(N=Nc5ccc(N=Nc6ccc(S(=O)(=O)O)cc6)cc5S(=O)(=O)O)cc4OCCCS(=O)(=O)O)nc(Nc4cc(C)c(N=Nc5ccc(N=Nc6ccc(S(=O)(=O)O)cc6)cc5S(=O)(=O)O)cc4OCCCS(=O)(=O)O)n3)nc(Nc3cc(C)c(N=Nc4ccc(N=Nc5ccc(S(=O)(=O)O)cc5)cc4S(=O)(=O)O)cc3OCCCS(=O)(=O)O)n2)c(OCCCS(=O)(=O)O)cc1N=Nc1ccc(N=Nc2ccc(S(=O)(=O)O)cc2)cc1S(=O)(=O)O] |
| 41 | 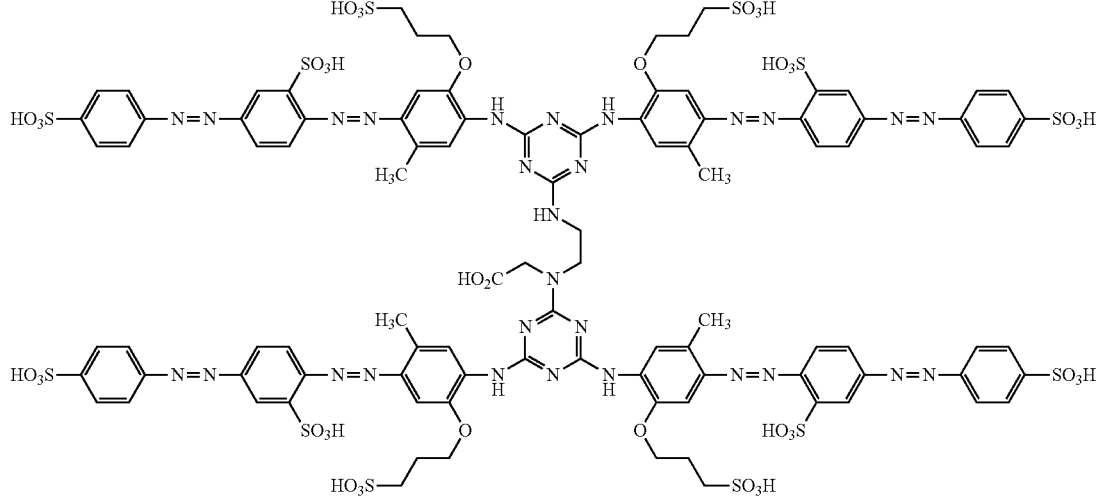 [SMILES: Cc1cc(Nc2nc(NCCN(CC(=O)O)c3nc(Nc4cc(C)c(N=Nc5ccc(N=Nc6ccc(S(=O)(=O)O)cc6)cc5S(=O)(=O)O)cc4OCCCS(=O)(=O)O)nc(Nc4cc(C)c(N=Nc5ccc(N=Nc6ccc(S(=O)(=O)O)cc6)cc5S(=O)(=O)O)cc4OCCCS(=O)(=O)O)n3)nc(Nc3cc(C)c(N=Nc4ccc(N=Nc5ccc(S(=O)(=O)O)cc5)cc4S(=O)(=O)O)cc3OCCCS(=O)(=O)O)n2)c(OCCCS(=O)(=O)O)cc1N=Nc1ccc(N=Nc2ccc(S(=O)(=O)O)cc2)cc1S(=O)(=O)O] |

TABLE 13

| Compound No. | Structural formula |
|---|---|
| 42 | |
| 43 | |
| 44 | |

TABLE 13-continued
| Compound No. | Structural formula |
|---|---|
| 45 | 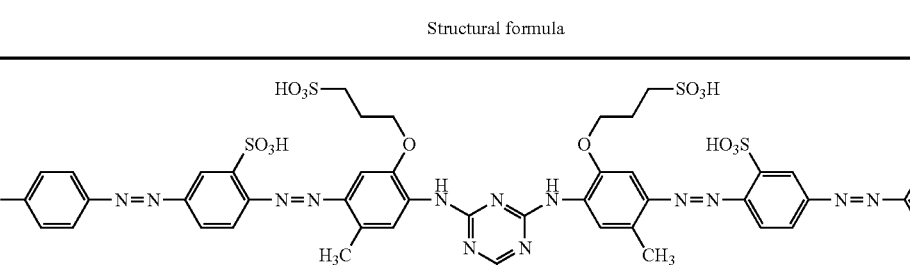 |
TABLE 14
| Compound No. | Structural formula |
|---|---|
| 46 | |

TABLE 14-continued
| Compound No. | Structural formula |
|---|---|
| 47 | 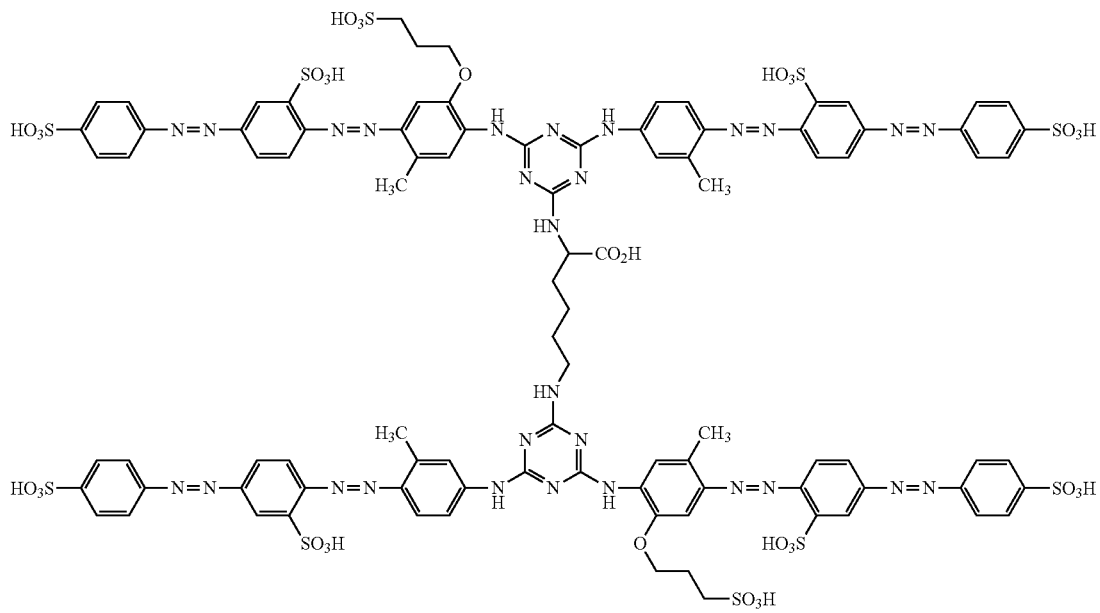 [SMILES: Cc1cc(Nc2nc(NCCCCC(Nc3nc(Nc4ccc(N=Nc5ccc(N=Nc6ccc(S(=O)(=O)O)cc6)cc5S(=O)(=O)O)c(C)c4)nc(Nc4cc(C)c(N=Nc5ccc(N=Nc6ccc(S(=O)(=O)O)cc6)cc5S(=O)(=O)O)cc4OCCCS(=O)(=O)O)n3)C(=O)O)nc(Nc3cc(C)c(N=Nc4ccc(N=Nc5ccc(S(=O)(=O)O)cc5)cc4S(=O)(=O)O)cc3OCCCS(=O)(=O)O)n2)ccc1N=Nc1ccc(N=Nc2ccc(S(=O)(=O)O)cc2)cc1S(=O)(=O)O] |
| 48 | 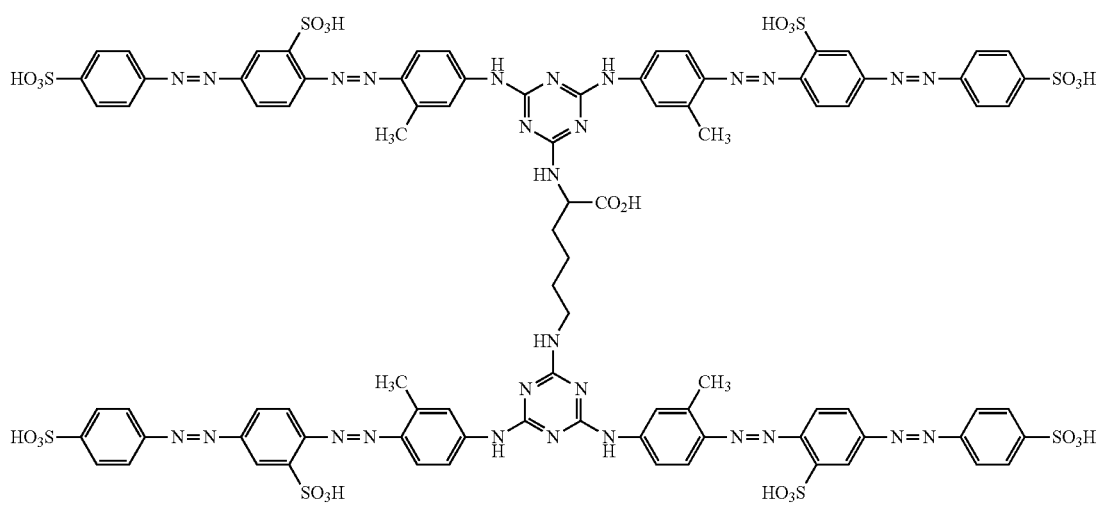 [SMILES: Cc1cc(Nc2nc(NCCCCC(Nc3nc(Nc4ccc(N=Nc5ccc(N=Nc6ccc(S(=O)(=O)O)cc6)cc5S(=O)(=O)O)c(C)c4)nc(Nc4ccc(N=Nc5ccc(N=Nc6ccc(S(=O)(=O)O)cc6)cc5S(=O)(=O)O)c(C)c4)n3)C(=O)O)nc(Nc3ccc(N=Nc4ccc(N=Nc5ccc(S(=O)(=O)O)cc5)cc4S(=O)(=O)O)c(C)c3)n2)ccc1N=Nc1ccc(N=Nc2ccc(S(=O)(=O)O)cc2)cc1S(=O)(=O)O] |

TABLE 15

| Compound No. | Structural formula |
|---|---|
| 49 | (structure) |
| 50 | (structure) |

TABLE 15-continued
| Compound No. | Structural formula |
|---|---|
| 51 | 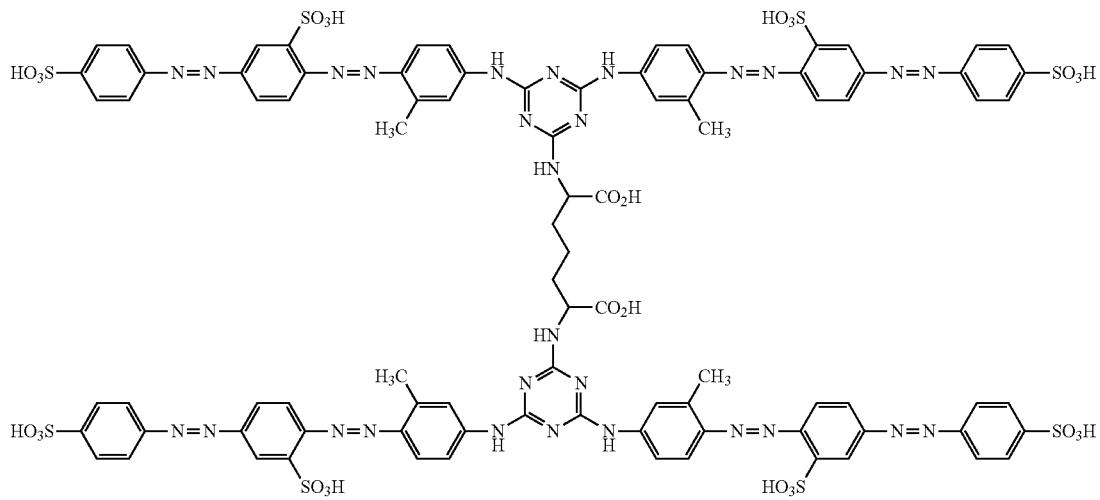 [SMILES: Cc1cc(Nc2nc(Nc3ccc(N=Nc4ccc(N=Nc5ccc(S(=O)(=O)O)cc5)cc4S(=O)(=O)O)c(C)c3)nc(NC(CCCC(Nc3nc(Nc4ccc(N=Nc5ccc(N=Nc6ccc(S(=O)(=O)O)cc6)cc5S(=O)(=O)O)c(C)c4)nc(Nc4ccc(N=Nc5ccc(N=Nc6ccc(S(=O)(=O)O)cc6)cc5S(=O)(=O)O)c(C)c4)n3)C(=O)O)C(=O)O)n2)ccc1N=Nc1ccc(N=Nc2ccc(S(=O)(=O)O)cc2)cc1S(=O)(=O)O] |
TABLE 16
| Compound No. | Structural formula |
|---|---|
| 52 | 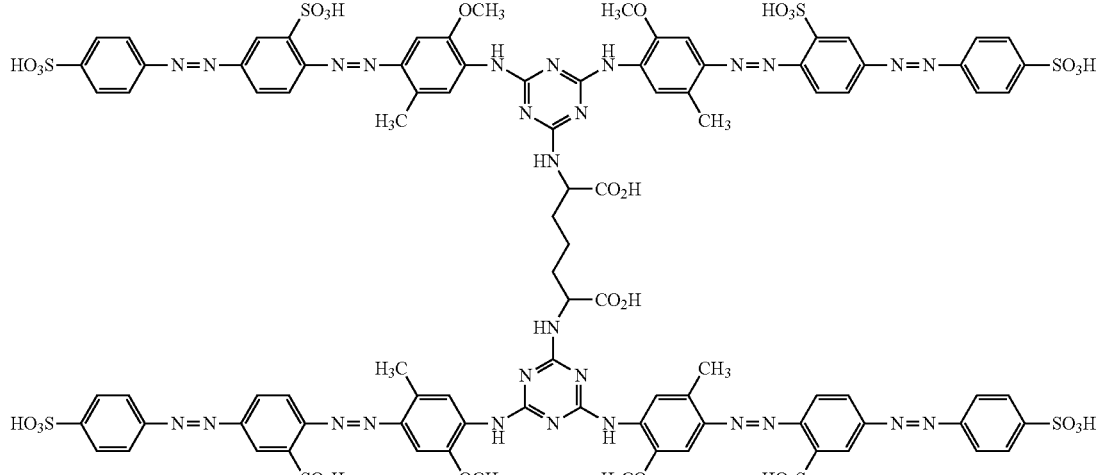 |

TABLE 16-continued
| Compound No. | Structural formula |
|---|---|
| 53 | 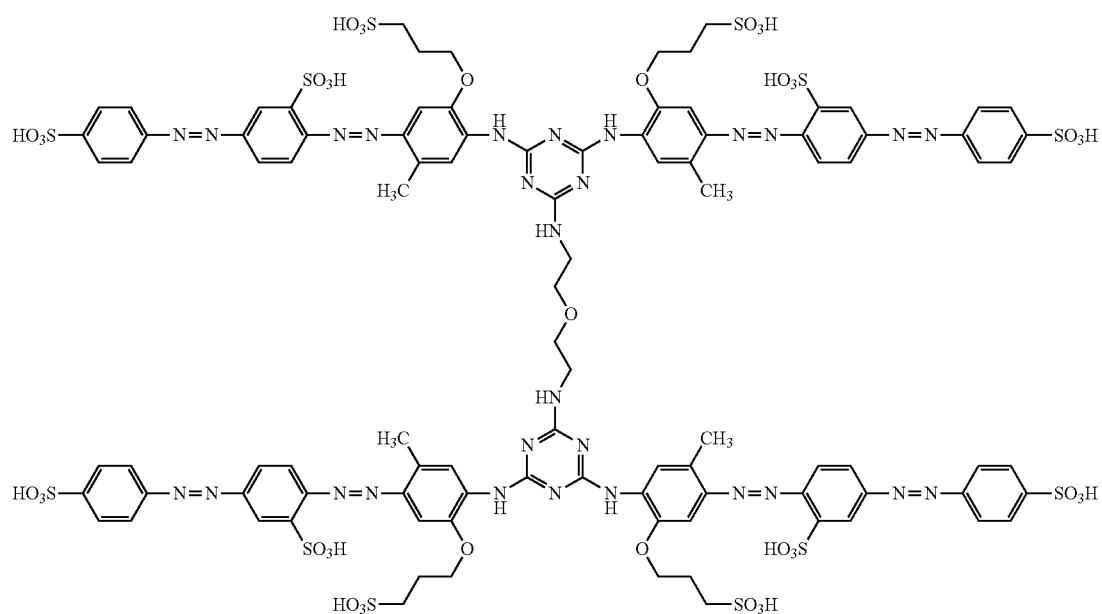 [SMILES: Cc1cc(Nc2nc(NCCOCCNc3nc(Nc4cc(C)c(N=Nc5ccc(N=Nc6ccc(S(=O)(=O)O)cc6)cc5S(=O)(=O)O)cc4OCCCS(=O)(=O)O)nc(Nc4cc(C)c(N=Nc5ccc(N=Nc6ccc(S(=O)(=O)O)cc6)cc5S(=O)(=O)O)cc4OCCCS(=O)(=O)O)n3)nc(Nc3cc(C)c(N=Nc4ccc(N=Nc5ccc(S(=O)(=O)O)cc5)cc4S(=O)(=O)O)cc3OCCCS(=O)(=O)O)n2)c(OCCCS(=O)(=O)O)cc1N=Nc1ccc(N=Nc2ccc(S(=O)(=O)O)cc2)cc1S(=O)(=O)O] |
| 54 | 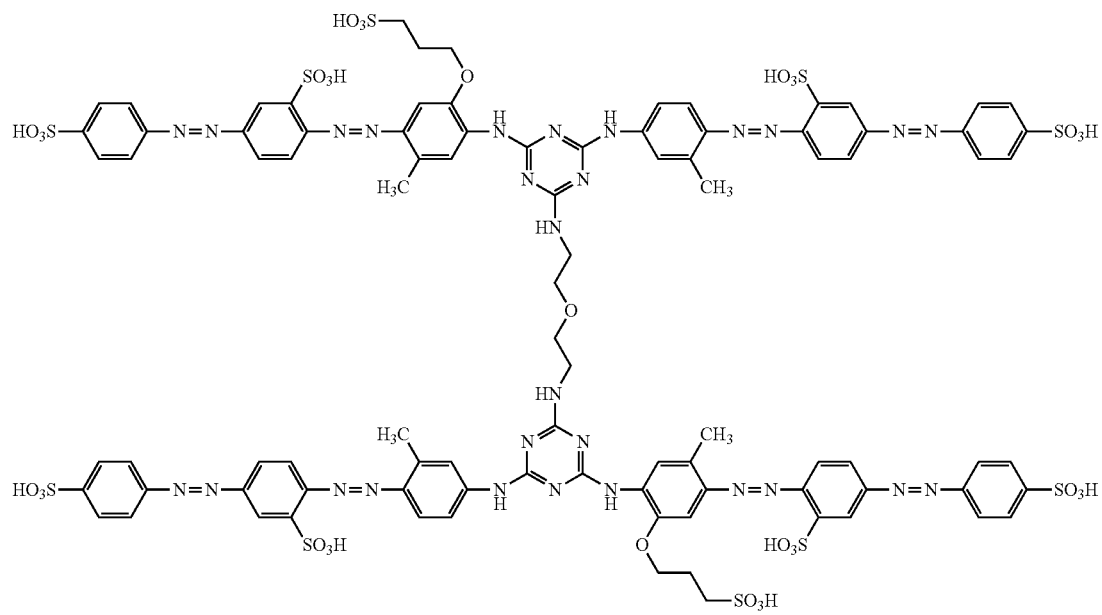 [SMILES: Cc1cc(Nc2nc(NCCOCCNc3nc(Nc4ccc(N=Nc5ccc(N=Nc6ccc(S(=O)(=O)O)cc6)cc5S(=O)(=O)O)c(C)c4)nc(Nc4cc(C)c(N=Nc5ccc(N=Nc6ccc(S(=O)(=O)O)cc6)cc5S(=O)(=O)O)cc4OCCCS(=O)(=O)O)n3)nc(Nc3cc(C)c(N=Nc4ccc(N=Nc5ccc(S(=O)(=O)O)cc5)cc4S(=O)(=O)O)cc3OCCCS(=O)(=O)O)n2)ccc1N=Nc1ccc(N=Nc2ccc(S(=O)(=O)O)cc2)cc1S(=O)(=O)O] |

TABLE 17
| Compound No. | Structural formula |
|---|---|
| 55 | 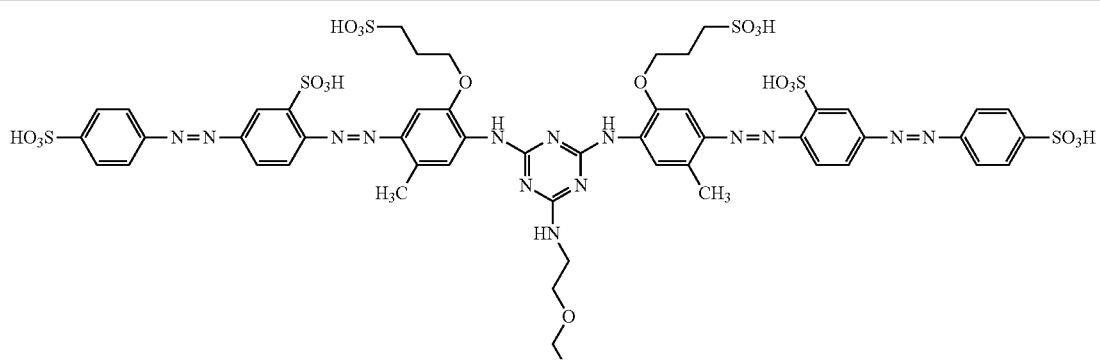 |
| 56 | 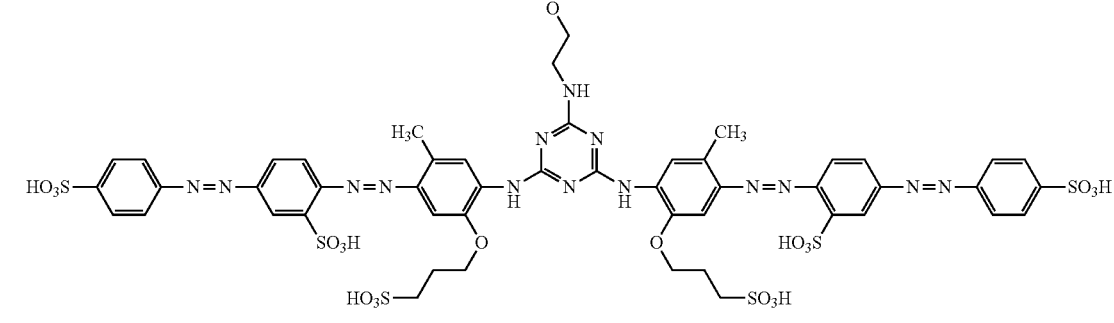 |

TABLE 17-continued

| Compound No. | Structural formula |
| --- | --- |
| 57 | (structure) |

TABLE 18

| Compound No. | Structural formula |
| --- | --- |
| 58 | (structure) |

TABLE 18-continued
| Compound No. | Structural formula |
|---|---|
| 59 | 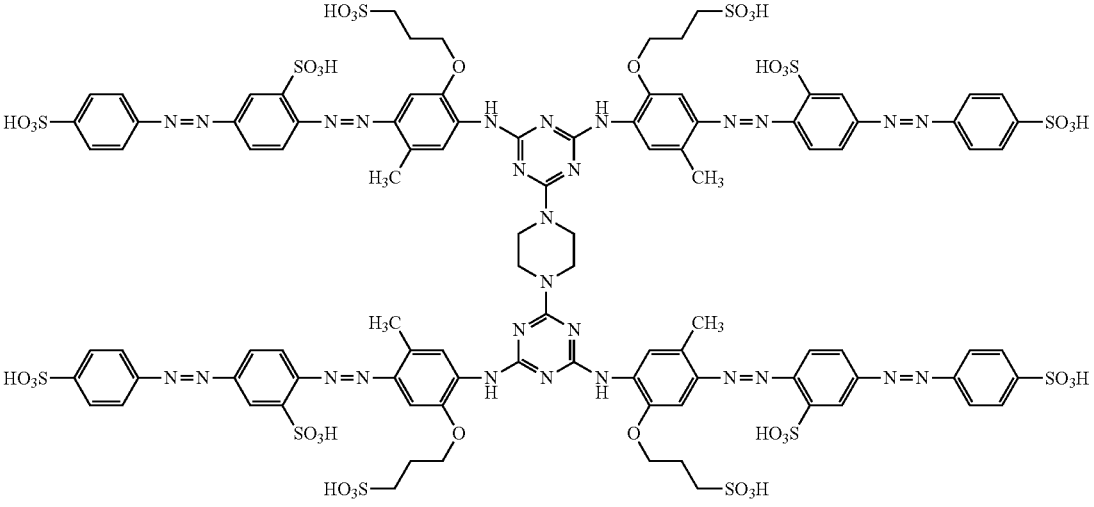 [SMILES: Cc1cc(Nc2nc(Nc3cc(C)c(N=Nc4ccc(N=Nc5ccc(S(=O)(=O)O)cc5)cc4S(=O)(=O)O)cc3OCCCS(=O)(=O)O)nc(N3CCN(c4nc(Nc5cc(C)c(N=Nc6ccc(N=Nc7ccc(S(=O)(=O)O)cc7)cc6S(=O)(=O)O)cc5OCCCS(=O)(=O)O)nc(Nc5cc(C)c(N=Nc6ccc(N=Nc7ccc(S(=O)(=O)O)cc7)cc6S(=O)(=O)O)cc5OCCCS(=O)(=O)O)n4)CC3)n2)c(OCCCS(=O)(=O)O)cc1N=Nc1ccc(N=Nc2ccc(S(=O)(=O)O)cc2)cc1S(=O)(=O)O] |
| 60 | 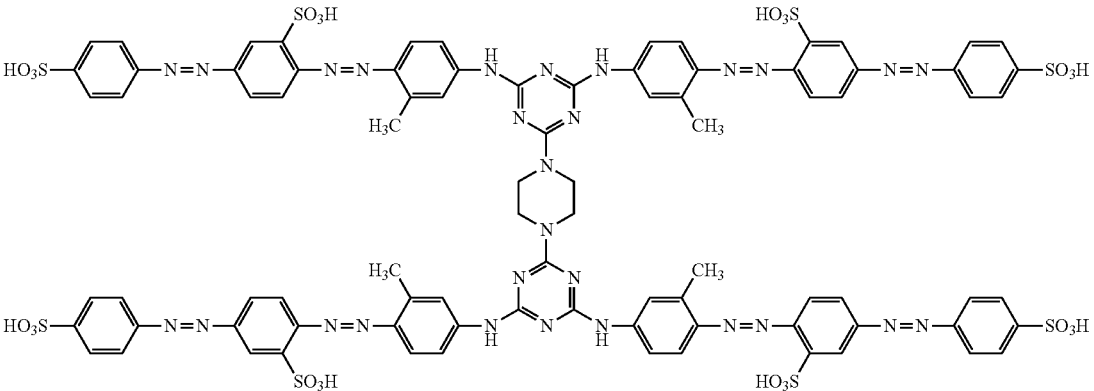 [SMILES: Cc1cc(Nc2nc(Nc3ccc(N=Nc4ccc(N=Nc5ccc(S(=O)(=O)O)cc5)cc4S(=O)(=O)O)c(C)c3)nc(N3CCN(c4nc(Nc5ccc(N=Nc6ccc(N=Nc7ccc(S(=O)(=O)O)cc7)cc6S(=O)(=O)O)c(C)c5)nc(Nc5ccc(N=Nc6ccc(N=Nc7ccc(S(=O)(=O)O)cc7)cc6S(=O)(=O)O)c(C)c5)n4)CC3)n2)ccc1N=Nc1ccc(N=Nc2ccc(S(=O)(=O)O)cc2)cc1S(=O)(=O)O] |
| 61 | 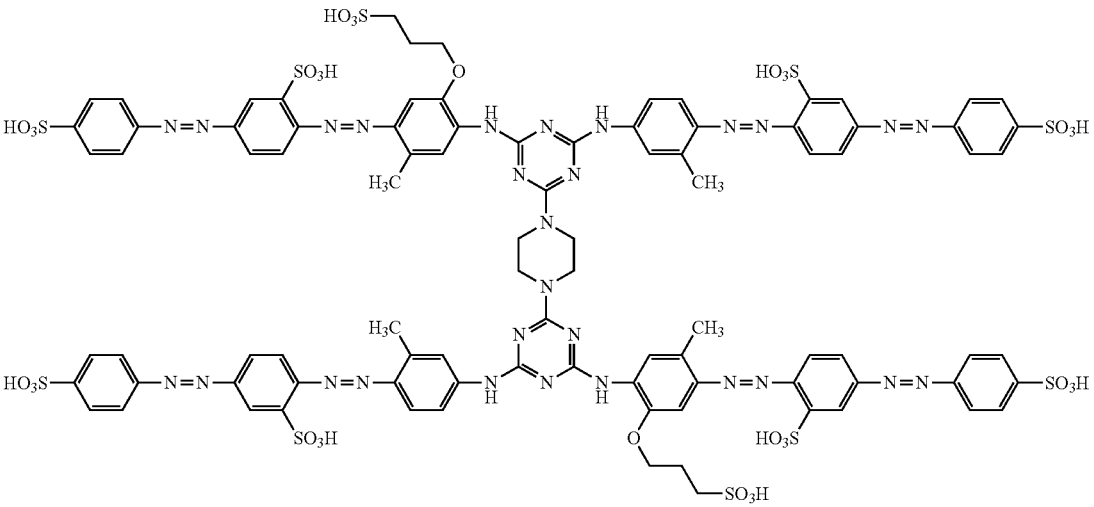 [SMILES: Cc1cc(Nc2nc(Nc3cc(C)c(N=Nc4ccc(N=Nc5ccc(S(=O)(=O)O)cc5)cc4S(=O)(=O)O)cc3OCCCS(=O)(=O)O)nc(N3CCN(c4nc(Nc5ccc(N=Nc6ccc(N=Nc7ccc(S(=O)(=O)O)cc7)cc6S(=O)(=O)O)c(C)c5)nc(Nc5cc(C)c(N=Nc6ccc(N=Nc7ccc(S(=O)(=O)O)cc7)cc6S(=O)(=O)O)cc5OCCCS(=O)(=O)O)n4)CC3)n2)ccc1N=Nc1ccc(N=Nc2ccc(S(=O)(=O)O)cc2)cc1S(=O)(=O)O] |

TABLE 19
| Compound No. | Structural formula |
|---|---|
| 62 | 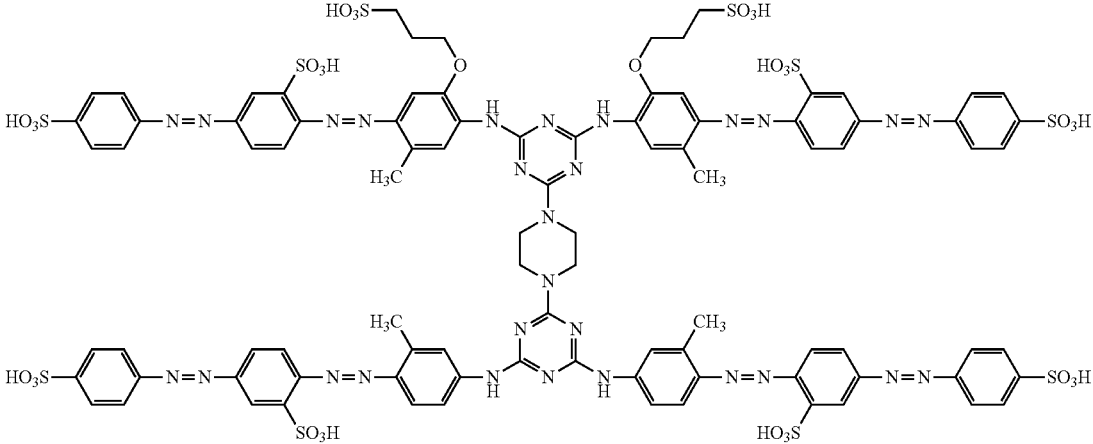 [SMILES: Cc1cc(Nc2nc(Nc3ccc(N=Nc4ccc(N=Nc5ccc(S(=O)(=O)O)cc5)cc4S(=O)(=O)O)c(C)c3)nc(N3CCN(c4nc(Nc5cc(C)c(N=Nc6ccc(N=Nc7ccc(S(=O)(=O)O)cc7)cc6S(=O)(=O)O)cc5OCCCS(=O)(=O)O)nc(Nc5cc(C)c(N=Nc6ccc(N=Nc7ccc(S(=O)(=O)O)cc7)cc6S(=O)(=O)O)cc5OCCCS(=O)(=O)O)n4)CC3)n2)ccc1N=Nc1ccc(N=Nc2ccc(S(=O)(=O)O)cc2)cc1S(=O)(=O)O] |
| 63 | 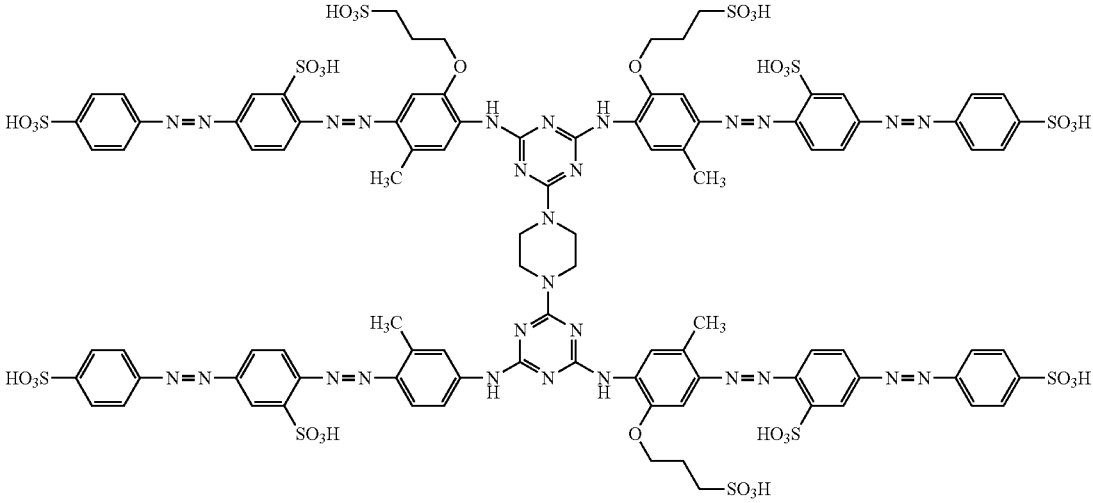 [SMILES: Cc1cc(Nc2nc(Nc3cc(C)c(N=Nc4ccc(N=Nc5ccc(S(=O)(=O)O)cc5)cc4S(=O)(=O)O)cc3OCCCS(=O)(=O)O)nc(N3CCN(c4nc(Nc5cc(C)c(N=Nc6ccc(N=Nc7ccc(S(=O)(=O)O)cc7)cc6S(=O)(=O)O)cc5OCCCS(=O)(=O)O)nc(Nc5cc(C)c(N=Nc6ccc(N=Nc7ccc(S(=O)(=O)O)cc7)cc6S(=O)(=O)O)cc5OCCCS(=O)(=O)O)n4)CC3)n2)ccc1N=Nc1ccc(N=Nc2ccc(S(=O)(=O)O)cc2)cc1S(=O)(=O)O] |
| 64 | 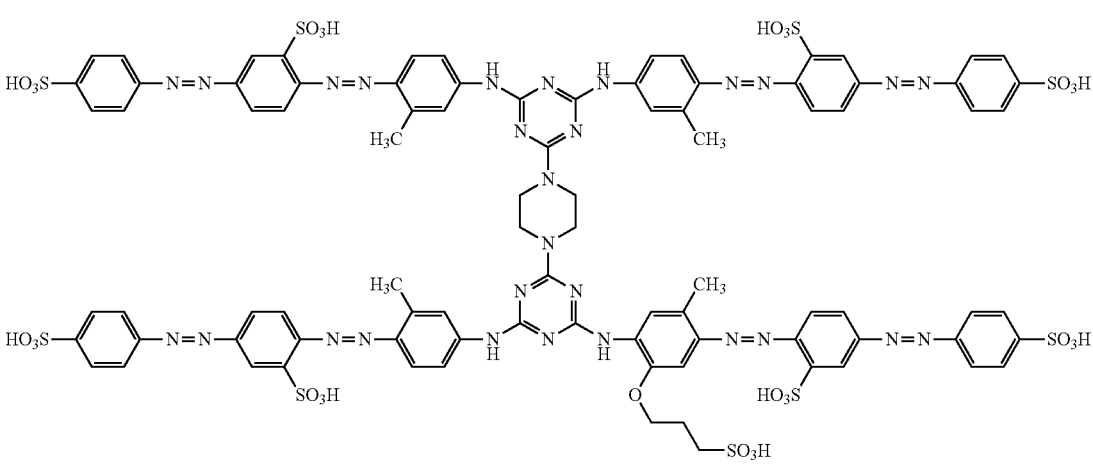 [SMILES: Cc1cc(Nc2nc(Nc3ccc(N=Nc4ccc(N=Nc5ccc(S(=O)(=O)O)cc5)cc4S(=O)(=O)O)c(C)c3)nc(N3CCN(c4nc(Nc5ccc(N=Nc6ccc(N=Nc7ccc(S(=O)(=O)O)cc7)cc6S(=O)(=O)O)c(C)c5)nc(Nc5cc(C)c(N=Nc6ccc(N=Nc7ccc(S(=O)(=O)O)cc7)cc6S(=O)(=O)O)cc5OCCCS(=O)(=O)O)n4)CC3)n2)ccc1N=Nc1ccc(N=Nc2ccc(S(=O)(=O)O)cc2)cc1S(=O)(=O)O] |

TABLE 19-continued
| Compound No. | Structural formula |
|---|---|
| 65 | 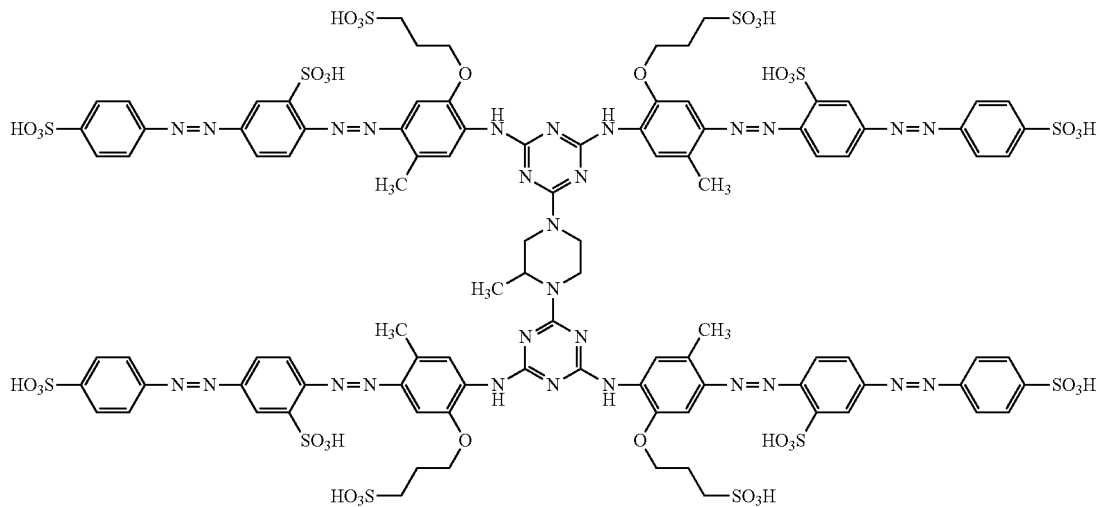 [SMILES: Cc1cc(Nc2nc(Nc3cc(C)c(N=Nc4ccc(N=Nc5ccc(S(=O)(=O)O)cc5)cc4S(=O)(=O)O)cc3OCCCS(=O)(=O)O)nc(N3CCN(c4nc(Nc5cc(C)c(N=Nc6ccc(N=Nc7ccc(S(=O)(=O)O)cc7)cc6S(=O)(=O)O)cc5OCCCS(=O)(=O)O)nc(Nc5cc(C)c(N=Nc6ccc(N=Nc7ccc(S(=O)(=O)O)cc7)cc6S(=O)(=O)O)cc5OCCCS(=O)(=O)O)n4)C(C)C3)n2)c(OCCCS(=O)(=O)O)cc1N=Nc1ccc(N=Nc2ccc(S(=O)(=O)O)cc2)cc1S(=O)(=O)O] |
TABLE 20
| Compound No. | Structural formula |
|---|---|
| 66 | 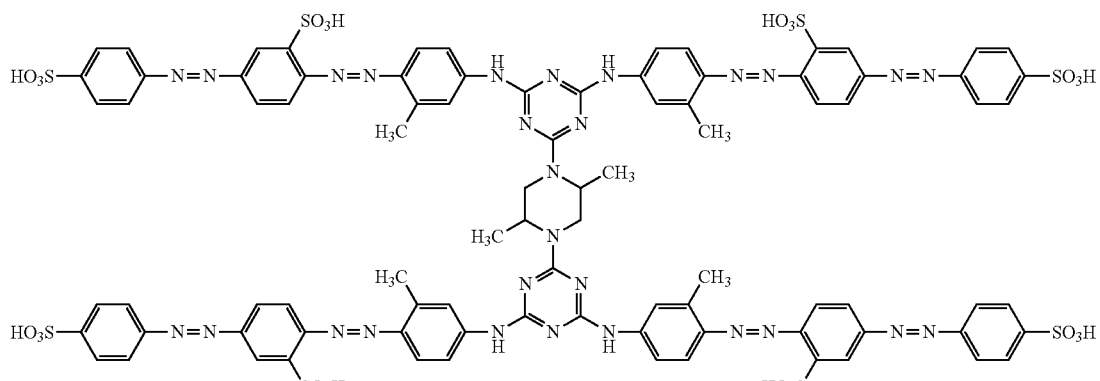 |

TABLE 20-continued
| Compound No. | Structural formula |
|---|---|
| 67 | 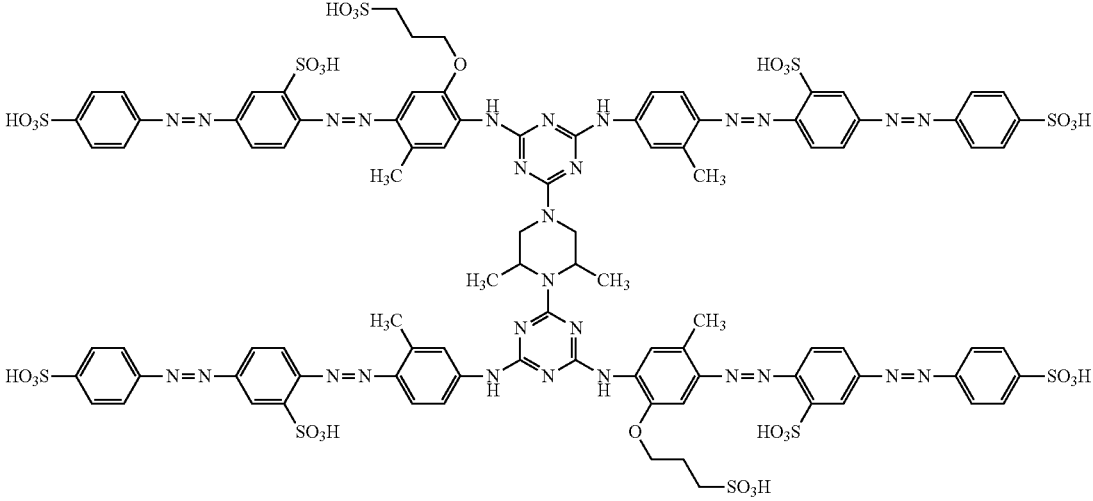 [SMILES: Cc1cc(Nc2nc(Nc3cc(C)c(N=Nc4ccc(N=Nc5ccc(S(=O)(=O)O)cc5)cc4S(=O)(=O)O)cc3OCCCS(=O)(=O)O)nc(N3CC(C)N(c4nc(Nc5ccc(N=Nc6ccc(N=Nc7ccc(S(=O)(=O)O)cc7)cc6S(=O)(=O)O)c(C)c5)nc(Nc5cc(C)c(N=Nc6ccc(N=Nc7ccc(S(=O)(=O)O)cc7)cc6S(=O)(=O)O)cc5OCCCS(=O)(=O)O)n4)C(C)C3)n2)ccc1N=Nc1ccc(N=Nc2ccc(S(=O)(=O)O)cc2)cc1S(=O)(=O)O] |
| 68 | 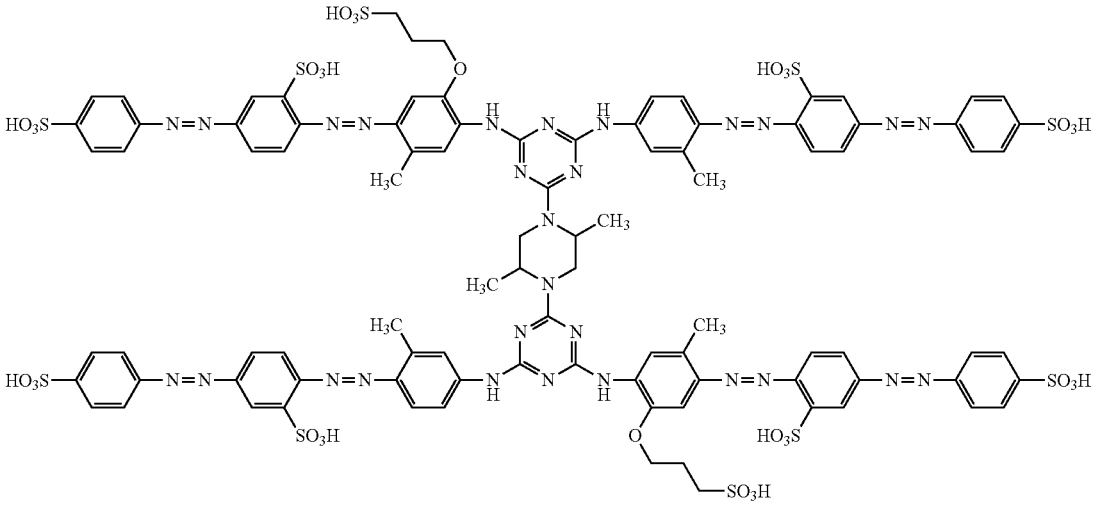 [SMILES: Cc1cc(Nc2nc(Nc3cc(C)c(N=Nc4ccc(N=Nc5ccc(S(=O)(=O)O)cc5)cc4S(=O)(=O)O)cc3OCCCS(=O)(=O)O)nc(N3CC(C)N(c4nc(Nc5ccc(N=Nc6ccc(N=Nc7ccc(S(=O)(=O)O)cc7)cc6S(=O)(=O)O)c(C)c5)nc(Nc5cc(C)c(N=Nc6ccc(N=Nc7ccc(S(=O)(=O)O)cc7)cc6S(=O)(=O)O)cc5OCCCS(=O)(=O)O)n4)CC3C)n2)ccc1N=Nc1ccc(N=Nc2ccc(S(=O)(=O)O)cc2)cc1S(=O)(=O)O] |
| 69 | 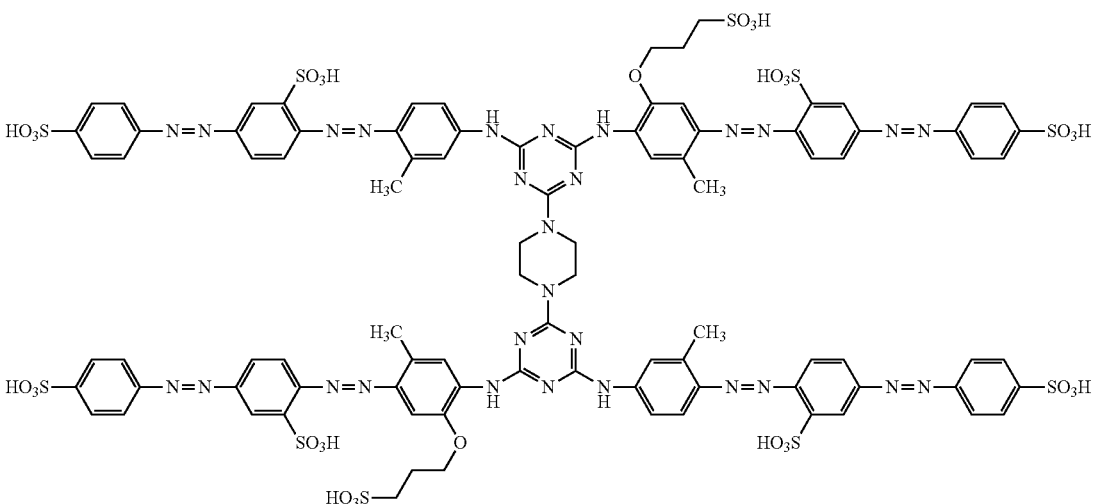 |

TABLE 21
| Compound No. | Structural formula |
|---|---|
| 70 | 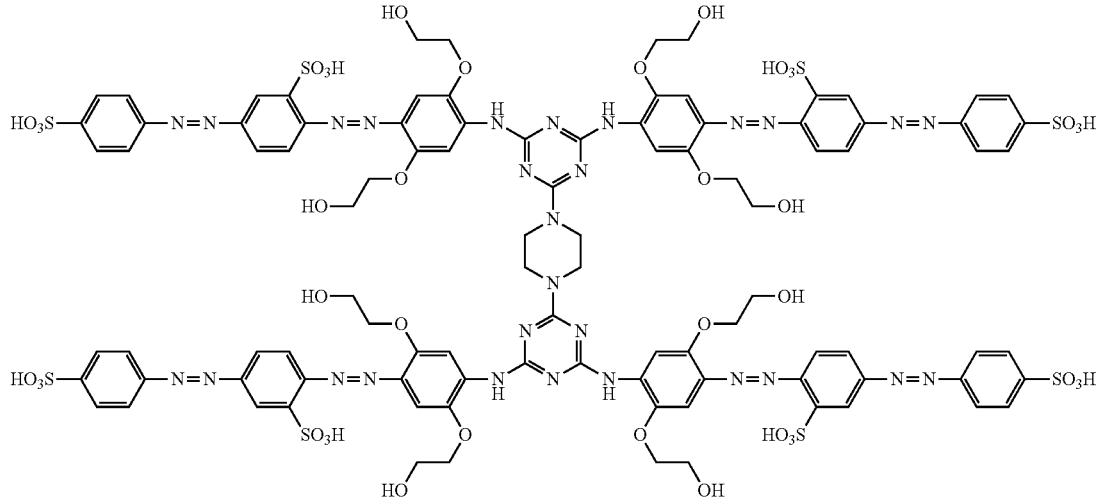 [SMILES: O=S(=O)(O)c1ccc(N=Nc2ccc(N=Nc3cc(OCCO)c(Nc4nc(Nc5cc(OCCO)c(N=Nc6ccc(N=Nc7ccc(S(=O)(=O)O)cc7)cc6S(=O)(=O)O)cc5OCCO)nc(N5CCN(c6nc(Nc7cc(OCCO)c(N=Nc8ccc(N=Nc9ccc(S(=O)(=O)O)cc9)cc8S(=O)(=O)O)cc7OCCO)nc(Nc7cc(OCCO)c(N=Nc8ccc(N=Nc9ccc(S(=O)(=O)O)cc9)cc8S(=O)(=O)O)cc7OCCO)n6)CC5)n4)cc3OCCO)c(S(=O)(=O)O)c2)cc1] |
| 71 | 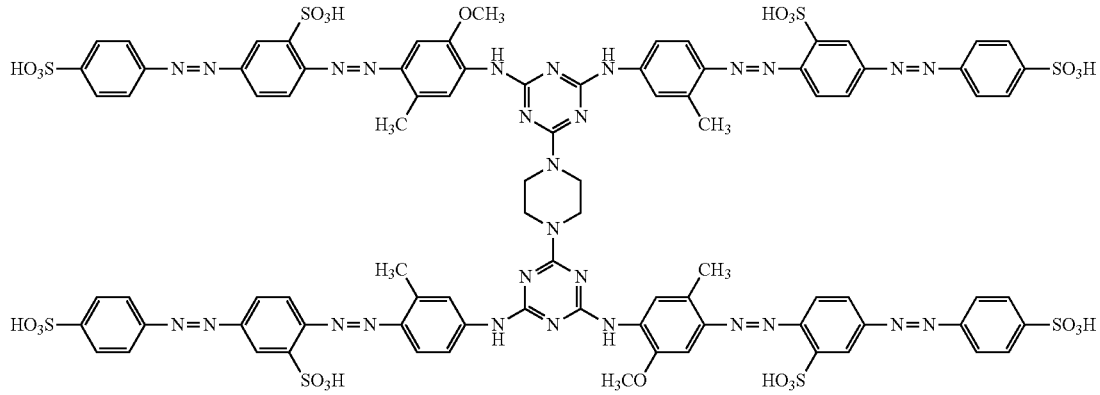 [SMILES: COc1cc(N=Nc2ccc(N=Nc3ccc(S(=O)(=O)O)cc3)cc2S(=O)(=O)O)c(C)cc1Nc1nc(Nc2ccc(N=Nc3ccc(N=Nc4ccc(S(=O)(=O)O)cc4)cc3S(=O)(=O)O)c(C)c2)nc(N2CCN(c3nc(Nc4ccc(N=Nc5ccc(N=Nc6ccc(S(=O)(=O)O)cc6)cc5S(=O)(=O)O)c(C)c4)nc(Nc4cc(C)c(N=Nc5ccc(N=Nc6ccc(S(=O)(=O)O)cc6)cc5S(=O)(=O)O)cc4OC)n3)CC2)n1] |
| 72 | 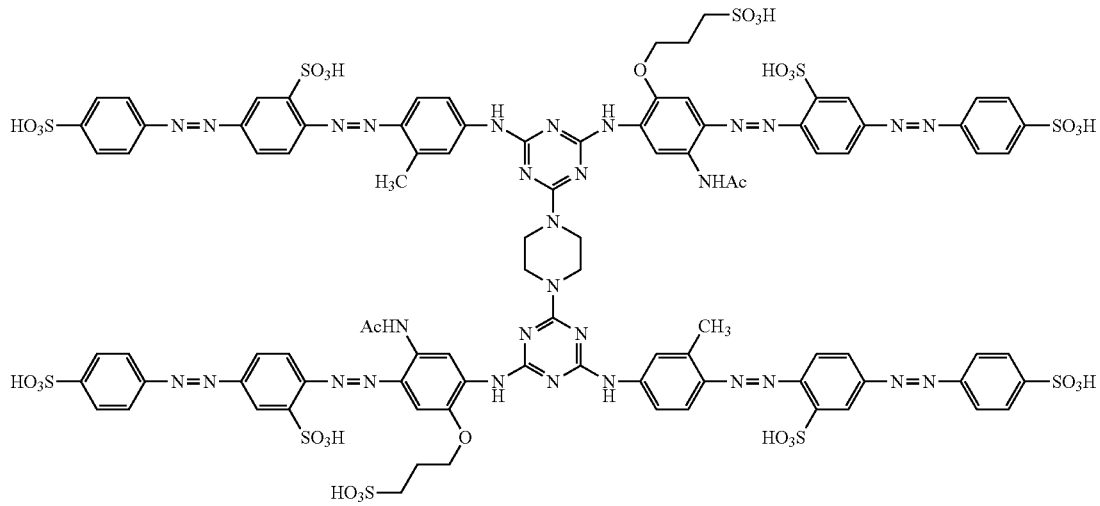 |

TABLE 21-continued
| Compound No. | Structural formula |
| --- | --- |
| 73 | 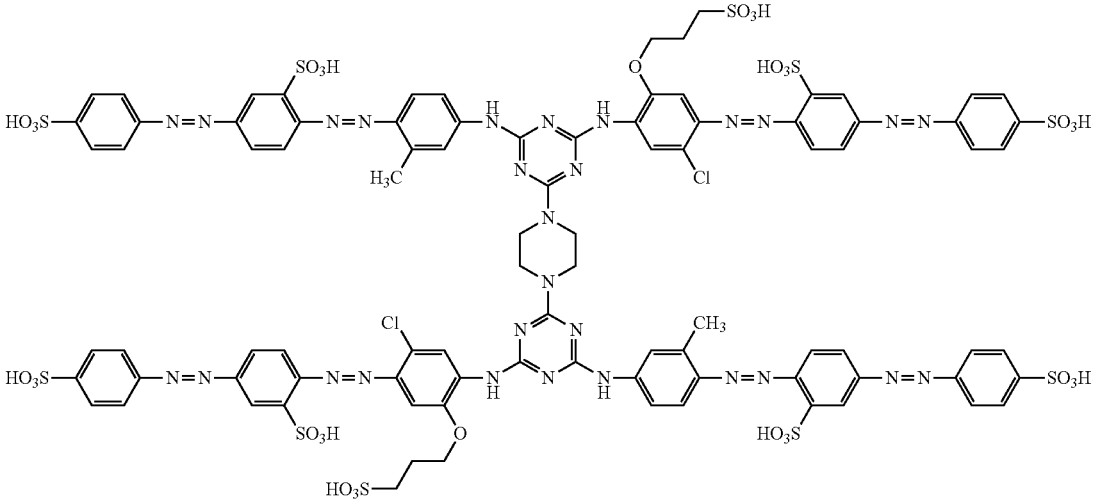 |
TABLE 22
| Compound No. | Structural formula |
| --- | --- |
| 74 | 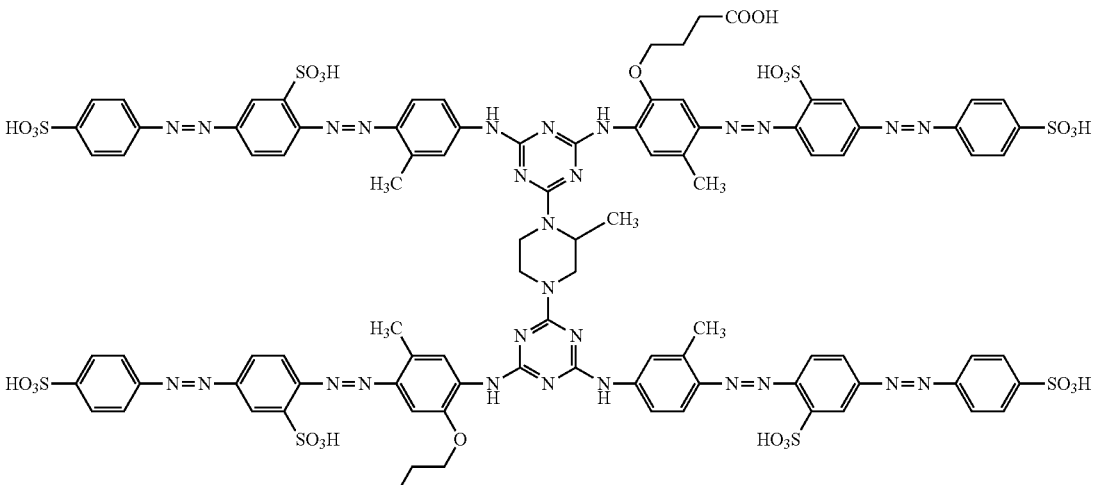 |

TABLE 22-continued
| Compound No. | Structural formula |
|---|---|
| 75 | 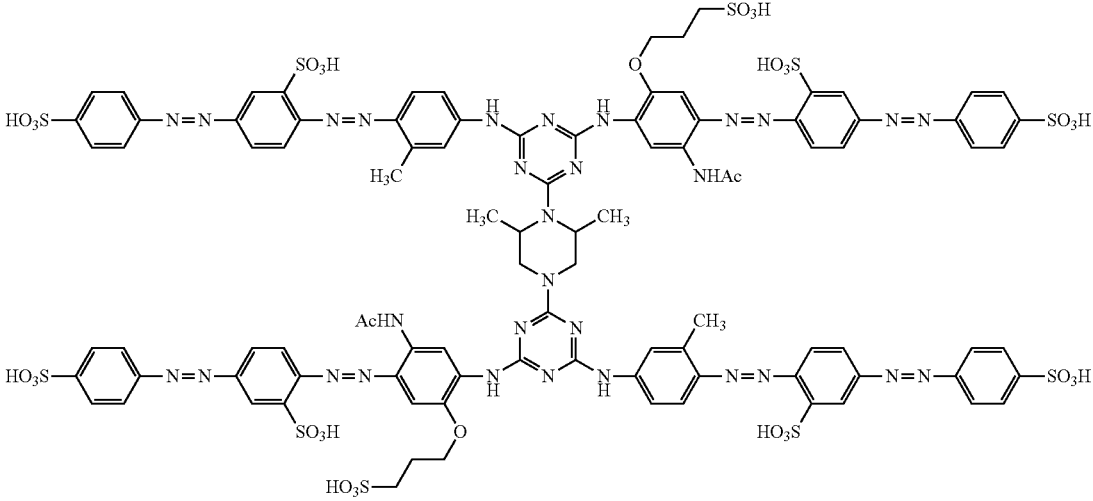 [SMILES: CC(=O)Nc1cc(Nc2nc(Nc3ccc(N=Nc4ccc(N=Nc5ccc(S(=O)(=O)O)cc5)cc4S(=O)(=O)O)c(C)c3)nc(N3CC(C)N(c4nc(Nc5ccc(N=Nc6ccc(N=Nc7ccc(S(=O)(=O)O)cc7)cc6S(=O)(=O)O)c(C)c5)nc(Nc5cc(NC(C)=O)c(N=Nc6ccc(N=Nc7ccc(S(=O)(=O)O)cc7)cc6S(=O)(=O)O)cc5OCCCS(=O)(=O)O)n4)C(C)C3)n2)c(OCCCS(=O)(=O)O)cc1N=Nc1ccc(N=Nc2ccc(S(=O)(=O)O)cc2)cc1S(=O)(=O)O] |
| 76 | 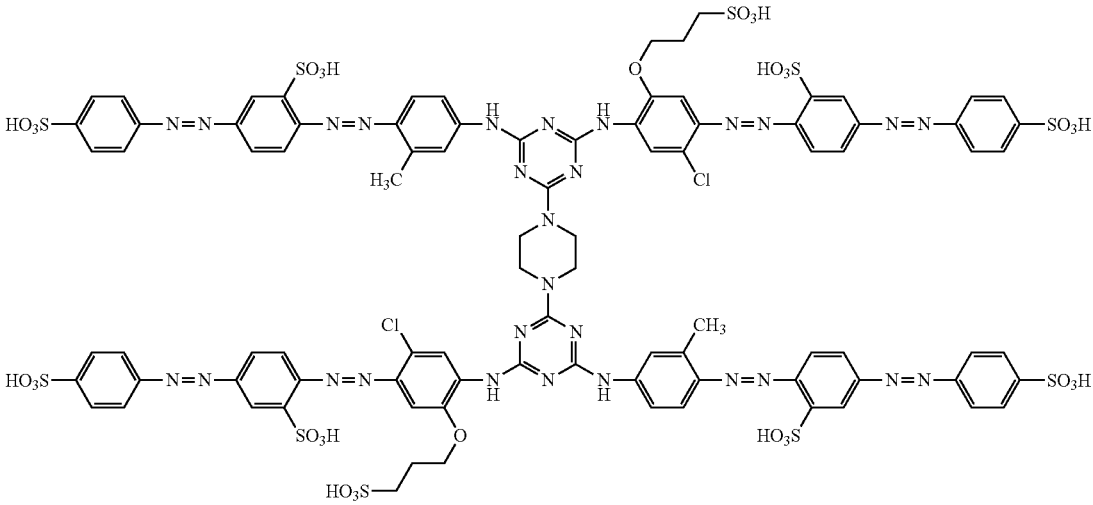 [SMILES: Cc1cc(Nc2nc(Nc3cc(Cl)c(N=Nc4ccc(N=Nc5ccc(S(=O)(=O)O)cc5)cc4S(=O)(=O)O)cc3OCCCS(=O)(=O)O)nc(N3CCN(c4nc(Nc5ccc(N=Nc6ccc(N=Nc7ccc(S(=O)(=O)O)cc7)cc6S(=O)(=O)O)c(C)c5)nc(Nc5cc(Cl)c(N=Nc6ccc(N=Nc7ccc(S(=O)(=O)O)cc7)cc6S(=O)(=O)O)cc5OCCCS(=O)(=O)O)n4)CC3)n2)ccc1N=Nc1ccc(N=Nc2ccc(S(=O)(=O)O)cc2)cc1S(=O)(=O)O] |
| 77 | 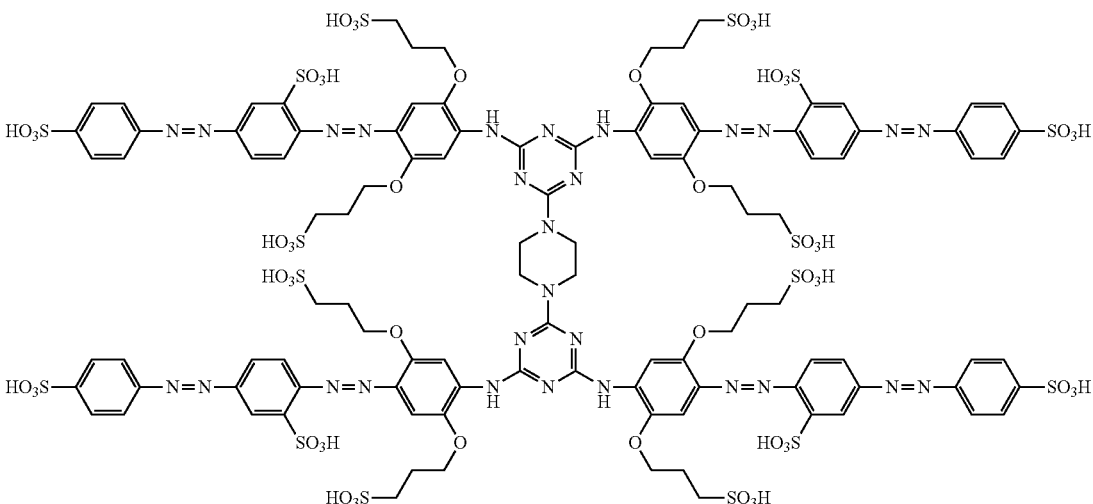 [SMILES: O=S(=O)(O)CCCOc1cc(Nc2nc(Nc3cc(OCCCS(=O)(=O)O)c(N=Nc4ccc(N=Nc5ccc(S(=O)(=O)O)cc5)cc4S(=O)(=O)O)cc3OCCCS(=O)(=O)O)nc(N3CCN(c4nc(Nc5cc(OCCCS(=O)(=O)O)c(N=Nc6ccc(N=Nc7ccc(S(=O)(=O)O)cc7)cc6S(=O)(=O)O)cc5OCCCS(=O)(=O)O)nc(Nc5cc(OCCCS(=O)(=O)O)c(N=Nc6ccc(N=Nc7ccc(S(=O)(=O)O)cc7)cc6S(=O)(=O)O)cc5OCCCS(=O)(=O)O)n4)CC3)n2)c(OCCCS(=O)(=O)O)cc1N=Nc1ccc(N=Nc2ccc(S(=O)(=O)O)cc2)cc1S(=O)(=O)O] |

The coloring matter (II) contained in the ink composition of the present invention will be described.

There are no particular limitations on the coloring matter (II) contained in the ink composition of the present invention as long as it is an azo compound having λmax in a range of 550 to 660 nm, and may be arbitrarily selected by means of adjustment of the hue.

Here, the "azo compound having λmax in a range of 550 to 660 nm" means an azo compound which has λmax in a range of 550 to 660 nm when the concentration of an aqueous solution of the coloring matter is adjusted in the measurement of the absorbance such that the pH of an aqueous solution containing the azo compound is in a range of 5.5 to 8.0, and the absorbance at λmax (maximal absorption wavelength) in water is in a range of 0.5 to 1.5. Furthermore, the azo compound is further preferably an azo compound having λmax in a range of 580 to 630 nm from the viewpoint of color development properties. Meanwhile, the azo compound is a general term of an organic compound in which two organic groups are linked with an azo group.

As the azo compound having λmax in a range of 550 to 660 nm, the compound represented by the formula (3) is suitably used from the viewpoint of color development properties.

Here, the compound represented by the formula (3) will be described.

The compound represented by the formula (3) has a tautomer, and contemplates isomers represented by the following formulae (5) to (7) and the like, in addition to the formula (3), and the like. These tautomers are also encompassed in the present invention.

Meanwhile, $R^{101}$ to $R^{107}$ in the following formulae (5) to (7) all have the same meanings as $R^{101}$ to $R^{107}$ for the formula (3).

In the case where $R^{101}$ for the formula (3) is a C1-C8 alkoxycarbonyl group, the alkoxycarbonyl group may be any one of a linear alkoxycarbonyl group, a branched alkoxycarbonyl group, and an alkoxycarbonyl group having a cyclic structure in its alkyl moiety, and a linear alkoxycarbonyl group and a branched alkoxycarbonyl group are preferred. Specific examples include linear groups such as methoxycarbonyl, ethoxycarbonyl, n-propoxycarbonyl, n-butoxycarbonyl, n-pentyloxycarbonyl, n-hexyloxycarbonyl, n-heptyloxycarbonyl and n-octyloxycarbonyl; branched groups such as isopropoxycarbonyl, isobutyloxycarbonyl, sec-butoxycarbonyl, tert-butoxycarbonyl, 2,2-dimethylpropoxycarbonyl, isopentyloxycarbonyl, sec-pentyloxycarbonyl and 2-methylbutyloxycarbonyl; groups having a cyclic structure in its alkyl moiety such as cyclopropylmethyloxycarbonyl, cyclobutylmethyloxycarbonyl, cyclopentyloxycarbonyl and cyclohexyloxycarbonyl; and the like.

The alkoxycarbonyl group is more preferably a linear C1-C6 alkoxycarbonyl group, and further preferably a linear C1-C4 alkoxycarbonyl group. Specific examples are the same as those corresponding among those described above.

$R^{101}$ for the formula (3) is a C1-C4 alkyl group which may be substituted with a C1-C8 alkoxycarbonyl group or a carboxy group. In the case where the C1-C4 alkyl group is an unsubstituted C1-C4 alkyl group, the alkyl group may be linear alkyl group or a branched alkyl group, and is preferably a linear alkyl group.

Specific examples of the C1-C4 alkyl group include linear groups such as methyl, ethyl, n-propyl and n-butyl; branched groups such as isopropyl, isobutyl, sec-butyl and tert-butyl; and the like. Further, in the case where the C1-C4 alkyl group has a substituent, the alkyl group may be the same as those described above including the preferred ones.

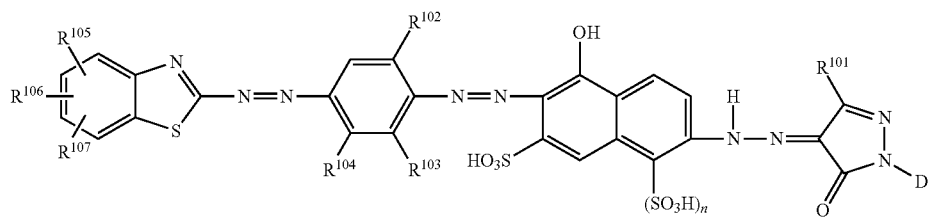

(5)

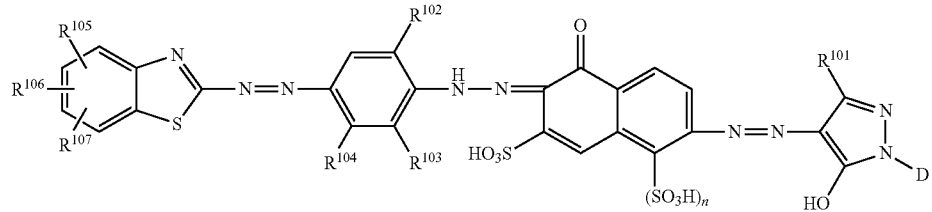

(6)

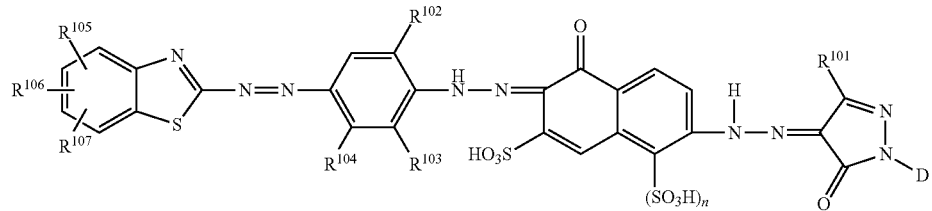

(7)

In the case where the substituent is a C1-C8 alkoxycarbonyl group, the alkoxycarbonyl group may be the same as the C1-C8 alkoxycarbonyl group for $R^{101}$, including the preferred ones. In the case where $R^{101}$ is a C1-C4 alkyl group substituted with a C1-C8 alkoxycarbonyl group, specific examples of preferred $R^{101}$ include methoxycarbonylmethyl, ethoxycarbonyl ethyl, n-butoxycarbonylmethyl, n-octyloxycarboxy ethyl and the like.

In the case where $R^{101}$ is a C1-C4 alkyl group substituted with a carboxy group, specific examples of preferred $R^{101}$ include carboxymethyl, 2-carboxy ethyl, 3-carboxypropyl and the like.

In the case where $R^{101}$ for the formula (3) is a phenyl group which may be substituted with a hydroxy group, a sulfo group, or a carboxy group, specific examples include an unsubstituted phenyl group; hydroxy-substituted phenyl groups such as 2-hydroxyphenyl and 4-hydroxyphenyl; sulfo-substituted phenyl groups such as 2-sulfophenyl, 4-sulfophenyl, 2,4-disulfophenyl and 3,5-disulfophenyl; carboxy-substituted phenyl groups such as 2-carboxyphenyl, 4-carboxyphenyl and 3,5-dicarboxyphenyl; phenyl groups substituted with multiple kinds of groups such as 2-hydroxy-5-sulfophenyl; and the like.

Among those described above, $R^{101}$ for the formula (3) is preferably a carboxy group; a C1-C4 alkoxycarbonyl group; an unsubstituted C1-C4 alkyl group; a carboxy group-substituted C1-C4 alkyl groups; or an unsubstituted phenyl group.

Specific examples of preferred $R^{101}$ for the formula (3) include methyl, ethyl, tert-butyl, carboxymethyl, 3-carboxypropyl, methoxycarbonylmethyl, carboxy, methoxycarboxy, ethoxycarboxy, n-octyloxycarboxy, phenyl, 2-hydroxyphenyl and 4-sulfophenylmethyl, more preferably methyl, carboxymethyl, carboxy, phenyl, further preferably carboxy and phenyl, and most preferably carboxy.

Examples of the halogen atom for $R^{102}$ to $R^{104}$ in the formula (3) include a fluorine atom, a chlorine atom, a bromine atom, and an iodine atom. Among these, a fluorine atom, a chlorine atom, and a bromine atom are preferred, and a chlorine atom is particularly preferred.

In the case where $R^{102}$ to $R^{104}$ for the formula (3) is a C1-C4 alkyl group, the alkyl group may be a linear alkyl group, a branched alkyl group, or a cyclic alkyl group, but is preferably a linear alkyl group or a branched alkyl group, and further preferably a linear alkyl group. Specific examples include linear groups such as methyl, ethyl, n-propyl and n-butyl; branched groups such as isopropyl, isobutyl, sec-butyl and tert-butyl; and the like.

In the case where $R^{102}$ to $R^{104}$ for the formula (3) is an unsubstituted C1-C4 alkoxy group, the alkoxy group is preferably either a linear alkoxy group or a branched alkoxy group. Specific examples include methoxy, ethoxy, n-propoxy, isopropoxy, n-butoxy, sec-butoxy, tert-butoxy and the like.

In the case where the alkoxy group is substituted with at least one group selected from the group consisting of a hydroxy group, a C1-C4 alkoxy group, a hydroxy-C1-C4 alkoxy group, a sulfo group and a carboxy group, specific examples include hydroxy-C1-C4 alkoxy groups such as 2-hydroxyethoxy, 2-hydroxypropoxy and 3-hydroxypropoxy; C1-C4 alkoxy-C1-C4 alkoxy groups such as methoxyethoxy, ethoxyethoxy, n-propoxyethoxy, isopropoxyethoxy, n-butoxyethoxy, methoxypropoxy, ethoxypropoxy, n-propoxypropoxy, isopropoxybutoxy and n-propoxybutoxy; hydroxy-C1-C4 alkoxy-C1-C4 alkoxy groups such as 2-hydroxyethoxyethoxy; sulfo-C1-C4 alkoxy groups such as 3-sulfopropoxy and 4-sulfo butoxy; carboxy-C1-C4 alkoxy groups such as carboxymethoxy, 2-carboxy ethoxy and 3-carboxypropoxy; and the like.

In the case where $R^{102}$ to $R^{104}$ for the formula (3) is an unsubstituted mono- or di-C1-C4 alkylamino group, the C1-C4 alkyl moiety is preferably either a linear one or a branched one. Specific examples include linear groups such as methylamino, ethylamino, n-propylamino, isopropylamino, n-butylamino, dimethylamino, diethylamino, di-n-propylamino and di-n-butylamino; branched groups such as sec-butylamino, tert-butylamino and diisopropylamino; and the like.

In the case where the mono- or di-C1-C4 alkylamino group is substituted with at least one group selected from the group consisting of a hydroxy group, a sulfo group, and a carboxy group, specific examples include hydroxy-substituted mono- or di-C1-C4 alkylamino groups such as 2-hydroxyethylamino, 2-hydroxypropylamino and 2,2'-dihydroxydiethylamino; sulfo-substituted mono- or di-C1-C4 alkylamino groups such as 2-sulfoethylamino, 3-sulfopropylamino, 4-sulfo butylamino and 3,3'-disulfodipropylamino; carboxy-substituted mono- or di-C1-C4 alkylamino groups such as carboxymethylamino, 2-carboxy ethylamino, 3-carboxypropylamino and 2,2'-dicarboxy diethylamino; and the like.

In the case where $R^{102}$ to $R^{104}$ for the formula (3) are an unsubstituted C1-C4 alkylcarbonylamino group, the C1-C4 alkyl moiety may be either a linear one or a branched one, but is preferably a linear one. Specific examples include acetylamino, propanoylamino, butanoylamino and the like.

In the case where the C1-C4 alkylcarbonylamino group is substituted with a hydroxy group or a carboxy group, specific examples of the C1-C4 alkylcarbonylamino group include hydroxy-C1-C4 alkylcarbonylamino groups such as hydroxyethanoylamino, 2-hydroxypropanoylamino and 4-hydroxybutanoylamino; carboxy-C1-C4 alkylcarbonylamino groups such as 3-carboxypropanoylamino; and the like.

In the case where $R^{102}$ to $R^{104}$ for the formula (3) are an N'—C1-C4 alkylureido group, it preferably has a substituent, rather than being unsubstituted.

In the case where the N'—C1-C4 alkylureido group is substituted with at least one group selected from the group consisting of a hydroxy group, a sulfo group, and a carboxy group, specific examples include N'-hydroxy-C1-C4 alkylureido groups such as N'-2-hydroxyethylureido and N'-3-hydroxyethylureido; N'-sulfo C1-C4 alkylureido groups such as N'-2-sulfoethylureido and N'-3-sulfopropylureido; N'-carboxy C1-C4 alkylureido groups such as N'-carboxymethylureido, N'-2-carboxyethylureido, N'-3-carboxypropylureido and N'-4-carboxybutylureido; and the like.

In the case where $R^{102}$ to $R^{104}$ for the formula (3) are a phenylamino group having its benzene ring which may be substituted with at least one group selected from the group consisting of a halogen atom, a C1-C4 alkyl group, a nitro group, a sulfo group, and a carboxy group, specific examples include unsubstituted phenylamino groups; halogen atom-substituted phenylamino groups such as 2-chlorophenylamino, 4-chlorophenylamino and 2,4-dichlorophenylamino; C1-C4 alkyl-substituted phenylamino groups such as 2-methylphenylamino, 4-methylphenylamino and 4-tert-butylphenylamino; nitro-substituted phenylamino groups such as 2-nitrophenylamino and 4-nitrophenylamino; sulfo-substituted phenylamino groups such as 3-sulfophenylamino, 4-sulfophenylamino, 2,4-disulfophenylamino and 3,5-disulfophenylamino; carboxy-substituted phenylamino groups such as 2-carboxyphenylamino, 4-carboxyphenylamino, 2,5-dicarboxyphenylamino and 3,5-dicarboxyphenylamino; and the like.

In the case where $R^{102}$ to $R^{104}$ for the formula (3) are a substituted phenylamino group, benzoylamino group, or phenylsulfonylamino group, and the substituent of the benzene ring contained in the respective groups is a C1-C4 alkyl group, the alkyl group may be a linear one or a branched one, or a cyclic one, but is preferably a linear one or a branched one. Specific examples include linear groups such as methyl, ethyl, n-propyl and n-butyl; branched groups such as isopropyl, isobutyl, sec-butyl and tert-butyl; and the like.

In the case where $R^{102}$ to $R^{104}$ for the formula (3) are a benzoylamino group having its benzene ring which may be substituted with at least one group selected from the group consisting of a halogen atom, a C1-C4 alkyl group, a nitro group, a sulfo group, and a carboxy group, specific examples include unsubstituted benzoylamino groups; halogen atom-substituted benzoylamino groups such as 2-chlorobenzoylamino, 4-chlorobenzoylamino and 2,4-dichlorophenylamino; C1-C4 alkyl-substituted benzoylamino groups such as 2-methylbenzoylamino, 3-methylbenzoylamino and 4-methylbenzoylamino; nitro-substituted benzoylamino groups such as 2-nitrobenzoylamino, 4-nitrobenzoylamino and 3,5-dinitrobenzoylamino; sulfo-substituted benzoylamino groups such as 2-sulfo benzoylamino and 4-sulfo benzoylamino; carboxy-substituted benzoylamino groups such as 2-carboxy benzoylamino, 4-carboxy benzoylamino and 3,5-dicarboxy benzoylamino; and the like.

In the case where $R^{102}$ to $R^{104}$ for the formula (3) are a phenylsulfonylamino group having its benzene ring which may be substituted with at least one group selected from the group consisting of a halogen atom, a C1-C4 alkyl group, a nitro group, a sulfo group, and a carboxy group, specific examples include unsubstituted phenylsulfonylamino groups; halogen atom-substituted phenylsulfonylamino groups such as 2-chlorophenylsulfonylamino and 4-chlorophenylsulfonylamino; C1-C4 alkyl-substituted phenylsulfonylamino groups such as 2-methylphenylsulfonylamino, 4-methylphenylsulfonylamino and 4-tert-butylphenylsulfonylamino; nitro-substituted phenylsulfonylamino groups such as 2-nitrophenylsulfonylamino, 3-nitrophenylsulfonylamino and 4-nitrophenylsulfonylamino; sulfo-substituted phenylsulfonylamino groups such as 3-sulfophenylsulfonylamino and 4-sulfophenylsulfonylamino; carboxy-substituted phenylsulfonylamino groups such as 3-carboxyphenylsulfonylamino and 4-carboxyphenylsulfonylamino; and the like.

Among those described above, $R^{102}$ is preferably a sulfo group; a C1-C4 alkoxy group substituted with at least one group selected from the group consisting of a hydroxy group, a hydroxy-C1-C4 alkoxy group, a sulfo group, and a carboxy group; and more preferably a C1-C4 alkoxy group substituted with a sulfo group.

Among those described above, $R^{103}$ is particularly preferably a hydrogen atom.

Among those described above, $R^{104}$ is preferably a C1-C4 alkyl group; a C1-C4 alkylcarbonylamino group; and a mono-C1-C4 alkylureido group substituted with at least one group selected from the group consisting of a hydroxy group, a sulfo group, and a carboxy group. $R^{104}$ is more preferably a C1-C4 alkyl group; a C1-C4 alkylcarbonylamino group; and a mono-C1-C4 alkylureido group substituted with a sulfo group. $R^{104}$ is further preferably a C1-C4 alkyl group.

Examples of the halogen atom for $R^{105}$ to $R^{107}$ in the formula (3) include a fluorine atom, a chlorine atom, a bromine atom, and an iodine atom. Among these, a fluorine atom, a chlorine atom, and a bromine atom are preferred, and a chlorine atom is particularly preferred.

In the case where $R^{105}$ to $R^{107}$ for the formula (3) are a C1-C4 alkyl group, the alkyl group may be a linear one, a branched one, or a cyclic one, but is preferably a linear one or a branched one, and is further preferably a linear one. Specific examples include linear groups such as methyl, ethyl, n-propyl and n-butyl; branched groups such as isopropyl, isobutyl, sec-butyl and tert-butyl; and the like.

In the case where $R^{105}$ to $R^{107}$ for the formula (3) are a C1-C4 alkoxy group which may be substituted with at least one group selected from the group consisting of a hydroxy group, a C1-C4 alkoxy group, a sulfo group, and a carboxy group, the substituent may be the same as the C1-C4 alkoxy group that corresponds to $R^{102}$ to $R^{104}$ described above, including the preferred ones.

In the case where $R^{105}$ to $R^{107}$ for the formula (3) is a C1-C4 alkylsulfonyl group which may be substituted with at least one group selected from the group consisting of a hydroxy group, a sulfo group, and a carboxy group, specific examples include linear or a branched C1-C4 alkylsulfonyl groups such as methylsulfonyl, ethylsulfonyl, propylsulfonyl, isopropylsulfonyl, n-butylsulfonyl, sec-butylsulfonyl and tert-butylsulfonyl; hydroxy-C1-C4 alkylsulfonyl groups such as 2-hydroxyethylsulfonyl and 3-hydroxypropylsulfonyl; sulfo-C1-C4 alkylsulfonyl groups such as 2-sulfopropylsulfonyl, 3-sulfopropylsulfonyl and 4-sulfobutylsulfonyl; carboxy-C1-C4 alkylsulfonyl groups such as carboxymethylsulfonyl, 2-carboxy ethylsulfonyl and 3-carboxypropylsulfonyl; and the like.

In the case where $R^{105}$ to $R^{107}$ for the formula (3) is a phenylsulfonyl group having its benzene ring which may be substituted with at least one group selected from the group consisting of a halogen atom, a C1-C4 alkyl group, a nitro group, a sulfo group, and a carboxy group, specific examples include unsubstituted phenylsulfonyl groups; halogen atom-substituted phenylsulfonyl groups such as 2-chlorophenylsulfonyl and 4-chlorophenylsulfonyl; C1-C4 alkyl-substituted phenylsulfonyl groups such as 2-methylphenylsulfonyl, 4-methylphenylsulfonyl, 2,4-dimethylphenylsulfonyl and 4-tert-butylphenylsulfonyl; nitro-substituted phenylsulfonyl groups such as 2-nitrophenylsulfonyl and 4-nitrophenylsulfonyl; sulfo-substituted phenylsulfonyl groups such as 3-sulfophenylsulfonyl, 4-sulfophenylsulfonyl and 3,5-disulfophenylsulfonyl; carboxy-substituted phenylsulfonyl groups such as 2-carboxyphenylsulfonyl, 4-carboxyphenylsulfonyl and 3,5-dicarboxyphenylsulfonyl; and the like.

Specific examples of preferred $R^{105}$ to $R^{107}$ for the formula (3) is a hydrogen atom, a halogen atom, carboxy, sulfo, nitro, methyl, ethyl, methoxy, ethoxy, 2-hydroxyethoxy, 2-sulfoethoxy, 3-sulfopropoxy, 4-sulfobutoxy, carboxymethoxy, 2-carboxy ethoxy, methylsulfonyl, ethylsulfonyl, tert-butylsulfonyl, 2-hydroxyethylsulfonyl, 3-sulfopropylsulfonyl, 2-carboxy ethylsulfonyl, phenylsulfonyl, 4-chlorophenylsulfonyl, 4-methylphenylsulfonyl, 2,4-dimethylphenylsulfonyl, 4-nitrophenylsulfonyl, 4-sulfophenylsulfonyl, 2-carboxyphenylsulfonyl, 4-carboxyphenylsulfonyl and the like. $R^{105}$ to $R^{107}$ for the formula (3) is more preferably a hydrogen atom, a chlorine atom, carboxy, sulfo, nitro, methyl, methoxy, methylsulfonyl or 2-carboxyphenylsulfonyl, and further preferably a hydrogen atom, sulfo or methoxy. At least one of $R^{105}$ to $R^{107}$ is preferably a hydrogen atom.

The position of substitution of preferred $R^{105}$ to $R^{107}$ on the benzothiazole ring is the 4-position or the 5-position for $R^{105}$, the 6-position for $R^{106}$, and the 7-position for $R^{107}$.

Among those described above, $R^{105}$ is preferably a hydrogen atom or a sulfo group. Furthermore, among those described above, $R^{106}$ is preferably a hydrogen atom, a halogen atom, a carboxy group, a sulfo group, a C1-C4 alkoxy group, or a C1-C4 alkylsulfonyl group, and more preferably a C1-C4 alkoxy group. Furthermore, among those described above, $R^{107}$ is preferably a hydrogen atom or a sulfo group.

Examples of particularly preferred combinations of $R^{105}$ to $R^{107}$ include a combination in which $R^{105}$ is a sulfo group at the 5-position of the substitution position, $R^{106}$ is a C1-C4 alkoxy group at the 6-position of the substitution position, and $R^{107}$ is a hydrogen atom; or a combination in which $R^{105}$ is a hydrogen atom, $R^{106}$ is a C1-C4 alkoxy group at the 6-position of the substitution position, and $R^{107}$ is a sulfo group at the 7-position of the substitution position.

n in the formula (3) is preferably 1.

The group D in the formula (3) is a phenyl group or a naphthyl group. The phenyl group and a naphthyl group may be substituted, respectively with at least one group selected from the group consisting of the specific groups described above.

When the group D in the formula (3) is a phenyl group, the phenyl group substituted with the specific group described above will be described. The number of the substituents is usually one to three, preferably one or two, more preferably one. When multiple groups are substituted, there are no particular limitations on the kinds of the substituents, but the same kind is preferred. Further, there are no particular limitations on the position of the substituent, but when the position of the bond with the nitrogen atom of the pyrazolone ring is designated as the 1-position, it is preferable that the substituents are substituted at the 2-position, the 3-position, and the 5-position, respectively when the number of the substituents is three; the 2-position and the 4-position, or the 2-position and the 5-position, or the 3-position and the 5-position when the number of the substituents is two; and the 4-position when the number of the substituents is one.

Meanwhile, the position of the substituent on the phenyl group in each constitution described below is described such that the position of the bond with the nitrogen atom of the pyrazolone ring is designated as the 1-position.

Examples of the phenyl group substituted with a hydroxy group for the group D include 2-hydroxyphenyl, 3-hydroxyphenyl, 4-hydroxyphenyl and the like.

Examples of the phenyl group substituted with a sulfo group for the group D include 2-sulfophenyl, 4-sulfophenyl, 2,4-disulfophenyl, 2,5-disulfophenyl, 3,5-disulfophenyl and the like.

Examples of the phenyl group substituted with a carboxy group for the group D include 4-carboxyphenyl, 3,5-dicarboxyphenyl and the like.

Examples of the phenyl group substituted with a C1-C4 alkyl group for the group D include 4-methylphenyl, 3-methylphenyl and the like. Furthermore, examples of the C1-C4 alkyl group, which is the substituent, include those described for the "C1-C4 alkyl group for $R^{102}$ to $R^{104}$" described above, including the preferred ones and the like.

Examples of the phenyl group substituted with a C1-C4 alkoxy group for the group D include 4-methoxyphenyl and the like. Furthermore, examples of the C1-C4 alkoxy group, which is the substituent, include those described for the "C1-C4 alkoxy group for $R^{102}$ to $R^{104}$" described above, including the preferred ones and the like.

Examples of the phenyl group substituted with an amino group for the group D include 2-aminophenyl, 3-aminophenyl, 4-aminophenyl and the like.

Examples of the phenyl group substituted with a mono-C1-C4 alkylamino group for the group D include 4-methylaminophenyl and the like. Furthermore, examples of the mono-C1-C4 alkylamino group, which is the substituent, include those described for the "mono-C1-C4 alkylamino group for $R^{102}$ to $R^{104}$" described above, including the preferred ones and the like.

Examples of the phenyl group substituted with a di-C1-C4 alkylamino group for the group D include 4-dimethylaminophenyl and the like. Furthermore, examples of the di-C1-C4 alkylamino group, which is the substituent, include those described for the "di-C1-C4 alkylamino group for $R^{102}$ to $R^{104}$" described above, including the preferred ones and the like.

Examples of the phenyl group substituted with a C1-C4 alkylcarbonylamino group for the group D include 4-acetylaminophenyl and the like. Furthermore, examples of the C1-C4 alkylcarbonylamino group, which is the substituent, include those described for the "C1-C4 alkylcarbonylamino group for $R^{102}$ to $R^{104}$" described above, including the preferred ones and the like.

Examples of the phenyl group substituted with a benzoylamino group for the group D include 4-benzoylaminophenyl and the like.

Examples of the phenyl group substituted with "a benzoylamino group having its benzene ring substituted with at least one group selected from the group consisting of a halogen atom, a C1-C4 alkyl group, a nitro group, a sulfo group, and a carboxy group" for the group D, include 4-(4-chlorophenylbenzoylamino)phenyl, 4-(4-methylphenylbenzoylamino)phenyl, 4-(4-nitrophenylbenzoylamino)phenyl, 4-(4-sulfophenylbenzoylamino)phenyl, 4-(4-carboxyphenylbenzoylamino)phenyl and the like. Furthermore, examples of the "benzoylamino group having its benzene ring substituted with at least one group selected from the group consisting of a halogen atom, a C1-C4 alkyl group, a nitro group, a sulfo group, and a carboxy group", which is the substituent, include those described for the "benzoylamino group having its benzene ring substituted with at least one group selected from the group consisting of a halogen atom, a C1-C4 alkyl group, a nitro group, a sulfo group, and a carboxy group for $R^{102}$ to $R^{104}$" described above, including the preferred ones and the like.

Examples of the phenyl group substituted with the phenylsulfonyloxy group for the group D include 4-phenylsulfonyloxyphenyl and the like.

For the phenyl group substituted with "a phenylsulfonyloxy group having its benzene ring substituted with at least one group selected from the group consisting of a halogen atom, a nitro group, and a C1-C4 alkyl group" for the group D, examples of the "phenylsulfonyloxy group having its benzene ring substituted with at least one group selected from the group consisting of a halogen atom, a nitro group, and a C1-C4 alkyl group" include usually those substituted with one to three, preferably one or two of these groups. When multiple groups are substituted, there are no particular limitations on the kinds of the substituents, but the same kind is preferred. There are no particular limitations on the position of the substituent. Specific examples include those substituted with a halogen atom such as 4-chlorophenylsulfonyloxy, 2,4-dichlorophenylsulfonyloxy and 3,5-dichlorophenylsulfonyloxy; those substituted with a nitro group such as 2-nitrophenylsulfonyloxy and 4-nitrophenylsulfonyloxy; those substituted with a C1-C4 alkyl group such as 4-methylphenylsulfonyloxy and 2,4-dimethylphenylsulfonyloxy; and the like.

Meanwhile, examples of the C1-C4 alkyl group among these substituents include those described for the "C1-C4 alkyl group for $R^{102}$ to $R^{104}$" described above, including the preferred ones and the like.

Examples of the phenyl group substituted with a substituted phenylsulfonyloxy group described above in the group D include 4-(4-methylphenyl)sulfonyloxyphenyl and the like.

Examples of the phenyl group substituted with multiple kinds of the groups for the group D include those substituted with a hydroxy group and a carboxy group such as 3-hydroxy-4-carboxyphenyl; those substituted with a hydroxy group, a sulfo group, and a carboxy group such as 3-carboxy-2-hydroxy-5-sulfophenyl; and the like.

When the group D in the formula (3) is a naphthyl group, a naphthyl group substituted with the specific group described above will be described. The number of the substituents is one to three. When multiple groups are substituted, there are no particular limitations on the kinds of the substituents, but the same kind is preferred. The position of the bond of the group D with the nitrogen atom of the pyrazolone ring is preferably the 1-position or the 2-position, that is, 1-naphthyl or 2-naphthyl is preferred. There are no particular limitations on the position of the substituent on the naphthyl group, but those described below are preferred.

Specifically,
[When the group D is a 1-naphthyl group]
(a) When the number of the substituents is one, the 3-, 4-, 5-, 6- and 7-positions.
(b) When the number of the substituents is two, the combinations of the 3-position and the 4-position, the 3-position and the 5-position, the 3-position and the 6-position, the 3-position and the 7-position, the 4-position and the 6-position, the 4-position and the 7-position, and the 5-position and the 7-position.
(c) When the number of the substituents is three, the combinations of the 3-position, the 4-position and the 6-position, the 3-position, the 4-position and the 7-position, the 3-position, the 5-position and the 6-position, the 3-position, the 5-position and the 7-position, and the 3-position, the 6-position and the 7-position.
[When the group D is a 2-naphthyl group]
(d) When the number of the substituents is one, the 4-, 5-, 6-, 7-, and 8-positions.
(e) When the number of the substituents is two, the combinations of the 4-position and the 6-position, the 4-position and the 7-position, the 4-position and 8-position, the 5-position and the 6-position, the 5-position and the 7-position, the 5-position and 8-position, and the 6-position and 8-position.
(f) When the number of the substituents is three, the combinations of the 4-position, the 6-position and the 7-position, the 4-position, the 6-position and 8-position, and the 4-position, the 7-position and 8-position.

Meanwhile, the position of the bond of the nitrogen atom of the pyrazolone ring to the naphthyl group, and the position of the respective substituents on the naphthyl group in each constitution to be described below are described conforming to those described above.

Examples of the naphthyl group substituted with a hydroxy group for the group D include 4-hydroxynaphth-1-yl, 6-hydroxynaphth-1-yl, 5-hydroxynaphth-2-yl and the like.

Examples of the naphthyl group substituted with a sulfo group for the group D include 7-sulfonaphth-1-yl, 5,7-disulfonaphth-2-yl, 6,8-disulfonaphth-2-yl, 4,8-disulfonaphth-2-yl, 4,6,8-trisulfonaphth-2-yl, 4,7,8-trisulfonaphth-2-yl and the like.

Examples of the naphthyl group substituted with a carboxy group for the group D include 7-carboxy naphth-1-yl and the like.

Examples of the naphthyl group substituted with a C1-C4 alkyl group for the group D include 4-methylnaphth-1-yl and the like. Furthermore, examples of the C1-C4 alkyl group, which is the substituent, include those described for the "C1-C4 alkyl group for $R^{102}$ to $R^{104}$" described above, including the preferred ones and the like.

Examples of the naphthyl group substituted with a C1-C4 alkoxy group for the group D include 4-methoxynaphth-1-yl, 6-methoxynaphth-2-yl and the like. Furthermore, examples of the C1-C4 alkoxy group, which is the substituent, include those described for the "C1-C4 alkoxy group for $R^{102}$ to $R^{104}$" described above, including the preferred ones and the like.

Examples of the naphthyl group substituted with an amino group for the group D include 4-aminonaphth-1-yl and the like.

Examples of the naphthyl group substituted with a mono-C1-C4 alkylamino group for the group D include 4-methylaminonaphth-1-yl and the like. Furthermore, examples of the mono-C1-C4 alkylamino group, which is the substituent, include those described for the "mono-C1-C4 alkylamino group for $R^{102}$ to $R^{104}$" described above, including the preferred ones and the like.

Examples of the naphthyl group substituted with a di-C1-C4 alkylamino group for the group D include 4-dimethylaminonaphth-1-yl and the like. Furthermore, examples of the di-C1-C4 alkylamino group, which is the substituent, include those described for the "di-C1-C4 alkylamino group for $R^{102}$ to $R^{104}$" described above, including the preferred ones and the like.

Examples of the naphthyl group substituted with a C1-C4 alkylcarbonylamino group for the group D include 4-acetylaminonaphth-1-yl and the like. Furthermore, examples of the di-C1-C4 alkylcarbonylamino group, which is the substituent, include those described for the "C1-C4 alkylcarbonylamino group for $R^{102}$ to $R^{104}$" described above, including the preferred ones and the like.

Examples of the naphthyl group substituted with "a benzoylamino group having its benzene ring substituted with a group selected from the group consisting of a halogen atom, a C1-C4 alkyl group, a nitro group, a sulfo group, and a carboxy group" for the group D include 4-(4-chlorophenylbenzoylamino)naphtho-1-yl and the like. Furthermore, examples of the "benzoylamino group having its benzene ring substituted with a group selected from the group consisting of a halogen atom, a C1-C4 alkyl group, a nitro group, a sulfo group, and a carboxy group", which is the substituent, include those described for the "benzoylamino group having its benzene ring substituted with at least one group selected from the group consisting of a halogen atom, a C1-C4 alkyl group, a nitro group, a sulfo group, and a carboxy group for $R^{102}$ to $R^{104}$" described above, including the preferred ones and the like.

Examples of the naphthyl group substituted with a phenylsulfonyloxy group for the group D include 4-phenylsulfonyloxynaphth-1-yl, 5-phenylsulfonyloxynaphth-2-yl and the like.

For a naphthyl group substituted with "a phenylsulfonyloxy group having its benzene ring substituted with at least one group selected from the group consisting of a halogen atom, a nitro group, and a C1-C4 alkyl group" in the group D, examples of the "phenylsulfonyloxy group having its benzene ring substituted with at least one group selected from the group consisting of a halogen atom, a nitro group, and a C1-C4 alkyl group" include usually those substituted with one to three, preferably one or two of these groups. When multiple groups are substituted, there are no particular limitations on the kinds of the substituents, but the same kind is preferred. There are no particular limitations on the position of the substituent. Specific examples include those substituted with a halogen atom such as 4-chlorophenylsulfonyloxy, 2,4-dichlorophenylsulfonyloxy and 3,5-dichlorophenylsulfonyloxy; those substituted with a nitro group such as 2-nitrophenylsulfonyloxy and 4-nitrophenylsulfonyloxy; those substituted with a C1-C4 alkyl group such as 4-methylphenylsulfonyloxy and 2,4-dimethylphenylsulfonyloxy; and the like.

Meanwhile, among these substituents, examples of the C1-C4 alkyl group include those described for the "C1-C4 alkyl group for $R^{102}$ to $R^{104}$" described above, including the preferred ones and the like.

Examples of the naphthyl group substituted with a substituted phenylsulfonyloxy group described above in the group D include 4-(4-methylphenyl)sulfonyloxynaphth-1-yl, 5-(4-methylphenyl)sulfonyloxynaphth-2-yl and the like.

Among those described above, preferred ones as the group D are a phenyl group; a phenyl group substituted with at least one group selected from the group consisting of a hydroxy group, a sulfo group, a carboxy group, a C1-C4 alkyl group, and a C1-C4 alkoxy group; a naphthyl group; a naphthyl group substituted with at least one group selected from the group consisting of a hydroxy group, a sulfo group, a carboxy group, a C1-C4 alkyl group, and a C1-C4 alkoxy group; and the like. More preferably, the group D is a phenyl group, a phenyl group substituted with a sulfo group, a phenyl group substituted with a carboxy group, or a naphthyl group substituted with a sulfo group, and further preferably a phenyl group substituted with a sulfo group, or a naphthyl group substituted with a sulfo group.

A compound of a combination of the preferred ones described for the substituents of the formula (3) is more preferred, and a compound of a combination of the more preferred ones is further preferred. The same applies also to combinations of even more preferred examples, combinations of preferred examples and more preferred examples, and the like.

There are no particular limitations on the suitable specific examples of the azo compound of the present invention represented by the formula (3), but some suitable specific examples include the compounds presented in the following Tables 23 to 34, etc.

In the respective tables, the functional groups such as a sulfo group and a carboxy group in each table are indicated in the form of free acid, for convenience.

TABLE 23

| Compound No. | Structural formula |
|---|---|
| 78 | 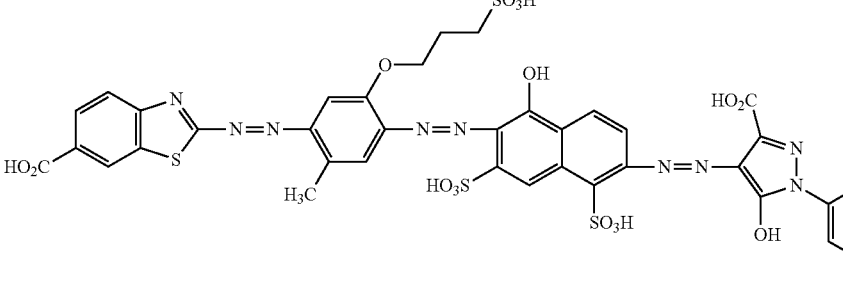 |
| 79 | 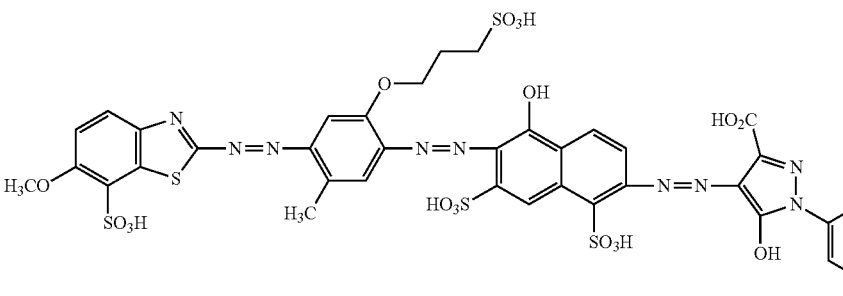 |
| 80 | 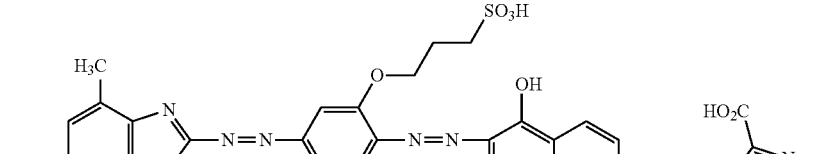 |

TABLE 23-continued

| Compound No. | Structural formula |
| --- | --- |
| 81 | |
| 82 | |
| 83 | |

TABLE 24

| Compound No. | Structural formula |
| --- | --- |
| 84 | |

TABLE 24-continued
| Compound No. | Structural formula |
|---|---|
| 85 | 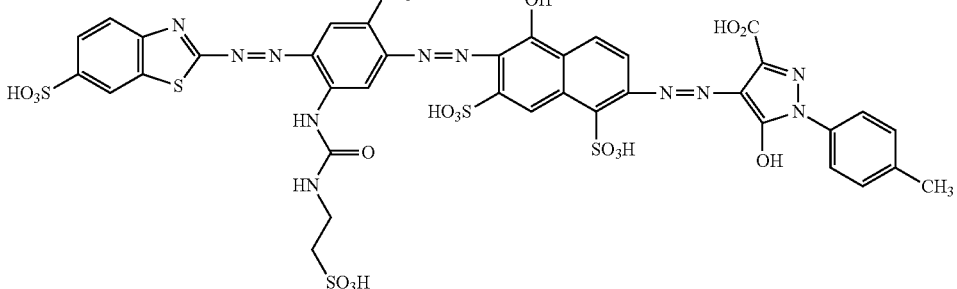 |
| 86 | 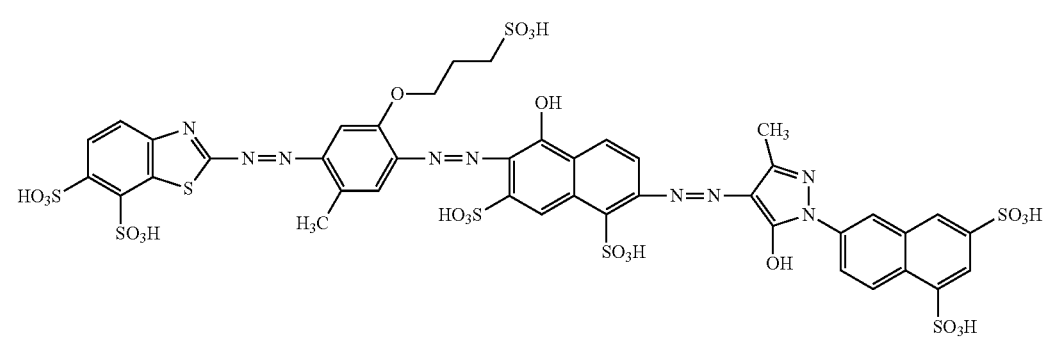 [SMILES: Cc1cc(N=Nc2c(S(=O)(=O)O)cc3c(S(=O)(=O)O)c(N=Nc4c(C)nn(-c5ccc6c(S(=O)(=O)O)cc(S(=O)(=O)O)cc6c5)c4O)ccc3c2O)c(OCCCS(=O)(=O)O)cc1N=Nc1nc2ccc(S(=O)(=O)O)c(S(=O)(=O)O)c2s1] |
| 87 | 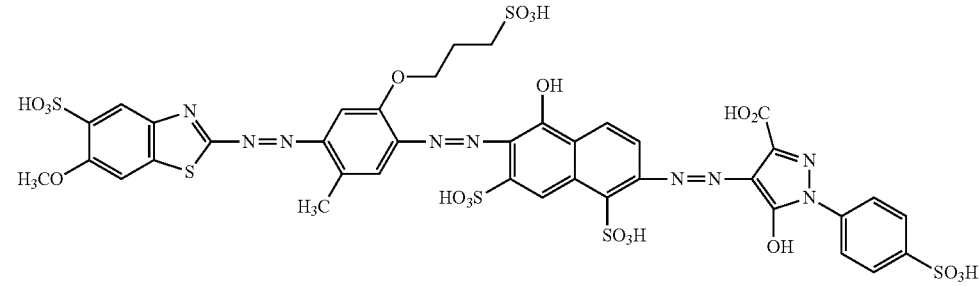 [SMILES: COc1cc2sc(N=Nc3cc(OCCCS(=O)(=O)O)c(N=Nc4c(S(=O)(=O)O)cc5c(S(=O)(=O)O)c(N=Nc6c(C(=O)O)nn(-c7ccc(S(=O)(=O)O)cc7)c6O)ccc5c4O)cc3C)nc2cc1S(=O)(=O)O] |
| 88 | 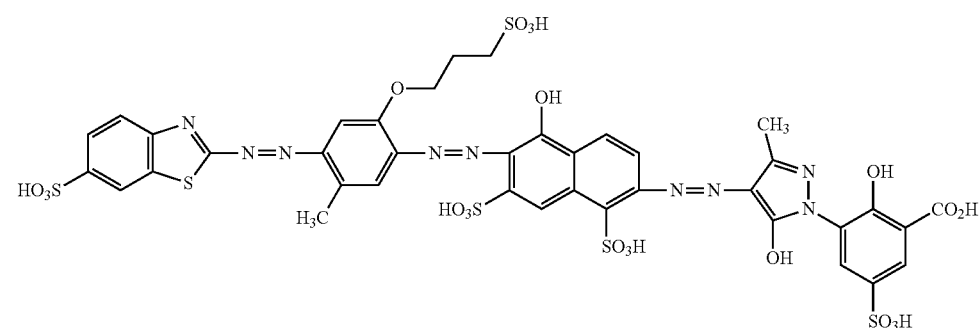 [SMILES: Cc1cc(N=Nc2c(S(=O)(=O)O)cc3c(S(=O)(=O)O)c(N=Nc4c(C)nn(-c5cc(S(=O)(=O)O)cc(C(=O)O)c5O)c4O)ccc3c2O)c(OCCCS(=O)(=O)O)cc1N=Nc1nc2ccc(S(=O)(=O)O)cc2s1] |
| 89 | 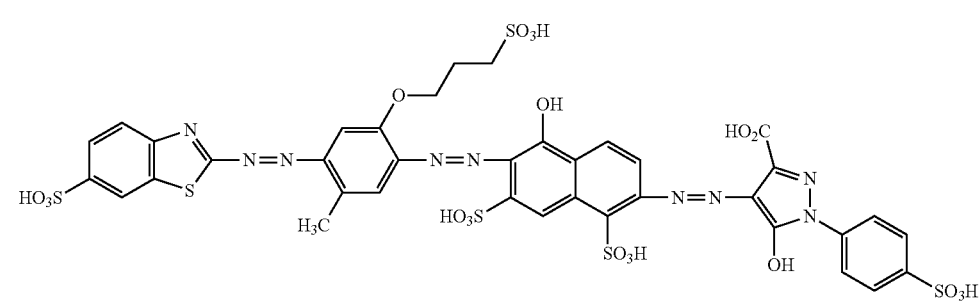 [SMILES: Cc1cc(N=Nc2c(S(=O)(=O)O)cc3c(S(=O)(=O)O)c(N=Nc4c(C(=O)O)nn(-c5ccc(S(=O)(=O)O)cc5)c4O)ccc3c2O)c(OCCCS(=O)(=O)O)cc1N=Nc1nc2ccc(S(=O)(=O)O)cc2s1] |

TABLE 25

| Compound No. | Structural formula |
|---|---|
| 90 | |
| 91 | |
| 92 | |
| 93 | |
| 94 | |

TABLE 25-continued

| Compound No. | Structural formula |
|---|---|
| 95 | |

TABLE 26

| Compound No. | Structural formula |
|---|---|
| 96 | |
| 97 | |
| 98 | |

TABLE 26-continued

| Compound No. | Structural formula |
|---|---|
| 100 | |
| 101 | |
| 102 | |

TABLE 27

| Compound No. | Structural formula |
|---|---|
| 103 | |

TABLE 27-continued

| Compound No. | Structural formula |
|---|---|
| 104 | |
| 105 | |
| 106 | |
| 107 | |

TABLE 27-continued
| Compound No. | Structural formula |
|---|---|
| 108 | 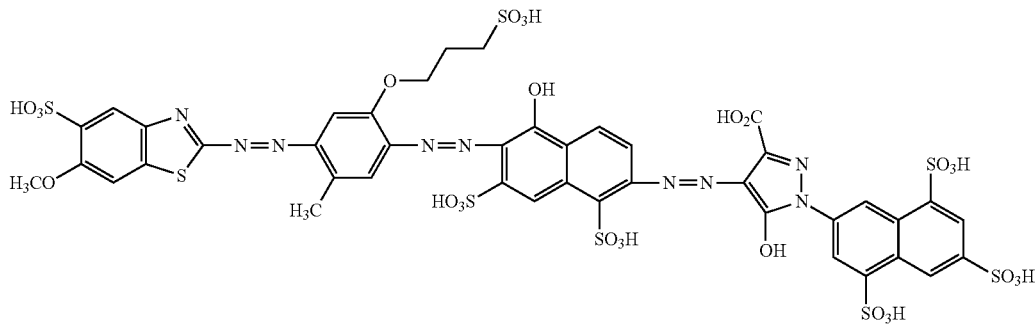 [SMILES: COc1cc2sc(N=Nc3cc(OCCCS(=O)(=O)O)c(N=Nc4c(S(=O)(=O)O)cc5c(S(=O)(=O)O)c(N=Nc6c(C(=O)O)nn(-c7cc(S(=O)(=O)O)c8cc(S(=O)(=O)O)cc(S(=O)(=O)O)c8c7)c6O)ccc5c4O)cc3C)nc2cc1S(=O)(=O)O] |
TABLE 28
| Compound No. | Structural formula |
|---|---|
| 109 | 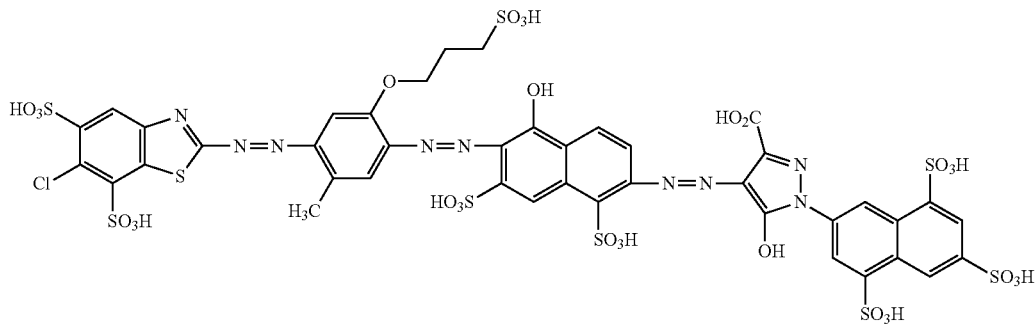 [SMILES: Cc1cc(N=Nc2c(S(=O)(=O)O)cc3c(S(=O)(=O)O)c(N=Nc4c(C(=O)O)nn(-c5cc(S(=O)(=O)O)c6cc(S(=O)(=O)O)cc(S(=O)(=O)O)c6c5)c4O)ccc3c2O)c(OCCCS(=O)(=O)O)cc1N=Nc1nc2cc(S(=O)(=O)O)c(Cl)c(S(=O)(=O)O)c2s1] |
| 110 | 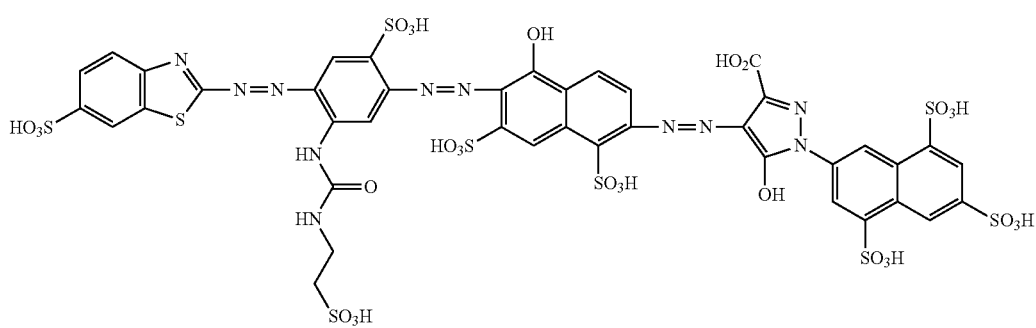 [SMILES: O=C(NCCS(=O)(=O)O)Nc1cc(N=Nc2c(S(=O)(=O)O)cc3c(S(=O)(=O)O)c(N=Nc4c(C(=O)O)nn(-c5cc(S(=O)(=O)O)c6cc(S(=O)(=O)O)cc(S(=O)(=O)O)c6c5)c4O)ccc3c2O)c(S(=O)(=O)O)cc1N=Nc1nc2ccc(S(=O)(=O)O)cc2s1] |
| 111 | 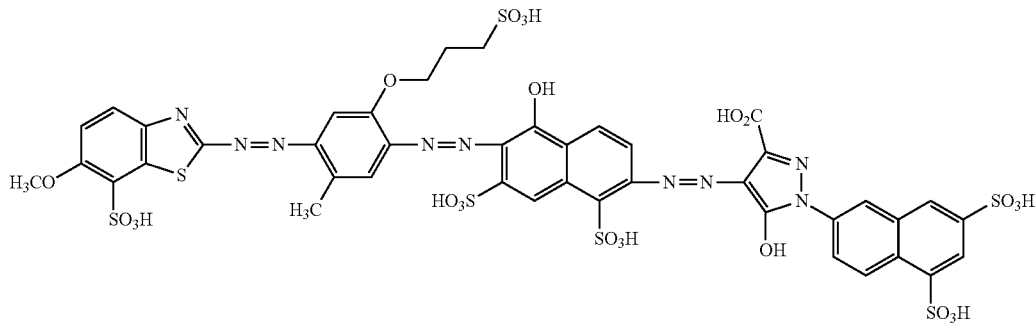 [SMILES: COc1ccc2nc(N=Nc3cc(OCCCS(=O)(=O)O)c(N=Nc4c(S(=O)(=O)O)cc5c(S(=O)(=O)O)c(N=Nc6c(C(=O)O)nn(-c7ccc8c(S(=O)(=O)O)cc(S(=O)(=O)O)cc8c7)c6O)ccc5c4O)cc3C)sc2c1S(=O)(=O)O] |

TABLE 28-continued

| Compound No. | Structural formula |
|---|---|
| 112 | |
| 113 | |
| 114 | |

TABLE 29

| Compound No. | Structural formula |
|---|---|
| 115 | |

TABLE 29-continued

| Compound No. | Structural formula |
|---|---|
| 116 | |
| 117 | |
| 118 | |
| 119 | |

TABLE 29-continued

| Compound No. | Structural formula |
|---|---|
| 120 | |

TABLE 30

| Compound No. | Structural formula |
|---|---|
| 121 | |
| 122 | |
| 123 | |

TABLE 30-continued

| Compound No. | Structural formula |
|---|---|
| 124 | |
| 125 | |
| 126 | |

TABLE 31

| Compound No. | Structural formula |
|---|---|
| 127 | |

TABLE 31-continued

| Compound No. | Structural formula |
| --- | --- |
| 128 | |
| 129 | |
| 130 | |
| 131 | |

TABLE 31-continued

| Compound No. | Structural formula |
|---|---|
| 132 | (structure) |

TABLE 32

| Compound No. | Structural formula |
|---|---|
| 133 | (structure) |
| 134 | (structure) |
| 135 | (structure) |

TABLE 32-continued

| Compound No. | Structural formula |
|---|---|
| 136 | |
| 137 | |
| 138 | |

TABLE 33

| Compound No. | Structural formula |
|---|---|
| 139 | |

TABLE 33-continued

| Compound No. | Structural formula |
|---|---|
| 140 | |
| 141 | |
| 142 | |
| 143 | |

TABLE 33-continued

| Compound No. | Structural formula |
|---|---|
| 144 | (structure) |

TABLE 34

| Compound No. | Structural formula |
|---|---|
| 145 | (structure) |
| 146 | (structure) |
| 147 | (structure) |

TABLE 34-continued

| Compound No. | Structural formula |
|---|---|
| 148 | (structure shown) |
| 149 | (structure shown) |
| 150 | (structure shown) |

The mixing ratios of the coloring matter (I) and the coloring matter (II) in the present invention are such that the ratio of the coloring matter (I) is 10 to 40% by mass, and the ratio of the coloring matter (II) is 10 to 80% by mass, and preferably the ratio of the coloring matter (I) is 15 to 35% by mass, and the ratio of the coloring matter (II) is 20 to 80% by mass in the total mass of the coloring matters contained in the ink composition.

The ink composition of the present invention may contain other coloring matters having various colors in addition to the coloring matters (I) and (II) for the purpose of subtly adjusting neutral, high quality black hue with low chroma and no color tone to more desirable hue and the like, to the extent that it does not harm the effects obtained according to the present invention.

In this case, coloring matters of other colors such as black coloring matters having the other hues; yellow (for example, C.I. Direct Yellow 34, C.I. Direct Yellow 58, C.I. Direct Yellow 86, C.I. Direct Yellow 132, C.I. Direct Yellow 142, C.I. Direct Yellow 161 and the like); orange (for example, C.I. Direct Orange 17, C.I. Direct Orange 26, C.I. Direct Orange 29, C.I. Direct Orange 39, C.I. Direct Orange 49 and the like); brown; scarlet (for example, C.I. Direct Red 89 and the like); red (for example, C.I. Direct Red 62, C.I. Direct Red 75, C.I. Direct Red 79, C.I. Direct Red 80, C.I. Direct Red 84, C.I. Direct Red 225, C.I. Direct Red 226 and the like), magenta (for example, C.I. Direct Red 227, C.I. Acid Red 249, C.I. Acid Red 254 and the like); blue (for example, C.I. Acid Blue 9, C.I. Acid Blue 83, C.I. Acid Blue 90, C.I. Acid Blue 249, C.I. Direct Blue 86, C.I. Direct Blue 87, C.I. Direct Blue 199 and the like); violet; navy; cyan; green, black (for example, C.I. Food Black 2, C.I. Direct Black 19 and the like); can be incorporated and used singly or as mixtures.

Furthermore, examples of the other coloring matters described above that can be used include the compounds described in Japanese Unexamined Patent Application, Publication No. 2003-201412, the compounds described in PCT International Publication No. WO2005/054374, the compounds described in PCT International Publication No. WO2005/097912, the compounds described in PCT International Publication No. WO2006/051850, and the like. For example, examples include the compounds described in Tables 1 to 3 of Japanese Unexamined Patent Application, Publication No. 2003-201412, the compounds described in Tables 2 to 5 of PCT International Publication No. WO 2005/054374, the compounds described in Tables 2 to 5 of PCT International Publication No. WO2005/097912, the compounds described in Tables 2 to 4 of PCT International Publication No. WO2006/051850, and the like.

When these coloring matters are contained in the ink composition of the present invention, it is difficult to decide the content sweepingly. For the criteria, in the case where coloring matters having the hues of yellow to red are used, they are preferably used within a range of the content ratio of the coloring matter (I) described above, and in the case where coloring matters having the hues of cyan to black are used, they are preferably used within a range of the content ratio of the coloring matter (II) described above.

A salt of the compounds represented by the formula (1) to the formula (4) or a tautomer thereof is a salt with an inorganic or organic cation. Among them, specific examples of the inorganic salts include alkaline metal salts, alkaline earth metal salts, and ammonium salts. Examples of preferred inorganic salts include respective salts with lithium, sodium and potassium, and ammonium salts. On the other hand, examples of the salt with organic cations include, for example, but not limited to, salts with quaternary ammonium represented by the following formula (8). Furthermore, free acid, a tautomer thereof, and various salts thereof may be in a mixture. For example, any combinations may be used such as a mixture of a sodium salt and an ammonium salt, a mixture of a free acid and a sodium salt, and a mixture of lithium salt, a sodium salt, and an ammonium salt. In some cases, the properties of respective compounds such as solubility may vary depending on the type of the salt. Thus, it is possible to obtain a mixture having properties that suit the purpose by appropriately selecting the type of the salt as necessary; by changing the ratios of salts if the system contains plural salts and the like; or the like.

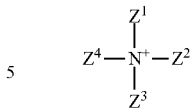

(8)

In the formula (8), $Z^1$, $Z^2$, $Z^3$ and $Z^4$ each independently represent a group selected from the group consisting of a hydrogen atom, an alkyl group, a hydroxyalkyl group, and a hydroxyalkoxyalkyl group, and at least any one of them represents a group other than a hydrogen atom.

Specific examples of the alkyl group of $Z^1$, $Z^2$, $Z^3$ and $Z^4$ for the formula (8) include methyl, ethyl, n-propyl, isopropyl, n-butyl, isobutyl, sec-butyl, t-butyl and the like. Specific examples of the hydroxyalkyl group include hydroxy-C1-C4 alkyl groups such as hydroxymethyl, hydroxyethyl, 3-hydroxypropyl, 2-hydroxypropyl, 4-hydroxybutyl, 3-hydroxybutyl and 2-hydroxybutyl. Specific examples of the hydroxyalkoxyalkyl group include hydroxy-C1-C4 alkoxy-C1-C4 alkyl groups such as hydroxyethoxymethyl, 2-hydroxyethoxyethyl, 3-hydroxyethoxypropyl, 2-hydroxyethoxypropyl, 4-hydroxyethoxybutyl, 3-hydroxyethoxybutyl and 2-hydroxyethoxybutyl. Among these, hydroxyethoxy-C1-C4 alkyl is preferred. Particularly preferred examples include a hydrogen atom; methyl; hydroxy-C1-C4 alkyl groups such as hydroxymethyl, hydroxyethyl, 3-hydroxypropyl, 2-hydroxypropyl, 4-hydroxybutyl, 3-hydroxybutyl and 2-hydroxybutyl; and hydroxyethoxy-C1-C4 alkyl groups such as hydroxyethoxymethyl, 2-hydroxyethoxyethyl, 3-hydroxyethoxypropyl, 2-hydroxyethoxypropyl, 4-hydroxyethoxybutyl, 3-hydroxyethoxybutyl and 2-hydroxyethoxybutyl.

Specific examples of the combinations of $Z^1$, $Z^2$, $Z^3$, and $Z^4$ for preferred compounds of the formula (8) are presented in the following Table 35.

TABLE 35

| Compound No. | $Z^1$ | $Z^2$ | $Z^3$ | $Z^4$ |
|---|---|---|---|---|
| 1-1 | H | CH$_3$ | CH$_3$ | CH$_3$ |
| 1-2 | CH$_3$ | CH$_3$ | CH$_3$ | CH$_3$ |
| 1-3 | H | —C$_2$H$_4$OH | —C$_2$H$_4$OH | —C$_2$H$_4$OH |
| 1-4 | CH$_3$ | —C$_2$H$_4$OH | —C$_2$H$_4$OH | —C$_2$H$_4$OH |
| 1-5 | H | —CH$_2$CH(OH)CH$_3$ | —CH$_2$CH(OH)CH$_3$ | —CH$_2$CH(OH)CH$_3$ |
| 1-6 | CH$_3$ | —CH$_2$CH(OH)CH$_3$ | —CH$_2$CH(OH)CH$_3$ | —CH$_2$CH(OH)CH$_3$ |
| 1-7 | H | —C$_2$H$_4$OH | H | —C$_2$H$_4$OH |
| 1-8 | CH$_3$ | —C$_2$H$_4$OH | H | —C$_2$H$_4$OH |
| 1-9 | H | —CH$_2$CH(OH)CH$_3$ | H | —CH$_2$CH(OH)CH$_3$ |
| 1-10 | CH$_3$ | —CH$_2$CH(OH)CH$_3$ | H | —CH$_2$CH(OH)CH$_3$ |
| 1-11 | CH$_3$ | —C$_2$H$_4$OH | CH$_3$ | —C$_2$H$_4$OH |
| 1-12 | CH$_3$ | —CH$_2$CH(OH)CH$_3$ | CH$_3$ | —CH$_2$CH(OH)CH$_3$ |

A method of synthesizing respective compounds represented by the formula (1) to the formula (4) will be described.

The compounds represented by the formula (1), the formula (2), and the formula (4) can be synthesized by, for example, a method such as described below. Meanwhile, the structural formulae of the compounds given in each step are expressed in the form of a free acid, and $R^1$ to $R^8$ and X that are appropriately used in the following formulae (9) to (24) have the same meanings as $R^1$ to $R^8$ and X, respectively, as defined for the formula (1), the formula (2), and the formula (4).

First, a compound represented by the following formula (9) is diazotized by a routine method, and this product and a compound represented by the following formula (10) are subjected to a coupling reaction by a routine method.

Thus, a compound represented by the following formula (11) is obtained. As another synthesis method for the compound represented by the formula (11), the following method may be used. Specifically, a compound represented by the following formula (9) is diazotized by a routine method, and this product and a methyl-ω-sulfonic acid derivative of aniline are subjected to a coupling reaction by a routine method and then to hydrolysis under alkaline conditions. Thus, a compound represented by the following formula (12) is obtained. The compound represented by the formula (12) thus obtained is sulfonated by treating the compound with fuming sulfuric acid or the like. Thus, a compound represented by the formula (11) can be obtained. Furthermore, among the compounds represented by the formula (11), there are also products available as commercial products (for example, C.I. Acid yellow 9).

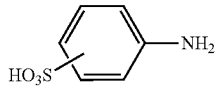
(9)

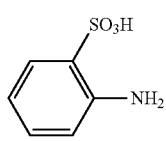
(10)

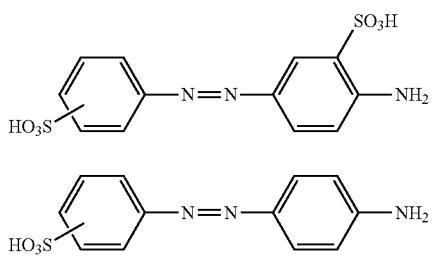
(11)

(12)

Subsequently, the compound represented by the formula (11) thus obtained is diazotized by a routine method, and then this product and a compound represented by the following formula (13) are subjected to a coupling reaction by a routine method. Thus, a compound represented by the following formula (14) is obtained.

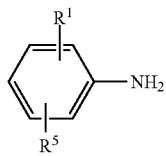
(13)

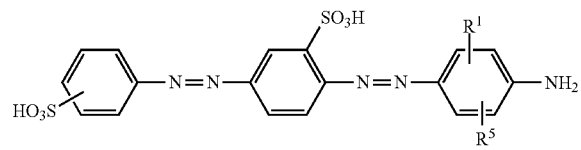
(14)

On the other hand, the compound represented by the formula (11) is diazotized by a routine method, and then this product and a compound represented by the following formula (15) are subjected to a coupling reaction by a routine method. Thus, a compound represented by the following formula (16) is obtained.

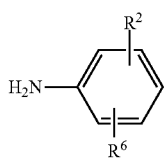
(15)

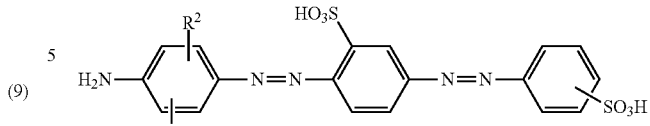
(16)

In the same manner, the compound represented by the formula (11) is diazotized by a routine method, and then this product and a compound represented by the following formula (17) are subjected to a coupling reaction by a routine method. Thus, a compound represented by the following formula (18) is obtained.

(17)

(18)

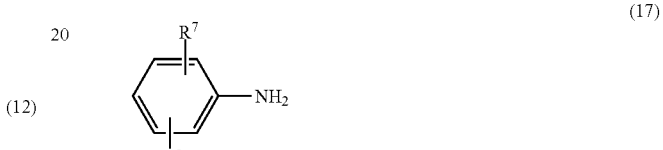
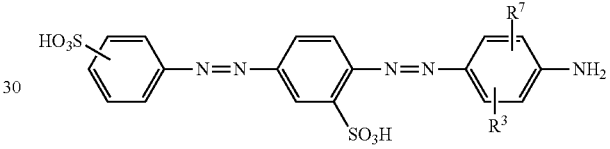

In the same manner, the compound represented by the following formula (11) is diazotized by a routine method, and then this product and a compound represented by the following formula (19) are subjected to a coupling reaction by a routine method. Thus, a compound represented by the following formula (20) is obtained.

(19)

(20)

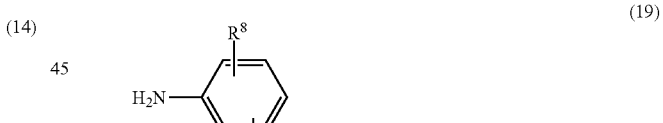
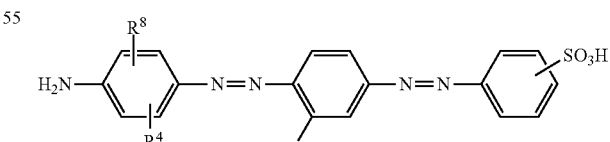

Then, the compound represented by the formula (14) thus obtained is subjected to a condensation reaction with a cyanuric halide, for example, cyanuric chloride, by a routine method, and thus a compound represented by the following formula (21) is obtained.

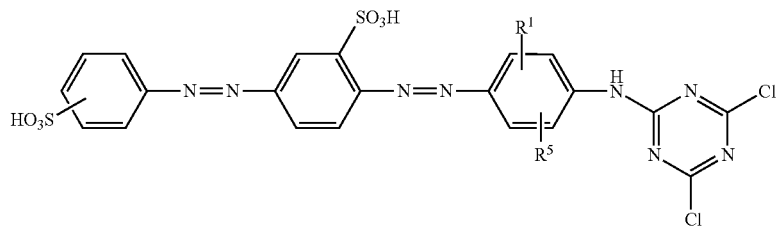

(21)

Subsequently, the compound represented by the formula (21) thus obtained is subjected to a condensation reaction with the compound represented by the formula (16) by a routine method, and thus a compound represented by the following formula (22) is obtained.

The compound represented by the formula (22), the compound represented by the formula (24) thus obtained, and a compound represented by the following formula (25), which corresponds to the crosslinking group X, are subjected to a

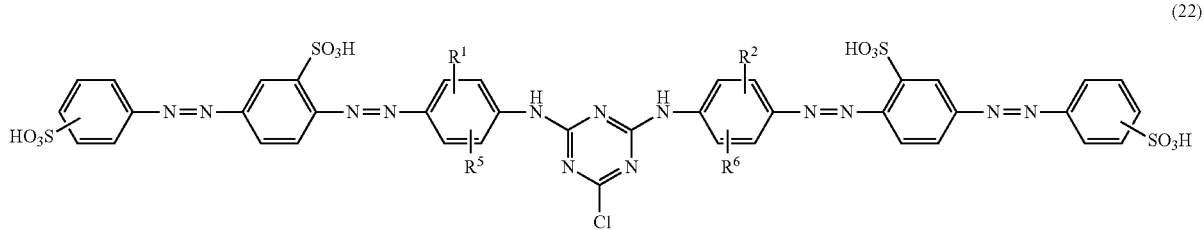

(22)

In the same manner, the compound represented by the formula (18) thus obtained is subjected to a condensation reaction with a cyanuric halide, for example, cyanuric chloride, by a routine method, and thus a compound represented by the following formula (23) is obtained.

condensation reaction by a routine method. Thus, the compound represented by the formula (1) can be obtained.

$$H-X-H \quad (25)$$

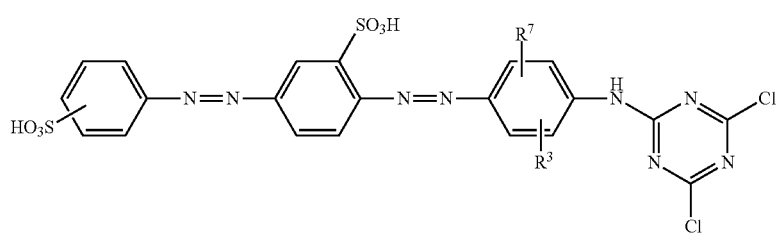

(23)

Subsequently, the compound represented by the formula (23) thus obtained is subjected to a condensation reaction with the compound represented by the formula (20) by a routine method, and thus a compound represented by the following formula (24) is obtained.

The diazotization of the compound represented by the formula (9) is carried out by a method that is known per se. For example, the diazotization is carried out in an inorganic acid medium at a temperature of, for example, $-5°$ C. to $30°$ C.,

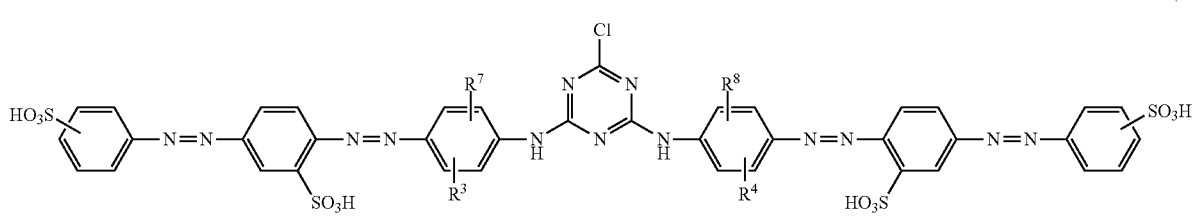

(24)

and preferably 0° C. to 20° C., using a nitrous acid salt, for example, a nitrous acid alkali metal salt such as sodium nitrite.

The coupling reaction between a diazotization product of a compound represented by the formula (9) and a compound represented by the formula (10) is also carried out under reaction conditions that are known per se. For example, it is advantageous to carry out the reaction in water or an aqueous organic medium at a temperature of 0° C. to 30° C., and preferably 5° C. to 25° C., and at a pH of an acidic to weakly acidic value, for example, at pH 1 to 6. The diazotization reaction liquid is acidic, and with the progress of the coupling reaction, the reaction system is even further acidified. Therefore, it is preferable to adjust the reaction liquid to the pH value described above by adding a base. Examples of the base that can be used include alkali metal hydroxides such as lithium hydroxide and sodium hydroxide; alkali metal carbonates such as lithium carbonate, sodium carbonate, and potassium carbonate; acetates such as sodium acetate; ammonia or organic amines. The compound represented by the formula (9) and the compound represented by the formula (10) are used in nearly stoichiometric amounts.

The diazotization of the compound represented by the formula (11) is carried out by a method that is known per se. For example, the diazotization is carried out in an inorganic acid medium at a temperature of, for example, −5° C. to 30° C., and preferably 0° C. to 25° C., using a nitrous acid salt, for example, a nitric acid alkali metal salt such as sodium nitrite.

The coupling reaction between a diazotization product of a compound represented by the formula (11) and a compound represented by the formula (13), formula (15), formula (17) or formula (19) is also carried out under reaction conditions that are known per se. For example, it is advantageous to carry out the reaction in water or an aqueous organic medium at a temperature of 0° C. to 30° C., and preferably 5° C. to 25° C., and at a pH of an acidic to weakly acidic value, for example, at pH 1 to 6. The diazotization reaction liquid is acidic, and with the progress of the coupling reaction, the reaction system is even further acidified. Therefore, it is preferable to adjust the reaction liquid to the pH value described above by adding a base. As the base, the same compounds as those described above can be used. The compound represented by the formula (11) and the compound represented by the formula (13), the formula (15), the formula (17), or the formula (19) are used in nearly stoichiometric amounts.

The condensation reaction between a compound represented by the formula (14) or the formula (18) and a cyanuric halide, for example, cyanuric chloride is carried out by a method that is known per se. For example, it is advantageous to carry out the reaction in water or an aqueous organic medium at a temperature of 0° C. to 30° C., and preferably 5° C. to 25° C., and at a pH of a weakly acidic to neutral value, for example, at pH 3 to 8. With the progress of the reaction, the reaction system is acidified, and therefore, it is preferable to adjust the system to the pH value described above by adding a base. As the base, the same compounds as those described above can be used. The compound represented by the formula (14) or (18) and cyanuric halide are used in nearly stoichiometric amounts.

The condensation reaction between a compound represented by the formula (16) and a compound represented by the formula (21), or the condensation reaction between a compound represented by the formula (20) and a compound represented by the formula (23) is carried out by a method that is known per se. For example, it is advantageous to carry out the reaction in water or an aqueous organic medium at a temperature of 10° C. to 80° C., and preferably 25° C. to 70° C., and at a pH of a weakly acidic to weakly alkaline value, for example, at pH 5 to 9. The adjustment of the pH value is carried out by adding a base. As the base, the same compounds as those described above can be used. The compound represented by the formula (16) and the compound represented by the formula (21), or the compound represented by the formula (20) and the compound represented by the formula (23) are used in nearly stoichiometric amounts.

The condensation reaction of the compound represented by the formula (22) and the compound represented by the formula (24) and the compound represented by the formula (25) is carried out by a method that is known per se. For example, it is advantageous to carry out the reaction in water or an aqueous organic medium at a temperature of 50° C. to 100° C., and preferably 60° C. to 95° C., and at a pH of a neutral to weakly alkaline value, for example, at pH 7 to 10. The adjustment of the pH value is carried out by adding a base. As the base, the same compounds as those described above can be used. The compound represented by formula (25) is used in an amount of 0.4 to 0.6 equivalents, and preferably 0.5 equivalents, relative to one equivalent of the compound represented by formula (22) and one equivalent of the compound represented by formula (24).

The compound represented by the formula (3) can be easily synthesized by a person having ordinary skill in the art by appropriately selecting synthetic raw materials in accordance with the method described in Japanese Unexamined Patent Application, Publication No. 2009-84346, or a similar method thereto.

Examples of the method of synthesizing a desired salt of the compounds represented by the formulae (1) to (4) include a method of adding, after completion of the final step in the synthesis reaction for the respective compounds, a desired inorganic salt or a desired organic cation salt to the reaction liquid, and salting out; or a method of adding a mineral acid such as hydrochloric acid to the reaction liquid to isolate the compounds in the form of free acid from the reaction liquid, subsequently washing the free acid thus obtained with water, acidic water, an aqueous organic medium or the like as necessary, to remove inorganic salts, and then neutralizing the free acid in an aqueous medium by means of a desired inorganic or organic base. Through such methods, a desired salt of the compound can be obtained in the form of a solid of corresponding salt or a solution thereof. Here, the term acidic water means, for example, a solution prepared by dissolving a mineral acid such as sulfuric acid or hydrochloric acid, or an organic acid such as acetic acid in water, and acidifying the water. Further, examples of the aqueous organic medium include a mixture of water with an organic substance that is miscible with water, or so-called an organic solvent that is miscible with water (specific examples thereof include water-soluble organic solvents and the like that will be described below), and the like. Examples of the inorganic salt include alkaline metal salts such as lithium chloride, sodium chloride and potassium chloride; ammonium salts such as ammonium chloride and ammonium bromide; and the like. Examples of the organic cation salt include halide salts of the quaternary ammonium represented by the formula (8) and the like. Examples of the inorganic base include alkaline metal hydroxides such as lithium hydroxide, sodium hydroxide and potassium hydroxide; ammonium hydroxide (aqueous ammonia); alkaline metal carbonates such as lithium carbonate, sodium carbonate and potassium carbonate; and the like. Examples of the organic base include, but are not limited to, organic amines such as diethanolamine and triethanolamine; hydroxides or halides of the quaternary ammonium represented by the formula (8); and the like.

The ink composition of the present invention will be described.

The respective reaction liquids after completion of the final step in the respective synthesis reactions for the compounds represented by the formulae (1) to (4) can be directly used in the preparation of the ink composition of the present invention. Furthermore, the respective compounds can be isolated from the reaction liquid by methods such as, for example, drying, for example, spray-drying the reaction liquid containing the respective coloring matters individually first; adding inorganic salts such as sodium chloride, potassium chloride, calcium chloride and sodium sulfate, and salting out; adding mineral acids such as hydrochloric acid, sulfuric acid and nitric acid, and acid-precipitating; acid salting out by combining the salting out and the acid-precipitation; and the like, and these respective compounds can be mixed whereby to prepare an ink composition.

Preferred coloring matters as the coloring matter (I) contained in the ink composition of the present invention are the compounds exemplified as the preferred ones in the respective compounds represented by the formulae (1), (2) and (4). The same applies also to more preferred coloring matters and the like. Furthermore, preferred coloring matters as the coloring matter (II) are similarly the compounds exemplified as preferred ones in the compound represented by the formula (3). The same applies also to more preferred coloring matter and the like. Furthermore, an ink composition containing the preferred compounds as the coloring matter (I) and the coloring matter (II) is more preferred, and an ink composition containing the more preferred compounds is further preferred. The same applies also to an ink composition containing the preferred compounds and more preferred compounds, and the like.

Examples of preferred combinations of the coloring matter (I) and the coloring matter (II) include combinations of the compounds represented by No. 59 or No. 61 as described in Table 18 as the coloring matter (I), and the compound represented by No. 79 as described in Table 23, the compound represented by No. 87 as described in Table 24, the compounds represented by No. 104 or No. 108 as described in Table 27, the compound represented by No. 128 as described in Table 31, or the compound represented by No. 137 as described in Table 32 as the coloring matter (II). The ink composition of the present invention containing this combination of the coloring matters is preferred one as the ink composition of the present invention.

The ratio of the coloring matter (I) is 10 to 40% by mass, preferably 15 to 35% by mass, and the ratio of the coloring matter (II) is 20 to 80% by mass in the total mass of the coloring matters contained in the ink composition of the present invention.

Furthermore, the sum of the masses of the coloring matter (I) and the coloring matter (II) contained in the ink composition of the present invention is usually 0.1 to 20% by mass, preferably 1 to 10% by mass, and more preferably 2 to 8% by mass, relative to the total mass of the ink composition.

The ink composition of the present invention is prepared by using water as a medium, so that the ink composition may contain a water-soluble organic solvent if necessary, to the extent that the effect of the present invention is not impaired. The water-soluble organic solvent is used for the purpose of obtaining effects such as the dissolution of dyes, prevention of drying (maintenance of a wetted state), adjustment of viscosity, acceleration of penetration, adjustment of the surface tension, and defoaming in the ink composition of the present invention, and thus it is preferable that the water-soluble organic solvent be included in the ink composition of the present invention.

Examples of the ink preparation agents include known additives such as a preservative and fungicide, a pH adjusting agent, a chelating reagent, a rust-preventive agent, an ultraviolet ray absorbing agent, a water-soluble polymer compound, a coloring matter solubilizer, a surfactant, and an oxidation-preventive agent (a fading-preventive agent).

The content of the water-soluble organic solvent is 0% to 60% by mass, and preferably 10% to 50% by mass, relative to the total mass of the ink composition of the present invention, and it is desirable to use the ink formulating agents similarly in an amount of 0% to 20% by mass, and preferably 0% to 15% by mass. The balance other than the components described above is water.

The pH of the ink composition of the present invention is preferably pH 5 to 11, and more preferably pH 7 to 10 for the purpose of enhancing the storage stability. Furthermore, the surface tension of the ink composition is preferably 25 to 70 mN/m, and more preferably 25 to 60 mN/m. In addition, the viscosity of the ink composition is preferably 30 mPa·s or lower, and more preferably 20 mPa·s or lower. The pH and the surface tension of the ink composition of the present invention can be appropriately adjusted with the pH adjusting agent and the surfactant as described below.

In the case where the ink composition of the present invention is used as an ink for ink jet recording, it is preferable to use ink compositions having smaller contents of inorganic impurities such as chlorides of metal cations (for example, sodium chloride) and sulfates (for example, sodium sulfate) in respective coloring matters (specifically, the respective compounds represented by the formulae (1) to (4)) contained in the ink composition of the present invention. The criteria for the content of the inorganic impurities is generally about 1% or lower by mass, relative to the total mass of the coloring matters, and the lower limit may be equal to or lower than the detection limit of the detecting instrument, that is, 0%. As a method of producing the compound with less inorganic impurities, for example, a desalting treatment may be carried out by an ordinary method of using a reverse osmosis membrane; a method of stirring a dried product or a wet cake of a coloring matter in a mixed solvent of C1-C4 alcohol such as methanol and water, and filtering and isolating the precipitate, and drying the product; a method of using an ion exchange resin; and the like.

Specific examples of the water-soluble organic solvent include C1-C4 alkanols such as methanol, ethanol, propanol, isopropanol, butanol isobutanol, secondary butanol and tertiary butanol; carboxylic amides such as N,N-dimethylformamide and N,N-dimethylacetamide; lactam such as 2-pyrrolidone, N-methyl-2-pyrrolidone, N-methylpyrrolidin-2-one; cyclic ureas such as 1,3-dimethylimidazolidin-2-one and 1,3-dimethylhexahydropyrimid-2-one; ketones or keto alcohols such as acetone, methyl ethyl ketone, and 2-methyl-2-hydroxypentan-4-one; cyclic ethers such as tetrahydrofuran and dioxane; mono-, oligo- or polyalkylene glycols or thioglycols having a C2-C6 alkylene unit, such as ethylene glycol, 1,2-propylene glycol, 1,3-propylene glycol, 1,2-butylene glycol, 1,4-butylene glycol, 1,6-hexylene glycol, diethylene glycol, triethylene glycol, tetraethylene glycol, dipropylene glycol, polyethylene glycol, polypropylene glycol, thiodiglycol and dithiodiglycol; polyols (triols) such as trimethylolpropane, glycerin and hexane-1,2,6-triol; C1-C4 alkyl ethers of polyhydric alcohols, such as ethylene glycol monomethyl ether, ethylene glycol monoethyl ether, diethylene glycol monomethyl ether, diethylene glycol monoethyl ether, diethylene glycol monobutyl ether (butyl carbitol), triethylene glycol monomethyl ether, and triethylene glycol monoethyl ether; lactones such as γ-butyrolactone; and sulfoxide such as dimethyl sulfoxide. These water-soluble organic solvents may be used alone, or in combination of two kinds or more.

Among these, isopropanol, N-methyl-2-pyrrolidone, glycerin, butylcarbitol and the like are preferred.

Meanwhile, the water-soluble organic solvent described above also includes a substance that is solid at normal temperature such as trimethylolpropane. However, the substance and the like exhibits water-solubility as a solid, and further an aqueous solution containing the substance and the like exhibits similar properties to those of a water-soluble organic solvent, and can be used for the same purpose. For this reason, such solid substance is encompassed in the category of the water-soluble organic solvents in the present specification for convenience as long as it can be used for the same purpose described above.

Specific examples of the fungicide include dehydrosodium acetate, benzoate sodium, sodium pyridine thione-1-oxide, p-hydroxybenzoate ethyl ester, 1,2-benzisothiazolin-3-one and a salt thereof and the like.

Specific examples of the preservative include a compound of organic sulfur based, organic nitrogen sulfur based, organic halogen based, haloallyl sulfone based, iodopropargyl based, haloalkylthio based, nitrile based, pyridine based, 8-oxyquinoline based, benzothiazole based, isothiazoline based, dithiol based, pyridineoxide based, nitropropane based, organic tin based, phenol based, quaternary ammonium salt based, triazine based, triazine based, anilide based, adamantane based, dithiocarbamate based, brominated indanone based, benzylbromoacetate based, inorganic salt based or the like.

Specific examples of the organic halogen based compound include, for example, sodium pentachlorophenol. Specific examples of the pyridineoxide based compound include, for example, sodium 2-pyridinethiol-1-oxide. Specific examples of the isothiazoline based compound include, for example, 1,2-benzisothiazolin-3-one, 2-n-octyl-4-isothiazolin-3-one, 5-chloro-2-methyl-4-isothiazolin-3-one, 5-chloro-2-methyl-4-isothiazolin-3-one magnesiumchloride, 5-chloro-2-methyl-4-isothiazolin-3-one calciumchloride, 2-methyl-4-isothiazolin-3-one calciumchloride, and the like. Specific examples of the other preservative fungicide include anhydrous sodium acetate, sodium sorbate, sodium benzoate, or (trade name) Proxel® GXL (S) and Proxel® XL-2 (S) manufactured by Arch Chemical, Inc., and the like.

As used herein, the superscript notation of "RTM" means a registered trademark.

As the pH adjusting agent, an arbitrary substance can be used as long as the pH of the ink can be controlled to fall within the range of, for example, 5 to 11 without bad influences on the ink prepared. Specific examples thereof include alkanol amines such as diethanolamine, triethanolamine and N-methyldiethanolamine; alkaline metal hydroxides such as lithium hydroxide, sodium hydroxide and potassium hydroxide; ammonium hydroxide (aqueous ammonia); alkaline metal carbonates such as lithium carbonate, sodium carbonate, sodium hydrocarbonate and potassium carbonate; alkaline metal salts of an organic acid such as sodium silicate and potassium acetate; inorganic bases such as disodium phosphate; aminosulfonic acids such as taurine; and the like.

Specific examples of the chelating reagent include disodium ethylenediamine tetraacetate, sodium nitrilo triacetate, sodium hydroxyethylethylenediamine triacetate, sodium diethylenetriamine pentaacetate, sodium uracil diacetate and the like.

Specific examples of the rust-preventive agent include acidic sulfite, sodium thiosulfate, ammonium thioglycolate, diisopropylammonium nitrite, pentaerythritol tetranitrate, dicyclohexylammonium nitrite, and the like.

Specific examples of the ultraviolet ray absorbing agent include those water-soluble such as sulfonated benzophenone based compounds, benzotriazole based compounds, salicylic acid based compounds, cinnamic acid based compounds and triazine based compound.

Specific examples of the water-soluble polymer compound include polyvinyl alcohols, cellulose derivatives, polyamine, polyimine and the like.

Specific examples of the coloring matter solubilizer include ε-caprolactam, ethylene carbonate, urea and the like.

As the oxidation-preventive agent, various organic based and metal complex based discoloration-preventive agent can be used. Specific examples of the fading-preventive agent include hydroquinones, alkoxy phenols, dialkoxy phenols, phenols, anilines, amines, indanes, chromanes, alkoxy anilines, heterocycles and the like.

Specific examples of the surfactant include known surfactants such as anionic based surfactants, cationic based surfactants and nonionic based surfactants.

Examples of the anionic surfactant include alkyl sulfonic acid salts, alkylcarboxylic acid salts, α-olefinsulfonic acid salts, polyoxyethylenealkyl ether acetic acid salts, N-acylamino acid and salts thereof, N-acylmethyltaurine salts, alkylsulfate polyoxyalkyl ether sulfuric acid salts, alkylsulfate polyoxyethylenealkyl ether phosphoric acid salts, rosin acid soap, castor oil sulfate ester salts, lauryl alcohol sulfate ester salts, alkylphenolic phosphate esters, alkylated phosphate esters, alkylarylsulfonic acid salts, diethyl sulfosuccinic acid salts, diethylhexyl sulfosuccinic acid salts, dioctyl sulfosuccinic acid salts, and the like.

Examples of the cationic surfactant include 2-vinylpyridine derivatives, poly(4-vinylpyridine) derivatives, and the like.

Examples of the amphoteric surfactant include lauryldimethylamino acetate betaine, 2-alkyl-N-carboxymethyl-N-hydroxyethylimidazolinium betaine, coconut oil fatty acid amide propyldimethylamino acetate betaine, polyoctylpolyaminoethylglycine, imidazoline derivatives, and the like.

Examples of the nonionic surfactant include: ether based surfactants such as polyoxyethylene nonylphenyl ether, polyoxyethylene octylphenyl ether, polyoxyethylene dodecyl phenyl ether, polyoxyethylene oleyl ether, polyoxyethylene lauryl ether and polyoxyethylene alkyl ether; ester based surfactants such as polyoxyethylene oleate esters, polyoxyethylene distearate esters, sorbitan laurate, sorbitan monostearate, sorbitan monooleate, sorbitan sesquioleate, polyoxyethylene monooleate and polyoxyethylene stearate; acetylene alcohol based surfactants such as 2,4,7,9-tetramethyl-5-decyne-4,7-diol, 3,6-dimethyl-4-octyne-3,6-diol and 3,5-dimethyl-1-hexyn-3-ol; and the like. Specific examples of commercially available products include (trade name) Surfynol® 104, 105, 82 and 465; and Olfine® STG, all manufactured by Nissin Chemical Industry Co., Ltd.

These ink preparation agents are used singly or as mixtures.

For the preparation of the ink composition of the present invention, there are no particular limitations on the order of dissolving respective agents such as additives. The water used at the time of preparing the ink composition is preferably water with low impurities, such as ion-exchanged water or distilled water. Furthermore, if necessary, any contaminants in the ink composition may be removed by performing precision filtration using a membrane filter and the like after the preparation of the ink composition. Particularly, in the case of using the ink composition of the present invention as an ink for ink jet recording, it is preferable to perform precision filtration. The pore size of the filter that is used to perform precision filtration is usually 1 μm to 0.1 μm, and preferably 0.8 μm to 0.1 μm.

The ink composition of the present invention is suitable for use in printing, copying, marking, writing, drawing, stamping or recording (printing), particularly ink jet recording. Furthermore, the ink composition of the present invention is such that solid precipitation does not easily occur even against drying in the vicinity of the nozzles of the recording head of ink jet printers, and for this reason, blockage of the recording head also does not easily occur.

The ink jet recording method of the present invention will be described. The ink jet recording method of the present invention is a method of using the ink composition of the present invention as an ink and discharging ink droplets of the ink in response to recording signals, and thus attaching the ink droplets onto a record-receiving material whereby to perform recording. The ink nozzles and the like that are used in the recording are not particularly limited, and can be appropriately selected in accordance with the purpose.

Examples of the recording method that may be adopted include known respective systems, for example, a charge control system which utilizes electrostatic attraction to discharge an ink; a drop-on-demand system (pressure pulse system) which utilizes vibration pressure of a piezo device; an acoustic ink jet system which changes an electric signal to acoustic beam and irradiates an ink with the acoustic beam, and utilizes the radiation pressure to discharge the ink; a thermal inkjet, specifically Bubblejet (registered trademark) system which forms bubbles by heating an ink, and utilizes generated pressure; and the like.

Meanwhile, the ink jet recording method also encompasses a system which injects an ink having low density of coloring matters (the content of the coloring matters) in the ink, which is called a photo ink, in a large number with a small volume; a system which utilizes multiple inks having different densities of coloring matters in an ink with a substantially identical hue to improve the image quality; a system which utilizes a colorless transparent ink; and the like.

The colored body of the present invention is a colored substance by means of
a) the ink composition of the present invention according to any one of the first to ninth aspects described above, or
b) the ink jet recording method of the present invention according to any one of the tenth to twelfth aspects described above, and preferably a substance colored by means of the ink jet recording method of the present invention using the ink composition of the present invention.

The substance is preferably the following record-receiving materials.

In regard to the record-receiving material that can be colored, there are no particular limitations on the material. Examples include communication sheets such as paper and films; fabrics or clothes (cellulose, nylon, wool and the like), leather, and materials for color filters. Among these, communication sheets are preferred.

Preferred examples of the communication sheets include surface-treated sheets, more specifically, sheets provided with an ink-receiving layer on a base material such as a paper, a synthetic paper or a film. The ink-receiving layer is provided by, for example, a method of impregnating or coating the base material with a cationic polymer; or a method of coating an inorganic substance capable of absorbing the coloring matter in the ink, such as porous silica, an alumina sol or a special ceramic substance, together with a hydrophilic polymer such as polyvinyl alcohol or polyvinylpyrrolidone on the surface of the base material. Those sheets provided with such an ink-receiving layer are generally referred to as exclusive ink jet paper, exclusive ink jet film, glossy papers, glossy films, and the like.

Among the communication sheets described above, a sheet coated with porous white inorganic substances on the surface particularly has high surface glossiness, and also excellent water resistance, and thus is particularly suitable for recording of photographic image quality. However, it is known that recorded images on the sheet have increase of discoloration by ozone gas. However, the ink composition of the present invention is excellent in the ozone gas fastness, and thus also exerts great effects even when an ink jet is recorded on such record-receiving materials.

Representative examples of commercial products of the sheet coated with porous white inorganic substances on the surface described above include (trade name:) Photo Paper Glossy Pro (platinum grade), Photo Paper Gloss Gold manufactured by Canon, Inc.; Photo Paper Crispia® (high glossy), Photo Paper (glossy), and Photo Matte Paper manufactured by Seiko Epson Corp.; (trade name:) Advanced Photo Paper (glossy) manufactured by Hewlett-Packard Japan, Ltd.; and (trade name:) Kassai Photo Finish Pro manufactured by Fujifilm Corporation. However, the applications of the ink composition of the present invention are not limited to these exclusive paper and the like.

In addition to the exclusive paper described above, examples of the record-receiving materials include plain papers. The plain paper is those provided with the ink-receiving layer described above. Examples of the commercial products include plain papers exclusive for ink jet such as (trade name:) GF-500, Canon Plain Paper White manufactured by Canon, Inc.; and (trade name:) Two-side Fine Quality Plain Paper manufactured by Seiko Epson Corp. Furthermore, examples of those not exclusive for ink jet that may be used include PPC (Plain Paper Copy) paper and the like.

In recording with the ink jet recording method of the present invention on a record-receiving material such as a communication sheet, for example, a container containing the ink composition described above is loaded at a predetermined position of an ink jet printer, and recording may be performed on the record-receiving material with an ordinary recording method.

The ink jet recording method of the present invention can use, together with the ink composition of the present invention, for example, a known ink composition of respective colors such as a magenta ink, a cyan ink or a yellow ink, and if necessary, a green ink, a blue ink (or a violet ink) and a red ink (or an orange ink) in combination.

The ink compositions of respective colors are filled into their respective containers, and the respective containers are loaded onto a predetermined position of the ink jet printer, similarly to the container containing the ink composition of the present invention for use in the ink jet recording.

The respective compounds contained as the coloring matter (I) and the coloring matter (II) in the ink composition of the present invention, are easily synthesized and cheap. Furthermore, the respective compounds have high solubility with respect to an aqueous medium, and also have excellent water solubility, and thus have satisfactory filterability through membrane filters in the process of preparing an ink composition.

The ink composition of the present invention or an ink prepared from the ink composition has excellent storage stability and discharge stability as well. Specifically, the ink composition of the present invention has no solid precipitation, no change of physical property, no change of the hue and the like after storage for a long time, and has satisfactory storage stability.

Furthermore, the ink composition of the present invention is suitably used for ink jet recording, for writing tools and the like. The ink composition of the present invention exhibits neutral black to gray color without color tone in any case of dark color printing and light color printing particularly when recorded on exclusive ink jet paper, and has less change of the hue even when recorded in a different medium. Furthermore, the ink composition of the present invention has very high print (printing) density of recorded images, and causes no bronzing on the images even when printed with a high density solution. In addition, the ink composition of the present invention is also excellent in various fastness properties such as moisture resistance and water resistance, particularly light fastness and ozone gas fastness.

Furthermore, the ink composition of the present invention is excellent in various fastness properties in combination with another ink composition containing coloring matters of magenta, cyan, and yellow, and allows full-color ink jet recording that is excellent in storability. Further, the ink composition of the present invention can also be positively used in plain paper.

As described above, the ink composition of the present invention is very useful as a black ink for ink jet recording.

EXAMPLES

Hereinafter, the present invention will be described more specifically by way of Examples, but the present invention is not intended to be limited by the following Examples.

The "parts" and "percent (%)" in the Examples are on a mass basis, unless particularly stated otherwise. Furthermore, the respective operations of the various synthesis reactions, crystallization and the like were all carried out under stirring. In the case where a desired amount of an intended compound is not obtained with one time of a synthesis reaction, the reaction was repeatedly carried out until the desired amount was obtained.

Furthermore, in the following respective formula, the functional groups such as a sulfo group and a carboxy group are described in the form of a free acid for convenience.

Furthermore, all of the pH values and the reaction temperatures described in Examples exhibit values measured in the reaction system.

Furthermore, the maximal absorption wavelengths (λmax) of the synthesized compounds were measured in an aqueous solution at pH 5 to 8, and were results as diluted so as to give 0.5 to 1.5 of the absorbance when measured. In addition, in case of a compound which has change of the absorption wavelength in the visible light region occurs after the dilution, a value measured after convergence of the change of the absorption wavelength under a shield condition was described as the maximal absorption wavelength.

Synthesis Example 1

Step 1

35.7 parts of a monoazo compound represented by the following formula (26) (C.I. Acid Yellow 9) was added to 200 parts of water, and the monoazo compound was dissolved therein while the system was adjusted to pH 6 with sodium hydroxide. Subsequently, 7.2 parts of sodium nitrite was added thereto. This solution was added dropwise over 30 minutes to 300 parts of 5% hydrochloric acid maintained at 0° C. to 10° C., and then the mixture was stirred for one hour at or below 20° C. to perform a diazotization reaction. Thus, a diazo reaction liquid was prepared.

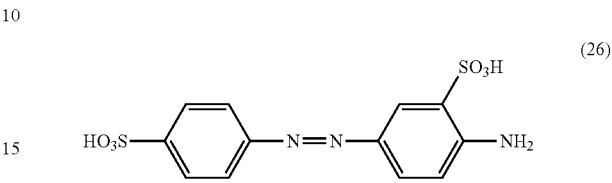

Meanwhile, 10.7 parts of 3-methylaniline, 10.4 parts of sodium hydrogen bisulfite, and 8.6 parts of a 35% aqueous formalin solution were added to 260 parts of water, and a methyl-ω-sulfonate derivative was obtained by a routine method.

The aqueous solution of the methyl-ω-sulfonate derivative thus obtained was added to the diazo reaction liquid previously prepared, and the mixture was allowed to react for 5 hours at 0° C. to 15° C., while the system was adjusted to pH 4 to 5 by adding sodium hydrogen carbonate 100 parts of 35% hydrochloric acid was added to the reaction liquid, and then the mixture was allowed to react further for 5 hours at 70° C. to 80° C. Sodium chloride was added to the reaction liquid for salting-out, and a solid precipitated therefrom was isolated by filtration. Thus, 120 parts of a compound represented by the following formula (27) was obtained as a wet cake.

$$HO_3S-\underset{}{\underset{}{\bigcirc}}-N=N-\underset{SO_3H}{\underset{}{\bigcirc}}-N=N-\underset{H_3C}{\underset{}{\bigcirc}}-NH_2 \qquad (27)$$

Step 2

35.7 parts of the monoazo compound represented by the above formula (27) (C.I. Acid Yellow 9) was added to 200 parts of water, and was dissolved therein while the system was adjusted to pH 6 with sodium hydroxide. Subsequently, 7.2 parts of sodium nitrite was added thereto. This solution was added dropwise over 30 minutes to an aqueous solution prepared by diluting 31.3 parts of 35% hydrochloric acid with 200 parts of water, while maintaining the system at 0° C. to 10° C., and then the mixture was stirred for one hour at or below 20° C. to perform a diazotization reaction. 0.4 parts of sulfamic acid was added to the reaction liquid thus obtained, and the resulting mixture was stirred for 5 minutes. Thus, a diazo reaction liquid was prepared.

Meanwhile, 24.0 parts of a compound represented by the following formula (28) obtained by the method described in Japanese Unexamined Patent Application, Publication No. 2004-083492, and a 25% aqueous solution of sodium hydroxide were added to 300 parts of warm water at 40° C. to 50° C., and the mixture was adjusted to pH 5 to 6. Thus, an aqueous solution was obtained. To this aqueous solution, the diazo reaction liquid obtained as described above was added dropwise over 30 minutes at 15° C. to 25° C. During the dropwise addition, the system was maintained at pH 5 to 6 by adding an aqueous solution of sodium carbonate. After the dropwise addition, the mixture was stirred for 2 hours at the same temperature and at the same pH, and then the mixture was adjusted to pH 0 to 1 by adding 35% hydrochloric acid. The liquid thus obtained was heated to 65° C., and was stirred for 2 hours at the same temperature. Subsequently, the liquid was cooled to room temperature, and a solid precipitated therefrom was isolated by filtration. Thereby, 130 parts of a wet cake containing a compound represented by the following formula (29) was obtained.

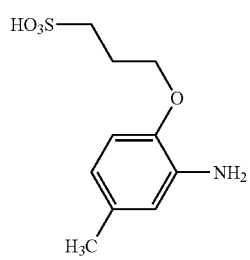
(28)

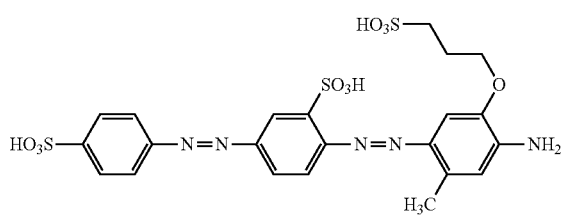
(29)

manufactured by Lion Corp. was added, and then 7.3 parts of cyanuric chloride was added thereto at 5° C. to 10° C. After the addition, the mixture was stirred for 6 hours at 5° C. to 10° C. while the pH value was maintained at 6 to 7 by adding an aqueous solution of sodium carbonate.

Meanwhile, 51 parts of the wet cake containing the compound represented by formula (29) obtained in the (Step 2) was dissolved in 150 parts of water by adjusting the system to pH 7 to 8 by adding a 25% aqueous solution of sodium hydroxide. Thus, a solution was obtained. This solution was added to the reaction liquid described above, and then the resulting mixture was heated to 65° C. to 70° C. While the pH value was maintained at 6 to 7 by adding an aqueous solution of sodium carbonate, the mixture was stirred for 7 hours. Subsequently, 1.7 parts of piperazine was added thereto, and then the resulting mixture was heated to 90° C. to 95° C. While the pH value was maintained at 7 to 8 by adding an aqueous solution of sodium carbonate, the mixture was stirred for 18 hours.

The reaction liquid thus obtained was cooled to 20° C. to 30° C., and then salting-out was carried out by adding sodium chloride. A solid precipitated therefrom was isolated by filtration, and thus a wet cake was obtained.

This wet cake was dissolved in 600 parts of water. To this solution, 50 parts of methanol, and then 800 parts of 2-propanol were added, and the mixture was stirred for 30 minutes. A solid precipitated therefrom was isolated by filtration, and thereby a wet cake was obtained. The wet cake thus obtained was dissolved again in 400 parts of water, and 1000 parts of 2-propanol was added thereto. A solid precipitated therefrom was isolated by filtration and dried. Thereby, 25.3 parts of an azo compound represented by the following formula (31) (λmax: 435 nm) was obtained as a sodium salt.

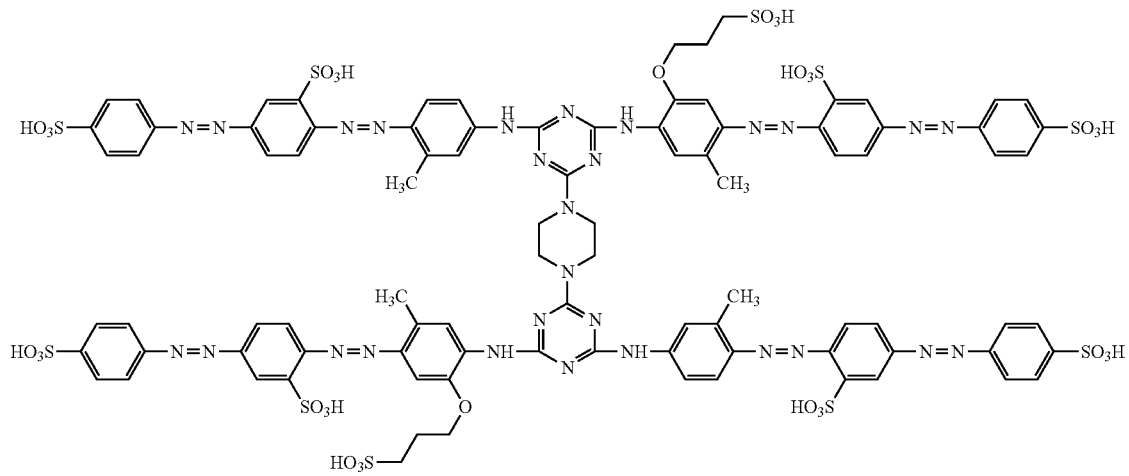
(30)

Step 3

50 parts of the wet cake containing the compound represented by formula (27) obtained in the (Step 1) was dissolved in 300 parts of water by adjusting the system to pH 8 to 9 by adding a 25% aqueous solution of sodium hydroxide. To this solution, 0.48 parts of (trade name:) Leocol® TD90 (surfactant, hereinafter simply referred to as "Leocol® TD90")

Synthesis Example 2

65 parts of the wet cake containing the compound represented by formula (29) obtained in the (Step 2) of Synthesis Example 1 was dissolved in 250 parts of water by adjusting the system to pH 7 to 8 by adding a 25% aqueous solution of sodium hydroxide. To this solution, Leocol® TD90 (0.10 parts) was added, and then 3.8 parts of cyanuric chloride was added thereto at 15° C. to 25° C. After the addition, while the pH value was maintained at 5 to 6 by adding an aqueous solution of sodium carbonate, the mixture was stirred for 2 hours at 15° C. to 25° C. Subsequently, this reaction liquid was heated to 60° C. to 65° C., and while the pH value was maintained at 6 to 7 by adding an aqueous solution of sodium carbonate, the reaction liquid was stirred for 5 hours.

Subsequently, 0.89 parts of piperazine was added thereto, and then the resulting mixture was heated to 90° C. to 95° C. While the pH value was maintained at 8 to 9 by adding an aqueous solution of sodium carbonate, the mixture was stirred for 16 hours.

The reaction liquid thus obtained was cooled to 20° C. to 30° C., and then salting-out was carried out by adding sodium chloride. A solid precipitated therefrom was isolated by filtration, and thus a wet cake was obtained. This wet cake was dissolved in 400 parts of water. To this solution, 50 parts of methanol, and then 800 parts of 2-propanol were added, and the resulting mixture was stirred for 30 minutes. A solid precipitated therefrom was isolated by filtration, and thereby, a wet cake was obtained. The wet cake thus obtained was dissolved again in 200 parts of water, and 800 parts of 2-propanol was added thereto. A solid precipitated therefrom was isolated by filtration and dried. Thus, 13.5 parts of an azo compound represented by the following formula (31) (λmax: 436 nm) was obtained as a sodium salt.

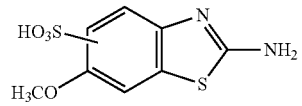

Step 2

3.2 parts of the compound represented by the formula (32) obtained in the (Step 1) was suspended in 20 parts of 50% sulfuric acid. 4.7 parts of 40% nitrosylsulfuric acid was added dropwise thereto over about 10 minutes at 5° C. to 10° C. under stirring, and thereby a diazo suspension was obtained.

Meanwhile, 2.9 parts of a compound represented by the formula (33) and 0.4 parts of sulfamic acid were added to 30 parts of water, and then the mixture was adjusted to pH 5.0 to 5.5 by adding sodium hydroxide, and thus an aqueous solution was obtained. To the aqueous solution thus obtained, the diazo suspension described above was added dropwise over about 10 minutes at a reaction temperature of 20° C. to 30° C.

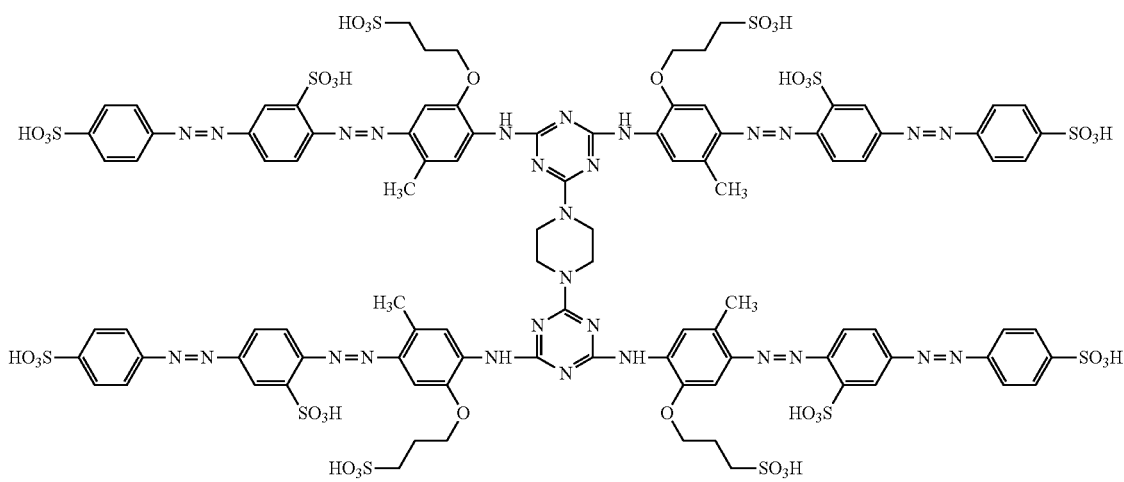

Synthesis Example 3

Step 1

5.0 parts of 2-amino-6-methoxybenzothiazole was slowly added to 16 parts of 15% fuming sulfuric acid at 15° C. to 25° C. After the addition, the mixture was stirred for 2 hours at the same temperature. Subsequently, the mixture was added dropwise to 60 parts of ice water over about 10 minutes. The precipitated crystals were taken by filtration and dried. Thus, 6.4 parts of a compound represented by the following formula (32) was obtained.

After completion of the dropwise addition, the mixture was stirred at the same temperature for 2 hours, and adjusted to pH 0.7 to 1.2 by adding sodium hydroxide, and then a solid precipitated therefrom was taken by filtration. Thus, 11.8 parts of a wet cake containing a compound of the following formula (34) was obtained.

Meanwhile, the compound represented by the following formula (33) was obtained by the method described in Japanese Unexamined Patent Application, Publication No. 2004-083492.

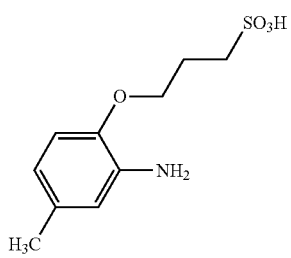

(33)

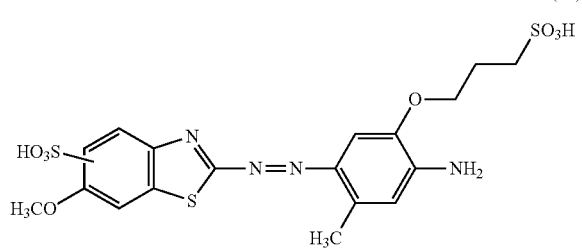

(34)

Step 3

To 30 parts of water, 2.7 parts of a compound represented by the following formula (35) was added, and then the mixture was adjusted to pH 7.5 to 8.0 by adding sodium hydroxide, and thus an aqueous solution was obtained.

Meanwhile, the wet cake containing the compound represented by the formula (34) obtained in the (Step 2) was suspended in 110 parts of water under stirring, and the mixture was adjusted to pH 6.0 to 6.5 by adding sodium hydroxide, and thus an aqueous solution was obtained.

To the aqueous solution thus obtained, 2.6 parts of 35% hydrochloric acid, and then 2.0 parts of an aqueous solution of 40% sodium nitrite at a reaction temperature of 15° C. to 20° C. were added dropwise over about 5 minutes. Thus, a diazo suspension was obtained.

The diazo suspension thus obtained was added dropwise over 20 minutes to the aqueous solution containing the compound represented by the formula (37) previously obtained at a reaction temperature of 20° C. to 30° C. At this time, the reaction system was added with sodium carbonate so as to be maintained at 7.0 to 8.0 of the pH value. After completion of the dropwise addition, the reaction system was stirred at the same temperature for 2 hours, added with sodium chloride whereby to carry out salting-out. A solid precipitated therefrom was taken by filtration. Thus, 16.9 parts of the wet cake containing a compound represented by the following formula (36) was obtained.

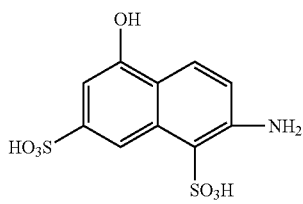

(35)

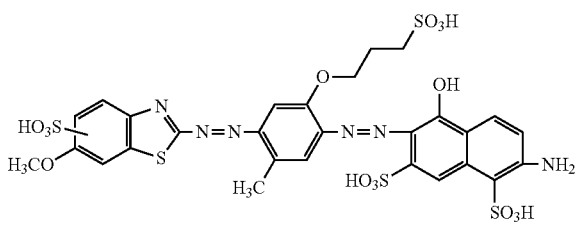

(36)

Step 4

To 30 parts of water, 12.7 parts of 3,5-disulfo aniline, 18.3 parts of 35% hydrochloric acid, and then 9.1 parts of an aqueous solution of 40% sodium nitrite at a reaction temperature of 0° C. to 5° C. were added dropwise over about 5 minutes. Thus, a diazo liquid was obtained. Meanwhile, to dimethylacetyl succinate, 9 parts of water, and then 2 parts of ethanol were added and suspended under stirring, and then the diazo liquid previously obtained was added dropwise thereto over 15 minutes at a reaction temperature of 10° C. to 20° C. After the dropwise addition, the reaction system was added with sodium acetate so as to be maintained at 7.0 to 8.0 of the pH value. After completion of the dropwise addition, the reaction system was stirred at the same temperature for 2 hours. The reaction system was added with sodium hydroxide and stirred at pH 13.0 to 13.5 and at 15° C. to 20° C. for 2 hours. Then, the reaction system was added with 35% hydrochloric acid stirred at pH 0 to 0.5 and at 5° C. to 10° C. for 2 hours. The precipitated crystals were taken by filtration. Thus, 10.9 parts of the compound represented by the following formula (37) was obtained.

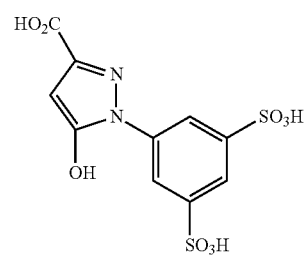

(37)

Step 5

To 30 parts of water, 2.5 parts of the compound represented by the formula (37) obtained in the (Step 4) was added, and then the mixture was adjusted to pH 7.5 to 8.0 by adding sodium hydroxide. Thus, an aqueous solution was obtained.

Meanwhile, under stirring, the total amount of the wet cake containing the compound represented by the formula (36) obtained in the (Step 3) was dissolved in 150 parts of water, and 3.5 parts of 35% hydrochloric acid, and then 1.5 parts of an aqueous solution of 40% sodium nitrite at a reaction temperature of 20° C. to 25° C. were added dropwise thereto over about 5 minutes. Thus, a diazo liquid was obtained.

The diazo liquid thus obtained was added dropwise to the aqueous solution containing the compound of the formula (37) previously obtained, over for 30 minutes at a reaction temperature of 20° C. to 30° C. At this time, the reaction system was added with sodium carbonate so as to be maintained at 7.0 to 8.0 of the pH value.

After completion of the dropwise addition, the reaction system was stirred at the same temperature for 2 hours, and added with sodium chloride whereby to carry out salting-out. A solid precipitated therefrom was taken by filtration. Thus, 40.8 parts of a wet cake was obtained. The wet cake thus obtained was dissolved in 180 parts of water, and added with 250 parts of methanol whereby to be crystallized. A solid precipitated therefrom was taken by filtration, and thereby a wet cake was obtained. In addition, the wet cake thus obtained was dissolved in 180 parts of water, added with 22 parts of lithium chloride, and added with 200 parts of methanol whereby to be crystallized. A solid precipitated therefrom was taken by filtration, and thereby a wet cake was obtained. The wet cake thus obtained was dissolved again in 80 parts of water, and added with 200 parts of methanol whereby to be crystallized. A solid precipitated therefrom was taken by filtration and dried. Thus, 7.0 parts of the compound represented by the following formula (38) ($\lambda$max: 606.5 nm) was obtained as a lithium salt.

Meanwhile, this compound is a mixture of the compound represented by No. 128 as described in Table 31, and the compound represented by No. 137 as described in Table 32.

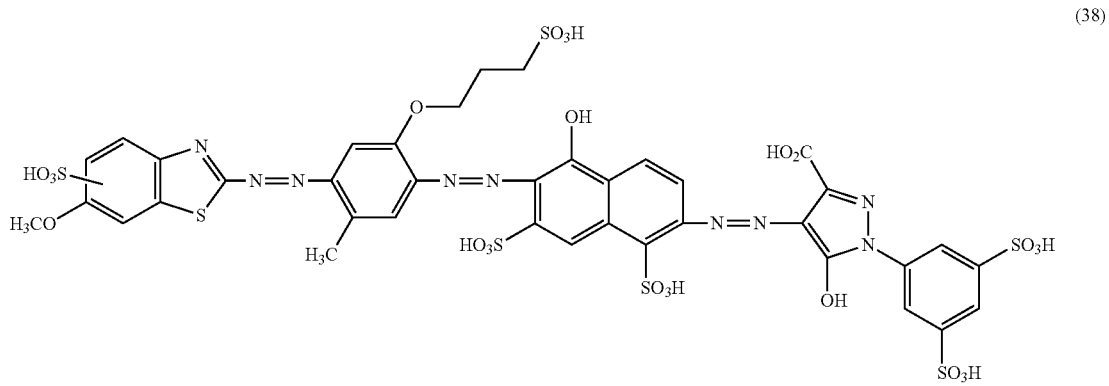

(38)

Synthesis Example 4

The compound represented by the following formula (39) was obtained by using 19.2 parts of 2-aminonaphthalene-4, 6,8-trisulfonic acid instead of 12.7 parts of 3,5-disulfo aniline as a raw material in the synthesis of the compound represented by the formula (37), and using this as a raw material, Synthesis Example 2 (Step 5) was performed. Thus, a compound represented by the following formula (40) ($\lambda$max: 607.0 nm) was obtained.

Meanwhile, this compound is a mixture of the compound represented by No. 104 and the compound represented by No. 108 as described in Table 27.

(39)

(40)

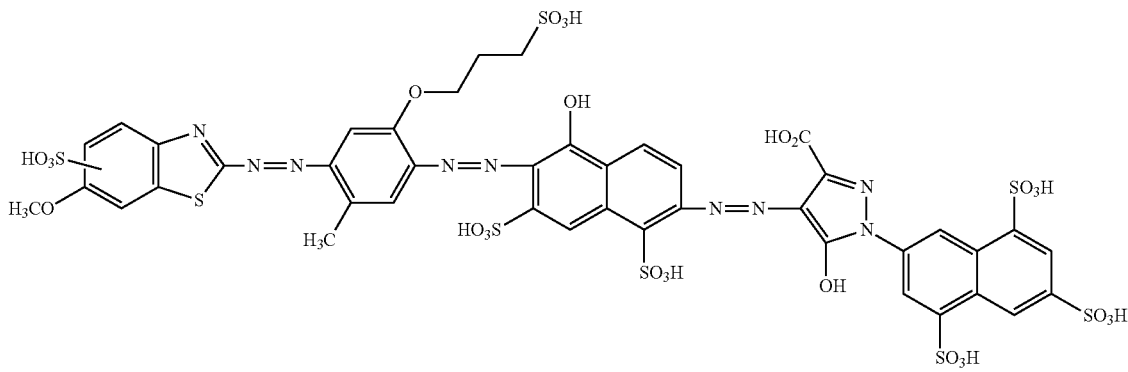

Synthesis Example 5

A compound represented by the following formula (41) (λmax: 604.0 nm) was synthesized by the method described in Examples 2 of Japanese Unexamined Patent Application, Publication No. 2009-84346. This compound is a mixture of the compound represented by No. 79 as described in Table 23, and the compound represented by No. 87 as described in Table 24.

separated by filtration with a 0.45 μm membrane filter. Thus, an ink for a test was obtained. The ink thus obtained was taken as Examples 1 to 5.

The inks of Comparative Examples 1 to 3 were obtained by mixing the respective components described in Table 36, similarly to Examples 1 to 5. The compound (42) in the table is the compound represented by the following formula (42) disclosed in Synthesis Example 2 of PCT International Publication No. WO2008/142989. The synthesis was performed (41)

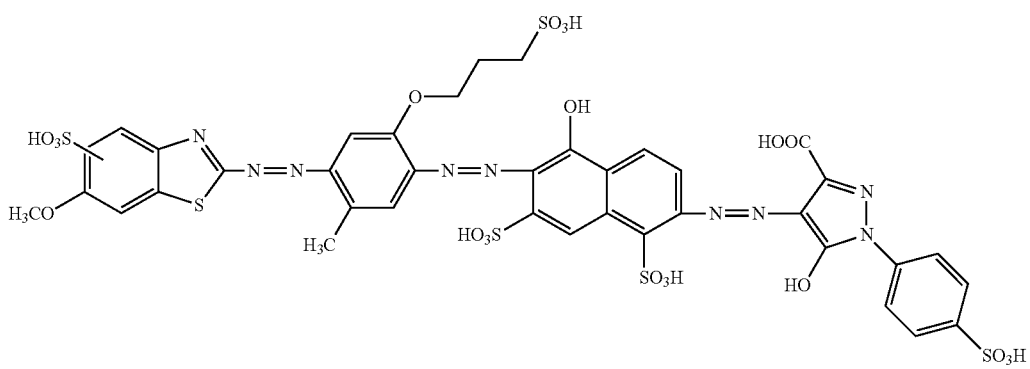

Examples 1 to 5 and Comparative Examples 1 to 3

(A) Preparation of Ink

The respective components described in the following Table 36 were mixed. Thus, the ink compositions of the present invention and the ink compositions for comparison were obtained, respectively, and then contaminants were by the disclosed technique, and preparation for an ink for Comparative Example was carried out.

The inks of Comparative Examples 1 to 3 contained 2 kinds of coloring matters, and were prepared in the same compositions as those of respective Examples except using the compound represented by the following formula (42) instead of using the coloring matter (I) of the present invention therein.

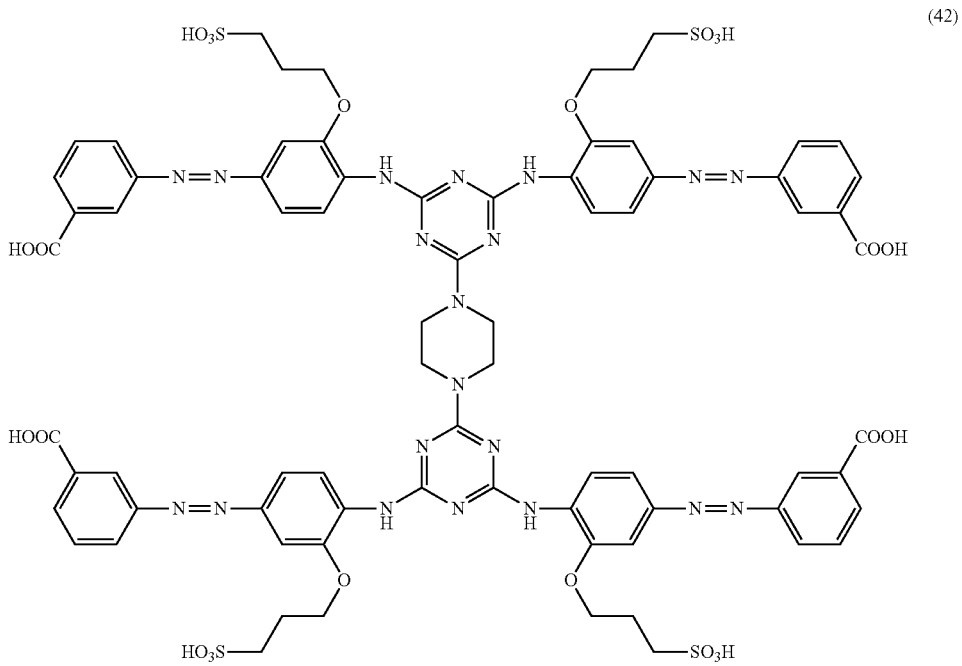 [SMILES: O=C(O)c1cccc(N=Nc2ccc(Nc3nc(Nc4ccc(N=Nc5cccc(C(=O)O)c5)cc4OCCCS(=O)(=O)O)nc(N4CCN(c5nc(Nc6ccc(N=Nc7cccc(C(=O)O)c7)cc6OCCCS(=O)(=O)O)nc(Nc6ccc(N=Nc7cccc(C(=O)O)c7)cc6OCCCS(=O)(=O)O)n5)CC4)n3)c(OCCCS(=O)(=O)O)c2)c1]

(42)

Furthermore, ion-exchanged water was used in the preparation of the inks in the respective Examples and Comparative Examples described below. After the preparation of the respective inks, the system was adjusted to pH 8 to 10 appropriately using an aqueous solution of lithium hydroxide or hydrochloric acid water only when the pH of the respective inks was beyond the range of 8 to 10.

numbers of the formulae of the compounds described in Examples. In the lower field, the numbers of the parts used are described.

Any numbers described in the fields of the water-soluble organic solvent, respective additive and the like other than the field of the coloring matter, describe the numbers of the parts in the compositions.

TABLE 36

| Ink composition | Example | | | | | Comparative Example | | |
|---|---|---|---|---|---|---|---|---|
| | 1 | 2 | 3 | 4 | 5 | 1 | 2 | 3 |
| Coloring matter (I) | (31) 1.0 | (31) 1.0 | (31) 1.0 | (31) 1.0 | (31) 0.6 | — | — | — |
| Coloring matter (II) | (38) 4.0 | (40) 4.0 | (41) 4.0 | (41) 4.0 | (41) 4.0 | (38) 4.0 | (40) 4.0 | (41) 4.0 |
| Other coloring matter | — — | — — | — — | — — | DY.86 0.4 | (42) 1.0 | (42) 1.0 | (42) 1.0 |
| GLY | 5 | 5 | 5 | 5 | 5 | 5 | 5 | 5 |
| Urea | 5 | 5 | 5 | 5 | 5 | 5 | 5 | 5 |
| NMP | 4 | 4 | 4 | 4 | 4 | 4 | 4 | 4 |
| IPA | 3 | 3 | 3 | 3 | 3 | 3 | 3 | 3 |
| BCTL | 2 | 2 | 2 | 2 | 2 | 2 | 2 | 2 |
| EDTA | 0.1 | 0.1 | 0.1 | 0.1 | 0.1 | 0.1 | 0.1 | 0.1 |
| SURF | 0.1 | 0.1 | 0.1 | 0.1 | 0.1 | 0.1 | 0.1 | 0.1 |
| Water | 75.8 | 75.8 | 75.8 | 75.8 | 75.8 | 75.8 | 75.8 | 75.8 |
| Total | 100 | 100 | 100 | 100 | 100 | 100 | 100 | 100 |

Table 36 described above will be described.

The coloring matter (I) or the coloring matter (II) in the table corresponds to the coloring matter (I) or the coloring matter (II) contained in the ink composition of the present invention, respectively. In the field of the other coloring matters in the table, coloring matters not corresponding to the coloring matter (I) and the coloring matter (II) are described. The fields of the respective coloring matters are divided into two up and down by the dotted lines. The numbers in the parentheses described in the upper field correspond to the Meanwhile, the abbreviations in the table represent the meanings described below. DY. 86: C.I. Direct Yellow 86

GLY: Glycerin

NMP: N-methyl-2-pyrrolidone

IPA: Isopropanol

BCTL: Butylcarbitol

EDTA.2Na: Ethylenediamine tetraacetate disodium

SURF: Trade name Surfynol® manufactured by Nissin Chemical Industry CO., Ltd.

(B) Ink Jet Recording

Ink jet print was carried out on Glossy Paper 1, Glossy Paper 2, and Glossy Paper 3 using the inks obtained in the respective Examples, and the respective Comparative Examples described above by means of an ink jet printer, (trade name:) "PIXUS® iP4500" manufactured by Canon, Inc. Glossy Paper 1 was (trade name:) "Kassai Photo Finish Pro® <high glossy>" manufactured by Fujifilm Corporation, Glossy Paper 2 was, (trade name:) "Photo Paper Glossy Pro (Platinum Grade®)" manufactured by Canon, Inc. and Glossy Paper 3 was (trade name:) "Photo Paper Gloss Gold®" manufactured by Canon, Inc. At the time of ink jet recording, image patterns were produced such that six grades of gradation at densities of 100%, 80%, 60%, 40%, 20% and 10% were obtained, and recorded materials of the gradation from dark black to light black were obtained. The recorded materials thus obtained were dried at room temperature for 24 hours or more after the printing, which were used for the evaluations as the test specimens.

(C) Evaluation of Recorded Images

The respective test specimens obtained by the procedures described above were used for the print density test. Any of the colorimetric determinations of the recorded images in the evaluation was carried out using a colorimeter, (trade name:) "SpectroEye" manufactured by GRETAG-MACBETH. Any of the colorimetric determinations was carried out under the conditions of a viewing angle of 2° and a light source of D65, using a density standard of DIN.

(D) Evaluation for Print Density

Black reflection density, Dk value was measured using the colorimetric determination system described above in regard to the 100% density gradation area, the gradation area printed most heavily in the respective test specimens. The value was evaluated according to the following criteria. The results of the evaluations are presented in Table 37. Meanwhile, the Dk values thus obtained are such that a larger value means superior print density.

A: The Dk value is equal to or greater than 2.40.

B: The Dk value is less than 2.40 and equal to or greater than 2.35.

C: The Dk value is less than 2.35 and equal to or greater than 2.25.

D: The Dk value is less than 2.25.

TABLE 37

| | | Evaluation result | | |
|---|---|---|---|---|
| | | | Print density Dk | |
| | Ink No. | Glossy paper 1 | Glossy paper 2 | Glossy paper 3 |
| Example | 1 | A | A | A |
| | 2 | A | A | A |
| | 3 | A | A | A |
| | 4 | B | A | B |
| | 5 | A | A | A |
| Comparative Example | 1 | C | B | C |
| | 2 | D | C | D |
| | 3 | B | B | C |

As shown from the results of Table 37, the inks of the respective Examples received A or B of the evaluation results, and the inks of the respective Comparative Examples received B to D of the evaluation results in all the glossy papers.

Specifically, it was shown that the print densities of the obtained recorded images were different apparently when the inks of the respective Examples using the coloring matter (I) were compared with the inks of the respective Comparative Examples not using the coloring matter (I), and that high color development properties were obtained with use of the coloring matter (I).

From the results described above, it was revealed that any ink composition of the present invention containing 2 kinds of coloring matters of specific coloring matter (I) and coloring matter (II) was excellent in various fastness properties required in ink jet recorded images, and produced neutral high quality images with low chroma and no color tone, and produced high print density of recorded images as black when compared with a conventional black ink composition.

INDUSTRIAL APPLICABILITY

The ink composition of the present invention is suitable as a black ink liquid for ink jet recording, for various recordings such as writing tools, particularly for ink jet recording.

The invention claimed is:

1. An ink composition containing at least one kind of a compound represented by the following formula (1) or a salt thereof as a coloring matter (I):

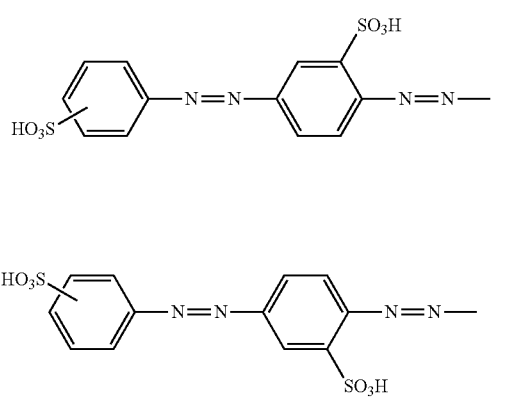

-continued

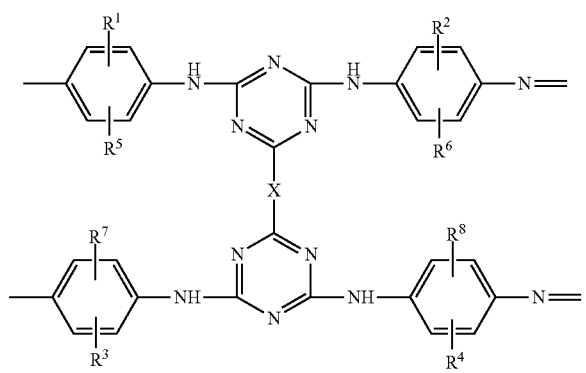

wherein,

R¹ to R⁸ each independently represent a hydrogen atom; a halogen atom; a sulfo group; a carboxy group; a sulfamoyl group; a carbamoyl group; a C1-C4 alkyl group; a C1-C4 alkoxy group; a C1-C4 alkoxy group substituted with at least one group selected from the group consisting of a hydroxy group, a C1-C4 alkoxy group, a hydroxy-C1-C4 alkoxy group, a sulfo group and a carboxy group; a C1-C4 alkylcarbonylamino group; a C1-C4 alkylcarbonylamino group substituted with a carboxy group; a ureido group; a mono-C1-C4 alkylureido group; a di-C1-C4 alkylureido group; a mono-C1-C4 alkylureido group substituted with at least one group selected from the group consisting of a hydroxy group, a sulfo group and a carboxy group; a di-C1-C4 alkylureido group substituted with at least one group selected from the group consisting of a hydroxy group, a sulfo group and a carboxy group; a benzoylamino group; a benzoylamino group having its benzene ring substituted with at least one group selected from the group consisting of a halogen atom, a C1-C4 alkyl group, a nitro group, a sulfo group and a carboxy group; a benzenesulfonylamino group; or a phenylsulfonylamino group having its benzene ring substituted with at least one group selected from the group consisting of a halogen atom, a C1-C4 alkyl group, a nitro group, a sulfo group and a carboxy group; and X represents a divalent crosslinking group, and an azo compound having λmax in a range of 550 to 660 nm as a coloring matter (II).

2. The ink composition according to claim 1, wherein the coloring matter (1) is a compound represented by the following formula (2) or a salt thereof:

(2)

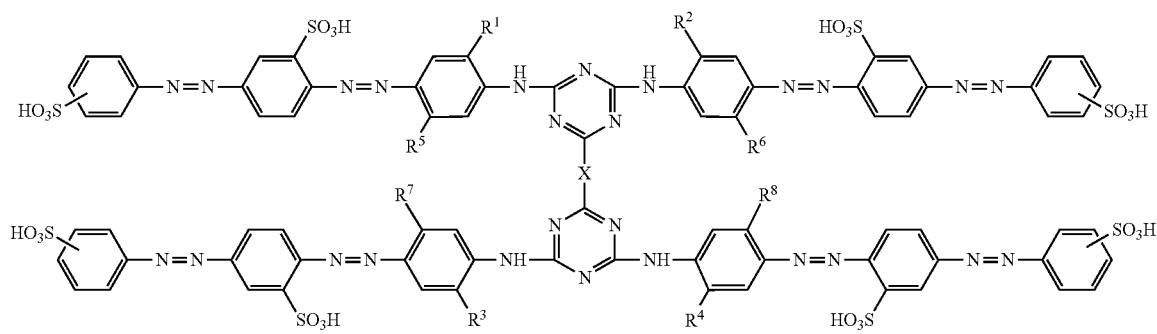

wherein,
R¹ to R⁸ each independently represent a hydrogen atom; a halogen atom; a sulfo group; a carboxy group; a sulfamoyl group; a carbamoyl group; a C1-C4 alkyl group; a C1-C4 alkoxy group; a C1-C4 alkoxy group substituted with at least one group selected from the group consisting of a hydroxy group, a C1-C4 alkoxy group, a hydroxy-C1-C4 alkoxy group, a sulfo group, and a carboxy group; a C1-C4 alkylcarbonylamino group; a C1-C4 alkylcarbonylamino group substituted with a carboxy group; a ureido group; a mono-C1-C4 alkylureido group; a di-C1-C4 alkylureido group; a mono-C1-C4 alkylureido group substituted with at least one group selected from the group consisting of a hydroxy group, a sulfo group, and a carboxy group; a di-C1-C4 alkylureido group substituted with at least one group selected from the group consisting of a hydroxy group, a sulfo group, and a carboxy group; a benzoylamino group; a benzoylamino group having its benzene ring substituted with at least one group selected from the group consisting of a halogen atom, a C1-C4 alkyl group, a nitro group, a sulfo group, and a carboxy group; a benzenesulfonylamino group; or a phenylsulfonylamino group having its benzene ring substituted with at least one group selected from the group consisting of a halogen atom, a C1-C4 alkyl group, a nitro group, a sulfo group, and a carboxy group; and X represents a divalent crosslinking group.

3. The ink composition according to claim 1, wherein in the formula (1), R¹ to R⁸ each independently represent a hydrogen atom; a halogen atom; a C1-C4 alkyl group; a C1-C4 alkoxy group; a C1-C4 alkoxy group substituted with a sulfo group or a carboxy group; or a C1-C4 alkylcarbonylamino group.

4. The ink composition according to claim 1, wherein in the formula (1), X represents a C1-C8 alkylenediamino group; a C1-C8 alkylenediamino group substituted with a carboxy group; an N—C1-C4 alkyl-C1-C6 alkylenediamino group having its alkyl moiety substituted with a hydroxy group; an amino-C1-C4 alkoxy-C1-C4 alkoxy-C1-C4 alkylamino group; a xylylenediamino group; or a piperazine-1,4-diyl group.

5. The ink composition according to claim 1, wherein in the formula (1),
at least one of R¹ and R² is a sulfopropoxy group,
at least one of R³ and R⁴ is a sulfopropoxy group,
R⁵ to R⁸ are a C1-C4 alkyl group,
X is a C2-C4 alkylenediamino group; a C2-C6 alkylenediamino group substituted with a carboxy group; an N—C2-C3 alkyl-C2-C3 alkylenediamino group having its alkyl moiety substituted with a hydroxy group; an amino-C2-C3 alkoxy C2-C3 alkoxy C2-C3 alkylamino group; an m- or p-xylylenediamino group; or a piperazine-1,4-diyl group.

6. The ink composition according to claim 1, wherein the coloring matter (II) is the compound represented by the following formula (3) or a tautomer thereof, or a salt thereof:

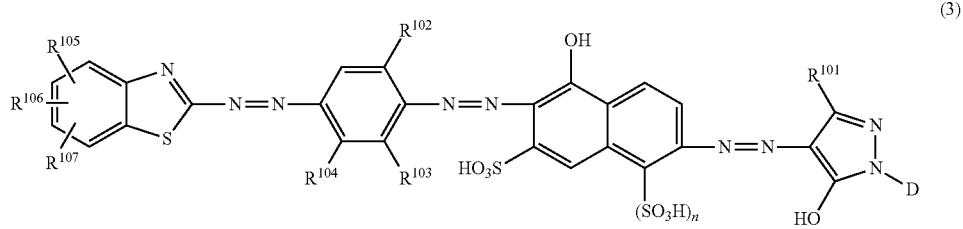

(3)

wherein,
n is 0 or 1,
R¹⁰¹ represents a carboxy group; a C1-C8 alkoxycarbonyl group; a C1-C4 alkyl group which may be substituted with a C1-C8 alkoxycarbonyl group or a carboxy group; or a phenyl group which may be substituted with a hydroxy group, a sulfo group, or a carboxy group;
R¹⁰² to R¹⁰⁴ each independently represent a hydrogen atom; a halogen atom; a hydroxy group; a sulfo group; a carboxy group; a sulfamoyl group; a carbamoyl group; a C1-C4 alkyl group; a C1-C4 alkoxy group which may be substituted with at least one group selected from the group consisting of a hydroxy group, a C1-C4 alkoxy group, a hydroxy-C1-C4 alkoxy group, a sulfo group, and a carboxy group; a mono- or di-C1-C4 alkylamino group which may be substituted with at least one group selected from the group consisting of a hydroxy group, a sulfo group, and a carboxy group; a C1-C4 alkylcarbonylamino group which may be substituted with a hydroxy group or a carboxy group; an N'—C1-C4 alkylureido group which may be substituted with at least one group selected from the group consisting of a hydroxy group, a sulfo group, and a carboxy group; a phenylamino group having its benzene ring which may be substituted with at least one group selected from the group consisting of a halogen atom, a C1-C4 alkyl group, a nitro group, a sulfo group, and a carboxy group; a benzoylamino group having its benzene ring which may be substituted with at least one group selected from the group consisting of a halogen atom, a C1-C4 alkyl group, a nitro group, a sulfo group, and a carboxy group; or a phenylsulfonylamino group having its benzene ring which may be substituted with at least one group selected from the group consisting of a halogen atom, a C1-C4 alkyl group, a nitro group, a sulfo group, and a carboxy group;
R¹⁰⁵ to R¹⁰⁷ each independently represent a hydrogen atom; a halogen atom; a carboxy group; a sulfo group; a nitro group; a hydroxy group; a carbamoyl group; a sulfamoyl group; a C1-C4 alkyl group; a C1-C4 alkoxy group which may be substituted with at least one group selected from the group consisting of a hydroxy group, a C1-C4 alkoxy group, a sulfo group, and a carboxy group; a C1-C4 alkylsulfonyl group which may be substituted with at least one group selected from the group consisting of a hydroxy group, a sulfo group, and a carboxy group; or a phenylsulfonyl group having its benzene ring which may be substituted with at least one group selected from the group consisting of a halogen atom, a C1-C4 alkyl group, a nitro group, a sulfo group, and a carboxy group; and the group D represents an optionally substituted phenyl group or a naphthyl group, wherein in the case where the group D is a substituted phenyl group, the group D has a substituent selected from the group consisting of a hydroxy group; a sulfo group; a carboxy group; a C1-C4 alkyl group; a C1-C4 alkoxy group; an amino group; a mono- or di-C1-C4 alkylamino group; a C1-C4 alkylcarbonylamino group; a benzoylamino group having its benzene ring which may be substituted with a halogen atom, a C1-C4 alkyl group, a nitro group, a sulfo group, or a carboxy group; and a phenylsulfonyloxy group having its benzene ring which may be substituted with a halogen atom, a nitro group, or a C1-C4 alkyl group; and in the case where the group D is a substituted naphthyl group, the group D has a substituent selected from the group consisting of a hydroxy group; a sulfo group; a carboxy group; a C1-C4 alkyl group; a C1-C4 alkoxy group; an amino group; a mono- or di-C1-C4 alkylamino group; a C1-C4 alkylcarbonylamino group; a benzoylamino group having its benzene ring which may be substituted with a halogen atom, a C1-C4 alkyl group, a nitro group, a sulfo group, or a carboxy group; and a phenylsulfonyloxy group having its benzene ring which may be substituted with a halogen atom, a nitro group, or a C1-C4 alkyl group.

7. The ink composition according to claim 6, wherein in the formula (3), n is 1, $R^{101}$ is a carboxy group or a phenyl group, $R^{102}$ is a C1-C4 alkoxy group substituted with a sulfo group, $R^{103}$ is a hydrogen atom, $R^{104}$ is a C1-C4 alkyl group, $R^{105}$ is a hydrogen atom or a sulfo group, $R^{106}$ is a hydrogen atom, a halogen atom, a carboxy group, a sulfo group, a C1-C4 alkoxy group, or a C1-C4 alkylsulfonyl group, $R^{107}$ is a hydrogen atom or a sulfo group, and the group D is a phenyl group or a naphthyl group substituted with at least one group selected from the group consisting of a hydroxy group, a sulfo group, a carboxy group, a C1-C4 alkyl group, and a C1-C4 alkoxy group.

8. The ink composition according to claim 6, wherein in the formula (3), n is 1, $R^{101}$ is a carboxy group, $R^{102}$ is a C1-C4 alkoxy group substituted with a sulfo group, $R^{103}$ is a hydrogen atom, $R^{104}$ is a C1-C4 alkyl group, $R^{105}$ is a hydrogen atom or a sulfo group, $R^{106}$ is a C1-C4 alkoxy group, $R^{107}$ is a hydrogen atom or a sulfo group, and the group D is a phenyl group or a naphthyl group substituted with a sulfo group.

9. The ink composition according to claim 1, wherein the ratio of the coloring matter (I) is 10 to 40% by mass, and the ratio of the coloring matter (II) is 10 to 80% by mass in the total mass of the coloring matters contained in the ink composition.

10. An ink jet recording method comprising performing recording by utilizing the ink composition according to claim 1 as an ink, discharging droplets of the ink in accordance with a recording signal, and thereby attaching the droplets onto a record-receiving material.

11. The ink jet recording method according to claim 10, wherein the record-receiving material is a communication sheet.

12. The ink jet recording method according to claim 11, wherein the communication sheet is a sheet comprising an ink-receiving layer containing a porous white inorganic substance.

13. A colored body colored with the ink composition according to claim 1.

14. An ink jet printer loaded with a container containing an ink composition according to claim 1.

15. A colored body colored with the ink jet recording method according to claim 10.

* * * * *